United States Patent
Tuchitoi et al.

(10) Patent No.: US 6,906,813 B1
(45) Date of Patent: Jun. 14, 2005

(54) PRINT CONTROL APPARATUS, PRINT CONTROL METHOD, MEMORY MEDIUM FOR STORING PRINT CONTROL PROGRAM, AND PRINT CONTROL PROGRAM

(75) Inventors: Naoki Tuchitoi, Kawasaki (JP); Yuichi Higuchi, Funabashi (JP); Hideki Sakai, Sakura (JP); Junichi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/470,206

(22) Filed: Dec. 22, 1999

(30) Foreign Application Priority Data

Dec. 24, 1998 (JP) ............................................. 10-367975
Sep. 17, 1999 (JP) ............................................. 11-263916
Dec. 9, 1999 (JP) ............................................. 10-350036

(51) Int. Cl.[7] ............................................. G06F 15/00
(52) U.S. Cl. ..................... 358/1.14; 358/1.1; 358/1.15; 358/468
(58) Field of Search .................................. 358/1.1, 1.11, 358/1.12, 1.13, 1.14, 1.15, 468; 399/8, 19

(56) References Cited

U.S. PATENT DOCUMENTS 5,812,901 A * 9/1998 Morikawa ..................... 399/19
5,996,029 A * 11/1999 Sugiyama et al. ............. 710/15
6,130,757 A * 10/2000 Yoshida et al. ............ 358/1.15

* cited by examiner

Primary Examiner—Mark Wallerson
(74) Attorney, Agent, or Firm—Fitzpatrick, Cella, Harper & Scinto

(57) ABSTRACT

If a print job is designated to interrupt print, processing of any print job currently being processed is interrupted, print processing of the instructed print job is immediately performed and resumption of the interrupted print job is automatically performed afterward. Further, if an interrupt print occurs, the sending source of the interrupted print jobs (host computers, etc.) are notified that an interrupt occurred.

79 Claims, 42 Drawing Sheets

FIG. 4

| BYTE \ BIT | 7 | 6 | 5 | 4 | 3 | 2 | 1 | 0 |
|---|---|---|---|---|---|---|---|---|
| 0 | | | OPERATION CODE | | | | | |
| 1 | | | BLOCK LENGTH | | | | | |
| 2 | | | | | | | | |
| 3 | | | PARAMETER LENGTH | | | | | |
| 4 | ERROR FLAG | NOTICE FLAG | | | | | CONTINUATION FLAG | |
| 5 | | | | | | | | |
| 6 | | | | | | REPLY REQUEST | | REPLY TRANSMISSION |
| 7 | | | USER ID | | | | | |
| 8 | | | | | | | | |
| 9 | | | PASSWORD | | | | | |
| 10 | | | | | | | | |
| 11 | | | | | | | | |
| 12— | | | DATA SECTION | | | | | |

POINTER 801 →

| JOB ID | SUSPEND FLAG |
|--------|--------------|
| 1 | F |
| 2 | F |
| 3 | F |
| 4 | F |

8-2

POINTER 801 →

| JOB ID | SUSPEND FLAG |
|--------|--------------|
| 1 | F |
| 2 | F |
| 3 | F |
| 4 | F |
| 5 | F |

JOB 5 ADDED

8-3

POINTER 801 →

| JOB ID | SUSPEND FLAG |
|--------|--------------|
| 2 | F |
| 3 | F |
| 4 | F |
| 5 | F |

JOB 1 COMPLETED OR CANCELLED

| JOB ID | SUSPEND FLAG |
|---|---|
| 1 | F |
| 2 | F |
| 3 | F |
| 4 | T |

POINTER → 1

19-2

| JOB ID | SUSPEND FLAG |
|---|---|
| 1 | F |
| 2 | F |
| 3 | F |
| 5 | F |
| 4 | T |

POINTER → 1
JOB 5 ADDED → 5

19-3

| JOB ID | SUSPEND FLAG |
|---|---|
| 2 | F |
| 3 | F |
| 5 | F |
| 4 | T |

POINTER → 2
JOB 1 COMPLETED

FIG. 35

MANAGEMENT TABLE

| JOB ID 3501 | STATUS 3502 | PAGE BUFFER 3503 | ANALYSIS INFORMATION 3504 | OUTPUT INFORMATION 3505 | NETWORK 3506 |
|---|---|---|---|---|---|
| 1 | OUTPUTTING | 100000 |  | 10000 | 111.22.33.44 |
| 2 | WAITING FOR OUTPUT | 180000 |  |  |  |
| 3 | ANALYZING |  | 11000 |  | 111.22.33.47 |

INTERMEDIATE DATA IN DRAW BUFFER

| 100000 | CHR | RULE | FONT NAME | START | END | LINE THICKNESS | NO. OF CHRS | 100010 |
|---|---|---|---|---|---|---|---|---|
|  |  |  | CHR CODE |  |  |  |  |  |
| 100050 | RECTANGLE |  |  | START | END | LINE THICKNESS |  | 100060 |

3607, 3611, 3612, 3613, 3602, 3608, 3603, 3609, 3604, 3605, 3606, 3610, 3614, 3615, 3616, 3617

OUTPUT INFORMATION

FIG. 44

MANAGEMENT TABLE

| JOB ID (4401) | STATUS (4402) | PAGE BUFFER (4403) | ANALYSIS INFORMATION (4404) | OUTPUT INFORMATION (4405) | NETWORK (4406) |
|---|---|---|---|---|---|
| 1 | OUTPUTTING | 100000 | | 10000 | |
| 2 | WAITING FOR OUTPUT | 180000 | | | 111.22.33.44 |
| 3 | ANALYZING | | 11000 | | 111.22.33.47 |

INTERRUPT COMMAND

| ESC (4501) | PRO (4502) | OUTPUTTING/WAITING FOR OUTPUT/ANALYZING (4503) |
|---|---|---|

ANALYZED DATA IN PAGE BUFFER

ANALYSIS INFORMATION

OUTPUT INFORMATION

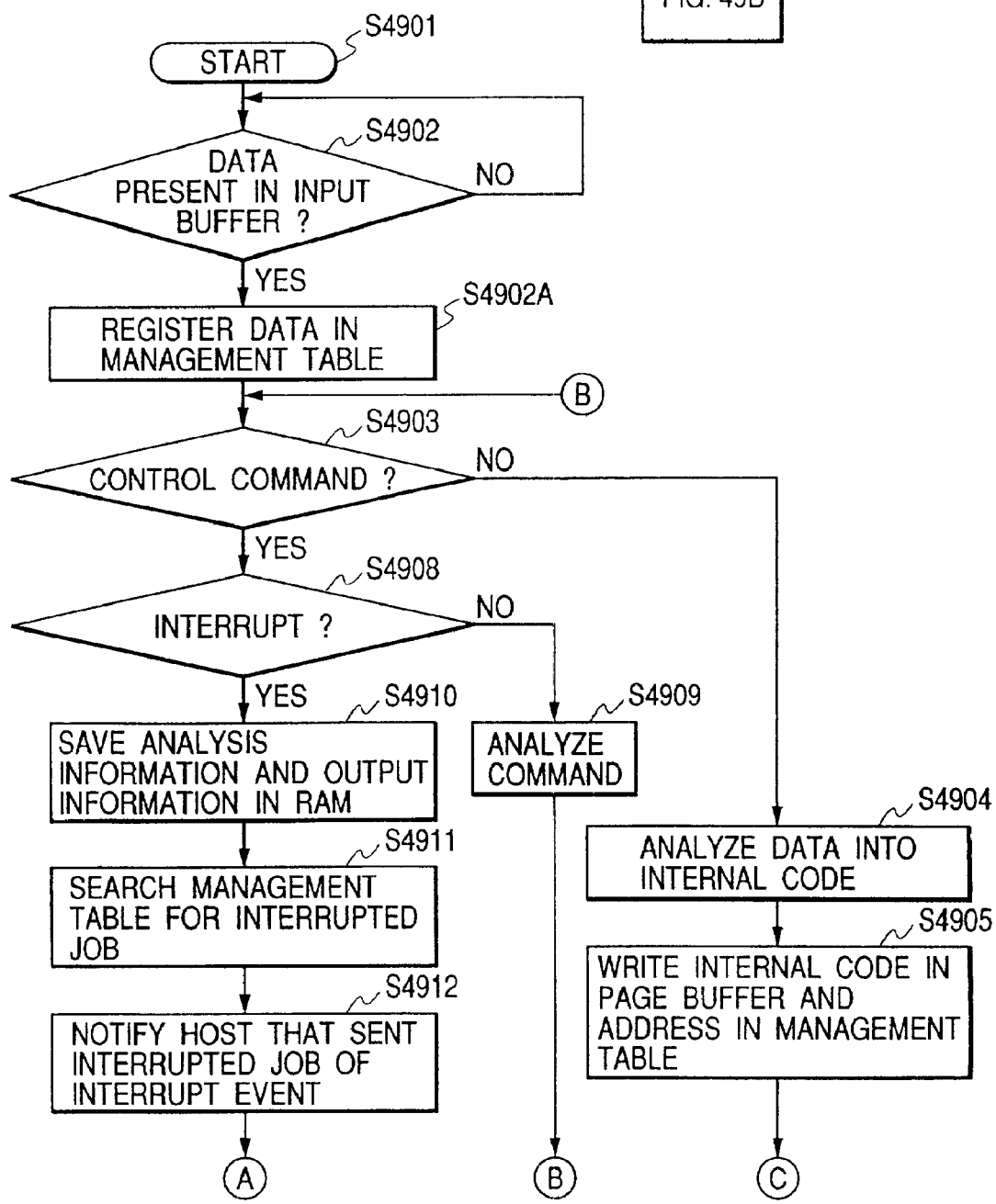

INTERRUPT COMMAND

PRINT CONTROL APPARATUS, PRINT CONTROL METHOD, MEMORY MEDIUM FOR STORING PRINT CONTROL PROGRAM, AND PRINT CONTROL PROGRAM

BACKGROUND OF THE INVENTION

1. Field of the Invention

The present invention relates to a printing system comprising a host computer for generating print data according to user instructions and a printing apparatus that generates image data by data processing the print data transmitted from the host computer via a designated transmission medium and actually prints onto media such as paper.

2. Related Background Art

Conventionally, it has been demanded of printing systems constructed of a host computer and a printing apparatus that the printing apparatus not only prints on the basis of the print data generated by the host computer but that information acquisition and environment setting of the printing apparatus can be performed by the host computer.

In particular, one form is in general use due to the recent spread of networks which can meet the large quantity printing needs in an office and suppress management costs to a minimum by sharing a single, high-speed, high function printing apparatus among multiple users via a network. Under these conditions, managers demand that management of the printing apparatus be performed in real time from a remote location. Also, general users demand secondary operations such as confirmation of the processing status or cancellation of print jobs initiated by themselves.

SUMMARY OF THE INVENTION

Thus, many printing systems are being considered to fulfill these demands.

FIG. 1 is one example of a printing system that meets the above demands. It is a block diagram showing the functional construction of a printing system in which structures for transmission of a print job to the printing apparatus from the host computer and information acquisition and environment setting of the printing apparatus have been realized. In this printing system, a host computer 100 and a printing apparatus 150 are connected via a designated printing medium 180.

The host computer 100 comprises an application 101, a printer driver 102, an output buffer 103, an I/F driver 104, a utility 105, a logic channel controller 106, and a job packet generator 107.

The application 101 provides the user with a graphic user interface and generates image data suited to the user's aims. The printer driver 102 converts the image data produced by the application 101 to page description language (hereinafter abbreviated as PDL) printable by the printing apparatus 150. The output buffer 103 temporarily stores the PDL data produced by the printer driver 102. The job packet generator 107 adds job information of the print job in the application 101 to the PDL data stored in the output buffer 103 and generates a job packet according to a designated format.

The utility 105 provides a graphic user interface by acquiring information concerning the printer apparatus 150 and generates a management packet for setting the device information of the printing apparatus 150. The utility 105 also generates a management packet for performing requests for acquisition of the status of a print job or for cancellation of a print job.

The logic channel controller 106 controls duplications between the management packets generated by the utility 105 and the job packets generated by the job packet generator 107 and takes on the role of a transport layer in an OSI 7 hierarchy. The I/F driver 104 sends data generated from the logic channel controller 106 and receives data sent from the printing apparatus 150.

The printing apparatus 150 comprises a logic channel controller 151, a database 152, a job pre-processor 153, an input buffer 154, a PDL translator 155, a draw buffer 156, a drawer 157, a printer engine 158, an I/F driver 159, an information manager 160, and an operation panel 161.

The I/F driver 159 receives data sent from the host computer 100 and sends data generated by the logic channel controller 151. The logic channel controller 151 analyzes data received by the I/F driver 159, distributes job packets to the job pre-processor 153 and management packets to the information manager 160, and sends management packets sent from the information manager 160 to the I/F driver 159.

The job pre-processor 153 receives and interprets job packets and sends the PDL data of the job to the input buffer 154 and the job information to the database 152. The PDL data is stored in the order it was received in the input buffer 154. Job information, such as number of copies, and information relating to the device are stored in the database 152.

The PDL translator 155 translates the job information stored in the database and the PDL data stored in the input buffer 154, converts it to an intermediate data with which the drawer 157 can draw the PDL data in real time, and sends this intermediate data to the draw buffer 156.

The draw buffer 156 stores intermediate data for multiple pages and transfers it to the drawer 157. The drawer 157 takes the intermediate data from the draw buffer 156 and renders the intermediate data in real time according to the page conveying process of the printer engine 158 and sends video data to the printer engine 158. The printer engine 158 physically prints onto a page based on the video data sent from the drawer 157 using a known electrophotographic technology.

The information manager 160 receives requests for information acquisition from the utility 105 in the form of management packets, acquires the needed information from the database 152, and replies to the host computer via the logic channel controller 151 by changing the management packet. Also, it senses the completion of the job and spontaneously notifies the host computer that the job is completed by changing the management packet.

An operation panel 161 is attached to the main body of the printing apparatus 150 and comprises a display apparatus of crystal or LED and operation buttons. The operation panel 161 reflects user input (settings) to the database through the information manager or displays the condition of the device currently.

Next, the process when the printing apparatus receives a print request for a print job is described. When the printing apparatus 150 receives a print request for a print job, the job pre-processor 153 recognized a new print job and allocates a job ID kept within the printing apparatus to the print job. This information is stored in the database 152. This information is then deleted when it is determined that all pages of the print job have been interpreted, printed, and the last page has been completely output by the printer engine 158.

Next, the structure for cancellation of a job in this printing system is described. The function for canceling a job is a function for requesting print cancellation of a print job sent to the printing apparatus by the user who sent the print request or the manager. Either the user or the manager requests cancellation from the user interface of the utility 105 or the operation panel 161.

The utility 105 issues a management packet for requesting acquisition of a job list within the apparatus to the printing apparatus 150. The printing apparatus 150 sends the list of job IDs of all print jobs recognized within the apparatus. The utility 105 receives this list and using the graphic user interface, displays the condition of the print jobs within the apparatus.

When the user who sent the print job or the manager of the printing apparatus requests the cancellation of a print job by selecting one print job from among the displayed print jobs, in other words when the job ID of a print job for print cancellation is indicated by the graphic user interface of the utility 105, a management packet for a job cancellation request is generated and sent to the printing apparatus 150. When the management packet for a job cancellation request is sent to the printing apparatus, the information manager 160 detects the packet and interrupts the processing of data by invalidating, deleting, or eliminating data if PDL data or intermediate data exists on the printing path, or concretely, on the input buffer 154, the PDL translator 155, the draw duffer 156, or the drawer 157.

When performing cancellation from the operation panel 161, it is difficult to indicate the job ID specifically. Therefore, the print job furthest along the print path becomes the object of cancellation. Concretely, if a job is being processed by the printer engine 158, that job becomes the object of the cancellation. If not, a job being processed by the drawer 157, or if not a job being processed by the PDL translator 155, becomes the object of the cancellation. In this way, the job ID of a job found furthest along the processing steps on the printing path becomes the cancellation object, and the job ID of that job is designated.

Canceling a job from the operation panel differs from canceling a job with the utility 105 only in the method of determining the job for cancellation, but is the same in terms of the actual cancellation process inside the printing apparatus. Through the above operations, optional cancellation of a job within the printing apparatus is possible.

As a result of an increase in the usage form in which multiple users share a high-speed, high function printing apparatus that has accompanied the spreading of networks, new service needs have arisen. For general output throughput of print jobs, the output speed of the printer engine causes a bottleneck. No matter how much the function of the controller is improved there is a certain limit on the time needed for output. However, because increasing the speed of the printer engine invites an increase in the adhesion temperature and increased costs and size accompany an increase in sheet conveyance speed, it is difficult to meet users' needs. Here too there is a limit to the amount of time needed to output a print job.

When a user wants to output a job urgently, if another print job has already been sent to the printing apparatus, conventionally the user had to wait a certain amount of time until the print job sent previously was completed. Or, urgent output of the print job could be achieved to some extent if the user reset the printing apparatus in order to cancel the earlier print job. However, if the cancelled print job was a print job for another user it was necessary to inform the user that they had to reprint that print job. Therefore, in order to achieve urgent output of a print job, an interrupt print job and a revert print function for an interrupted print job are demanded from a printing apparatus.

The present invention was invented considering the above points. If a print job is instructed to interrupt, the process of the print job currently being processed is interrupted and print processing of the interrupting print job is begun immediately. By reverting to the interrupted print job automatically afterwards, there is no effect on the print job of the other user, and urgent output of a print job is possible.

In conventional, general printing apparatuses, it was difficult to distinguish between the interrupted print job and another normal print job. As a result, in conventional printing apparatuses the user could not confirm whether there was an interrupted print job. Further, whether or not an interrupting print was performed, the host computer simply monitored the current printing status of the printing apparatus and did not receive notification that an interrupting print was performed from the printing apparatus.

The present invention was invented in consideration of the above point. In the case that an interrupt print is performed and a print job instructed to interrupt is issued, notification that an interrupt print has been performed can be sent to the origin of transmission (the host computer) of the interrupted print job. In particular, it is possible to inform the host computer connected to the printing apparatus via a network that there has been an interruption.

Further, it is very inconvenient for the user if the printed material of print jobs processed by priority are output into the same output tray mixed with the printed material of other print jobs.

The present invention was invented in consideration of the above point. If the printing apparatus has multiple output trays, it is possible to prevent mixing of the printed material of a print job processed by priority with the printed material of other print jobs by outputting the printed materials of print jobs designated as interrupting into a different output tray from the output tray normally used.

Further, because the interrupting print interrupts the interrupted print job print processes and the interrupted print job is then processed again after reversion, it is possible the total throughput of the printing apparatus 300 will decrease by that amount. When the user absolutely must print urgently, the user may wish to interrupt print and print immediately, but to print in a range that will not reduce the total throughput of the printing apparatus.

The present invention was invented in consideration of the above point. By raising the print order of a designated print job by priority such that the print job already being print processed will not be cancelled, it is possible to output a print job urgently without reducing the total throughput of the printing apparatus.

Further, new needs have arisen as a result of high-speed, high function printing apparatuses being shared by multiple users accompanying the distribution of networks.

In other words, many cases have arisen in which one wants to print a large quantity, but because the print process takes time it ends up dominating the shared printer, or because the size of the print data is large and the analysis processes are complicated, print processing takes time and ends up dominating the shared printer.

Thus, a printer used with high frequency by multiple users may be requested to print with a timing that will not cause any problems for other users when one user wants to print a large volume but is not in any particular hurry. In order to solve such a request, it is necessary for the printer to have a print suspend and print resume function for a print job.

The present invention was invented in consideration of the above point. When the printer is instructed to suspend print of a print job, the input and storing of the print data is performed, but the print job is not printed. When the printer is instructed to resume print of the print job, the printer can print based on the stored print data.

Further, even if a suspended print job exists within the printing apparatus it is difficult given the above print suspend to confirm from the outside of the printing apparatus. As a result, there is the danger that the power of the printing apparatus will be shut off while the suspended print job still remains. In that case, the memory capacity of the printing apparatus is compressed and the user who sent the print job might send an instruction to reprint because the print was not performed.

The present invention was invented in consideration of the above point. When the power of the printing apparatus is shut off, it is possible to avoid compression of the memory capacity of the printing apparatus and resending a print job by displaying on the operation panel the fact that a print job remains suspended inside the printing apparatus.

BRIEF DESCRIPTION OF THE DRAWINGS

FIG. 4 is an explanatory diagram showing the construction of a job packet.

FIG. 8 is an explanatory diagram showing a job table.

FIG. 19 is an explanatory diagram showing the job table.

FIG. 35 is a diagram illustrating an example of a management table for job management.

FIG. 36 is a diagram illustrating an example of intermediate data.

FIG. 44 is a diagram showing one example of a management table for job management.

FIG. 45 is a diagram showing one example of the format of an interrupt command.

DETAILED DESCRIPTION OF THE PREFERRED EMBODIMENTS

Embodiment 1

An embodiment of the present invention is described in the following.

Figure 1:
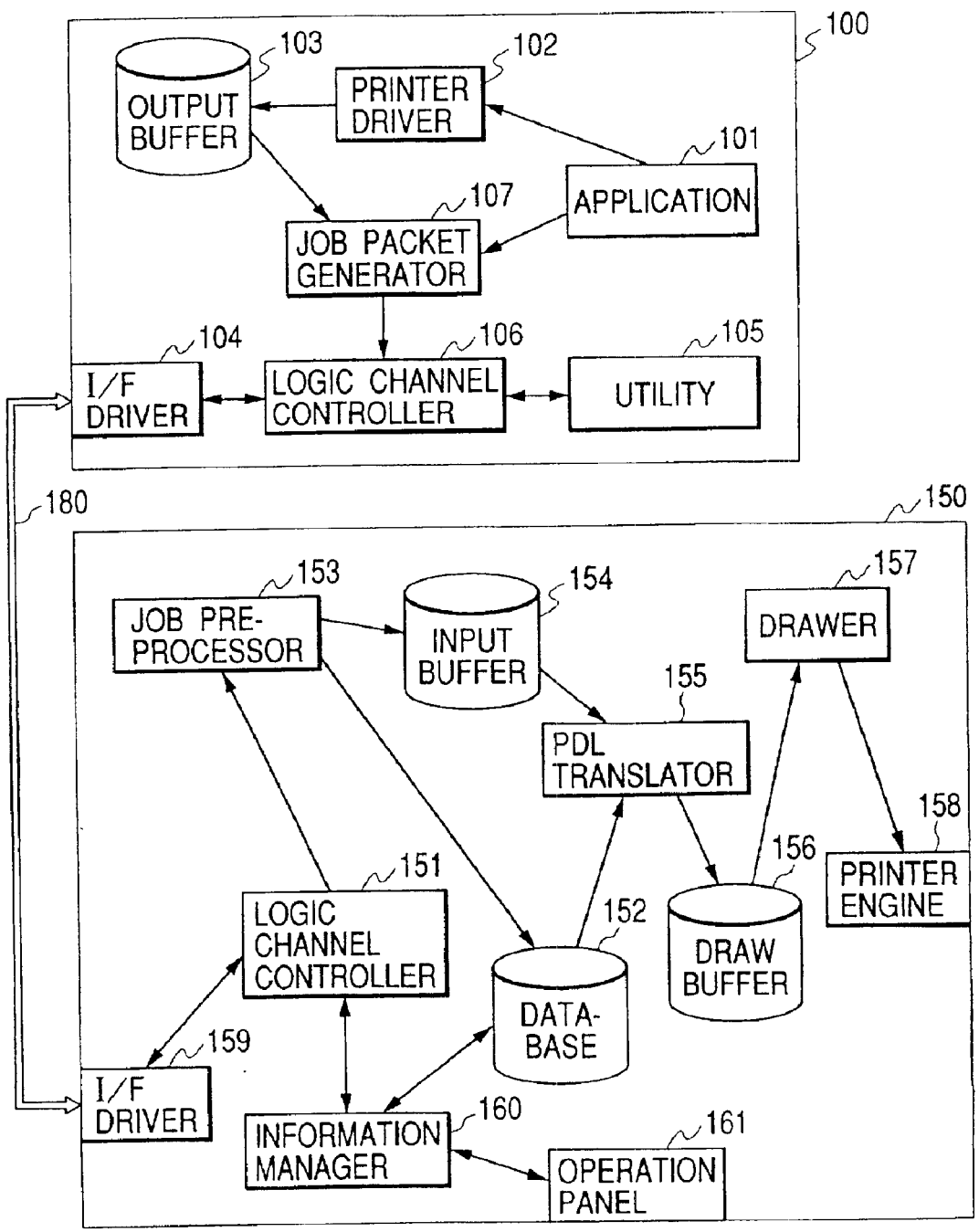
FIG. 1 is a block diagram showing the functional construction of a printing system in which structures for the transmission of a print job from a host computer to a printing apparatus and information acquisition and environment setting of the printing apparatus are realized.
Figure 2:
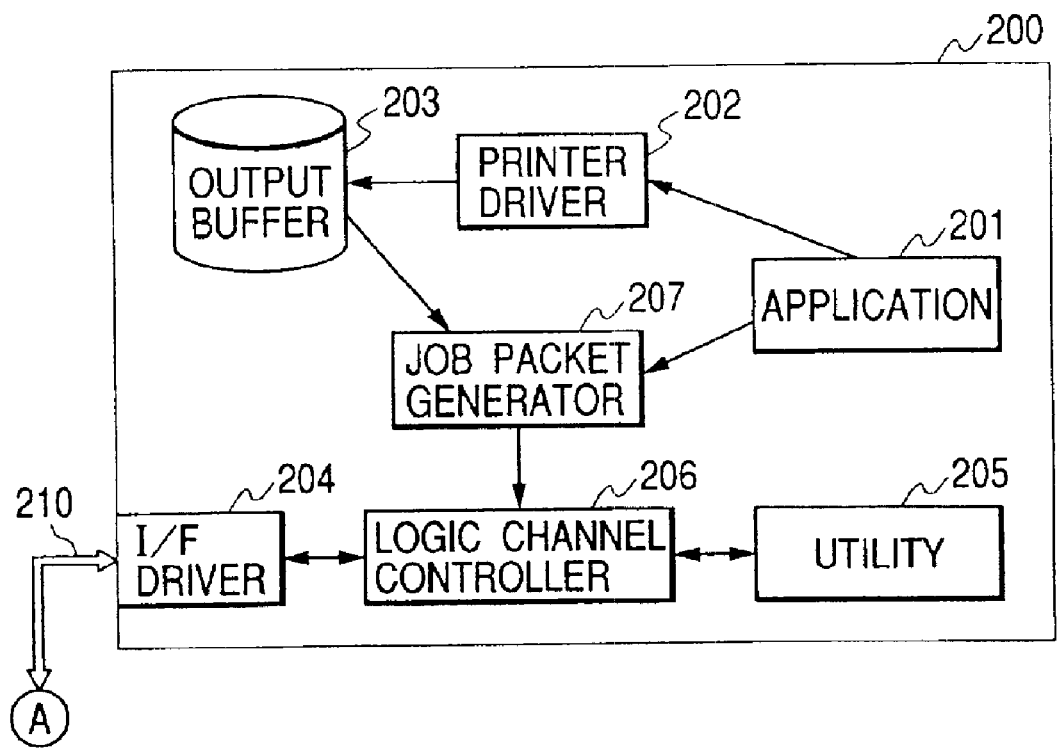
FIG. 2 is a block diagram showing the functional construction of the host computer in the printing system of the embodiment.
Figure 3:
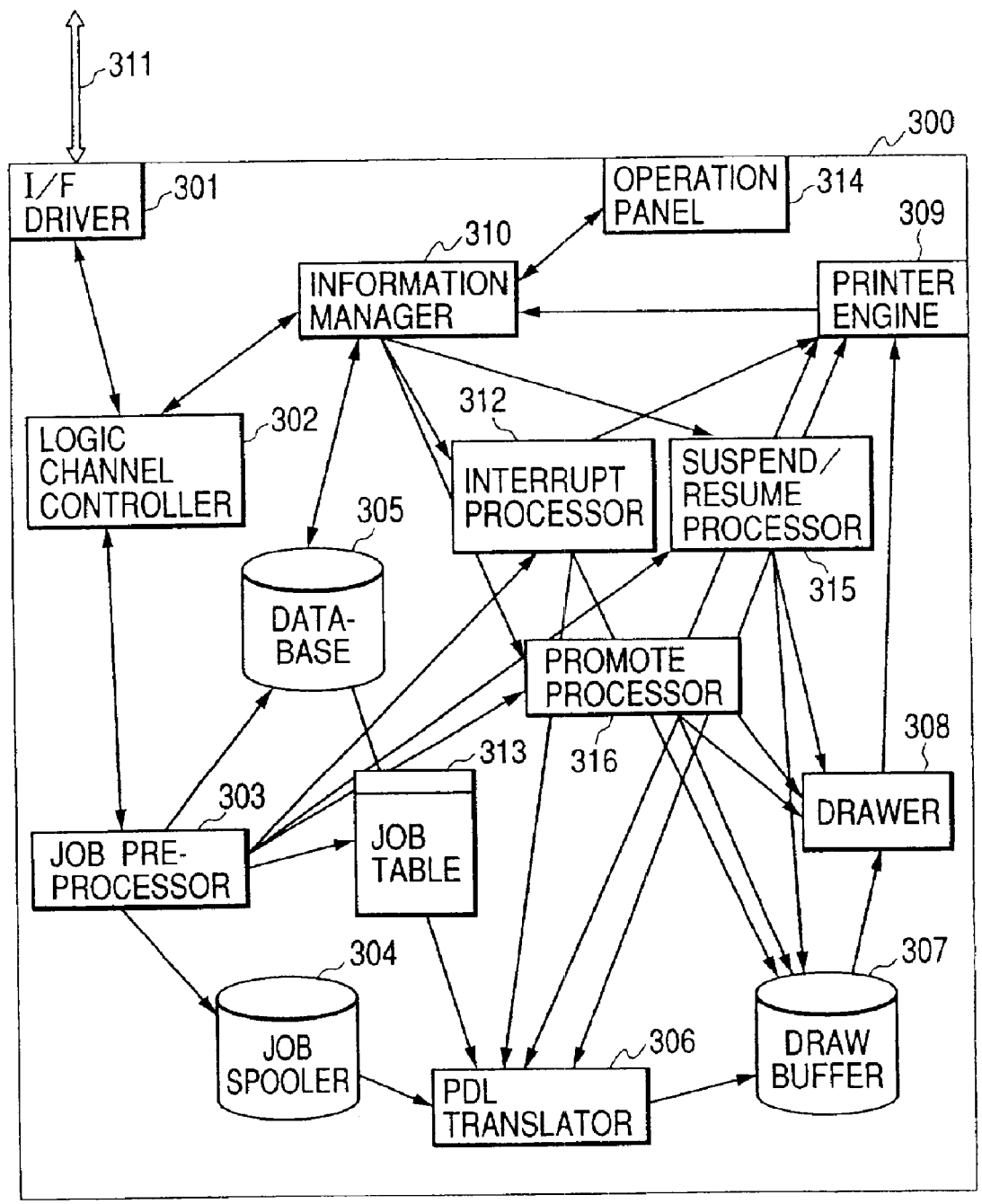
FIG. 3 is a block diagram showing the functional construction of the host computer of the printing system of the embodiment.

FIG. 2 and FIG. 3 are block diagrams showing the functional structure of the printing system of the present embodiment in which structures for performing the sending of a print job from a host computer to a printing apparatus and information acquisition and environment setting of the printing apparatus are realized.

This printing system comprises a host computer 200 for generating print jobs, a printing apparatus 300 for actually printing on paper based on the print jobs, and interfaces 210 and 311 for connecting the host computer 200 and the printing apparatus 300. The interfaces 210 and 311 can be either local interfaces regulated by IEEE1284 or network interfaces such as EtherNet. The present embodiment will be explained using local interfaces.

In FIG. 2, the host computer 200 comprises an application 201, a printer driver 202, an output buffer 203, an I/F driver 204, a utility 205, a logic channel controller 206, and a job packet generator 207.

In the application 201, the user operates the graphic user interface and designated image data is generated in response. The printer driver 202 converts the image data generated by the application 201 to page descriptive language (PDL) data which can be printed by the printing apparatus 300. The output buffer 203 temporarily stores the PDL data generated by the printer driver 202. The job packet generator 207 generates a designated job packet from the job information in the application 201 and the PDL data stored in the output buffer 203.

The utility 205 can confirm the status of the printing apparatus 300 or the print status of a sent print job, cancel a print job, interrupt a print job, suspend print of a print job, or resume print of a print job when the user operates the graphic user interface, and generates a management packet in response to these operations which can be interpreted by the printing apparatus.

The logic channel controller 206 allocates different channels for each job packet and management packet and multiplies transport layers in an OSI 7 hierarchy. The I/F driver 204 changes the direction of the logic data and the electrical signals and performs exchanges with the interface 210.

In FIG. 3, the printing apparatus comprises an I/F driver 301, a logic channel controller 302, a job pre-processor 303, a job spooler 304, a database 305, a PDL translator 306, a draw buffer 307, a drawer 308, a printer engine 309, an information manager 310, an interrupt processor 312, and a job table 313.

The I/F driver 301 changes the direction of the logic data and the electrical signals and performs exchanges with the interface 311. The logic channel controller 302 allocates a different channel for each job packet and management packet and duplicates the transport layer in an OSI 7 hierarchy. The job preprocessor 303 receives and analyzes the job packet and stores job information for the print job in the database 305 and PDL data in the job spooler 304.

The job spooler 304 comprises a large capacity memory device such as HDD, flash memory, or DRAM and temporarily holds the PDL data of a print job until print is completed. When it detects that the last page of the print job has been completely ejected the PDL data of the print job stored in the job spooler 304 is deleted or invalidated.

The processing order of print jobs is listed in a job table 313. The PDL translator 306 selects print jobs in the order of the processing order written in the job table 313, generates intermediate data (called translating) which can be drawn in real time by analyzing the PDL data of the print job stored in the job spooler 304 and the job information of the print job stored in the database 305, and stores this intermediate data in the draw buffer 307.

The draw buffer 307 temporarily holds the intermediate data by single pages until print completion. The drawer 308 obtains the intermediate data from the draw buffer 307, renders the intermediate data in real time depending on the page conveying process performed by the print engine 309, and transmits video data to the printer engine 309. The printer engine 309 physically prints onto the page based on the video data sent from the drawer 308 using a known electrophotographic technology.

The information manager 310 receives the management packet sent from the host computer and either obtains information from the database 305 in response to a request or instructs a print cancel (cancel request), an interruption (interrupt request), a print suspend (print suspend request), a print resume (print resume request), or a priority print (priority print request), or it detects the completion of the job or an error in the device and issues a management packet for independently notifying the host computer 200 to that effect.

The interrupt processor 312 actually performs the interrupt when there has been an instruction for interruption of a print job. The suspend/resume processor 315 actually suspends or resumes print when there has been an instruction for print suspend (suspend) or print resume (resume) of a print job. The promote processor 316 actually promotes a job when there has been an instruction to priority print (promote) a print job. The promote process is a process in which the processing order of a print job is raised by priority.

Data transmission between the logic channel controller 206 of the host computer 200 and the logic channel controller 302 of the printing apparatus follows the protocol of regulations such as TCP/IP for a network or IEEE1284/IEEE1284.4 for local, and the multiplication of the transport layer level is performed. A detailed description is omitted here.

A job packet sent logically from the job packet generator 207 is received by the job pre-processor 303. The logical route through which the job packet flows is called a job channel. A management packet is transmitted between the utility 205 and the information manager 310. The logical route through which the management packet flows is called a management channel. Both channels can transmit in either direction, but in this embodiment the job channel may be used only in the direction of host computer to printing apparatus if desired. The job channel and the management channel are multiplied on the transport layer level of an OSI 7 hierarchy, and the flow process of either channel does not influence the other.

Next, the construction of a job packet and a management packet are described. Job packets and management packets are regulated by the protocol of the application layer and comprise a header and data (the parameter). One print job comprises several job packets. The combination of a string of job packets comprising one print job is called a job script.

FIG. 4 is an explanatory diagram of the structure of a job packet. Reading down the rows are bytes, and reading across the columns are the bits of each byte. The operation codes of bytes 0 and 1 within the table are the 2 byte (16 bit) IDs showing the packet function. The following values can be taken in the job packet.

0×0201: job-start operation

0×0202: job-attribute setting operation

0x0204: PDL data transmission operation
0x0205: job-completion operation

The block lengths of bytes 2 and 3 are used to show the correspondence between the reply from the receiving side and the reply request from the sending if the sending side that sent the job packet requests a reply (reply request). For example, when the host computer 200 sends job packets with block lengths 1, 2, and 3 in quick succession, an error packet of block length 2 might return. In this case the host computer can confirm that the error was generated in the job packet sent second.

The parameter lengths of bytes 4 and 5 can show up to 0–64 K bytes within a range for showing the byte length of the data section.

Bytes 6 and 7 show values less than the range for storing bits showing each type of flag for job packets.

Error Flag: If this value is 1, it indicates that some sort of error arose at the printing apparatus. This flag is added to a returning packet sent from the printing apparatus 300 to the host computer 200.

Notice Flag: When this value is 1, it is not a reply to the request packet from the host computer 200 to the printing apparatus 300, but indicates that the printing apparatus 300 is notifying the host computer 200 that there is some sort of notification.

Continuation Flag: When this value is 1, it indicates that remaining data is being sent to the next job packet as all of the data could not fit in the data section. The next job packet must be set with the same operation code and block length as the previous packet.

Reply Request: The host computer 200 sets this at 1 when requesting a reply packet to its request packet from the printing apparatus. When this is 0 there will be no reply packet if the request packet is processed normally. If an error arises in the printing apparatus, a reply packet will be sent with an error flag set at 1 regardless of whether the reply request is set at 0 or 1.

The user ID of bytes 8 and 9 and the password of bytes 10 and 11 are in a range used for certification when security limits are built on the operations of the packet.

Byte 12 and following are data sections for storing additional data corresponding to operation codes. For a job-start operation, the operation mode of the job is recorded. The operation mode codes that can be designated are as follows:

0x01: Normal print job. This print job is added to the end of the queue of the printing apparatus as a normal print job and printed when its turn comes around.

0x03: Promote print job. This print job is handled as a print job designated for promotion and is printed on a priority basis.

0x04: Interrupt print job. This print job is handled as an interrupting print job, all print jobs are suspended, and it is printed on a priority basis.

0x05: Suspend print job. This print job is handled as both an input print job and a suspended print job; the print data of this print job is stored, but actual printing is not performed.

Figure 13:
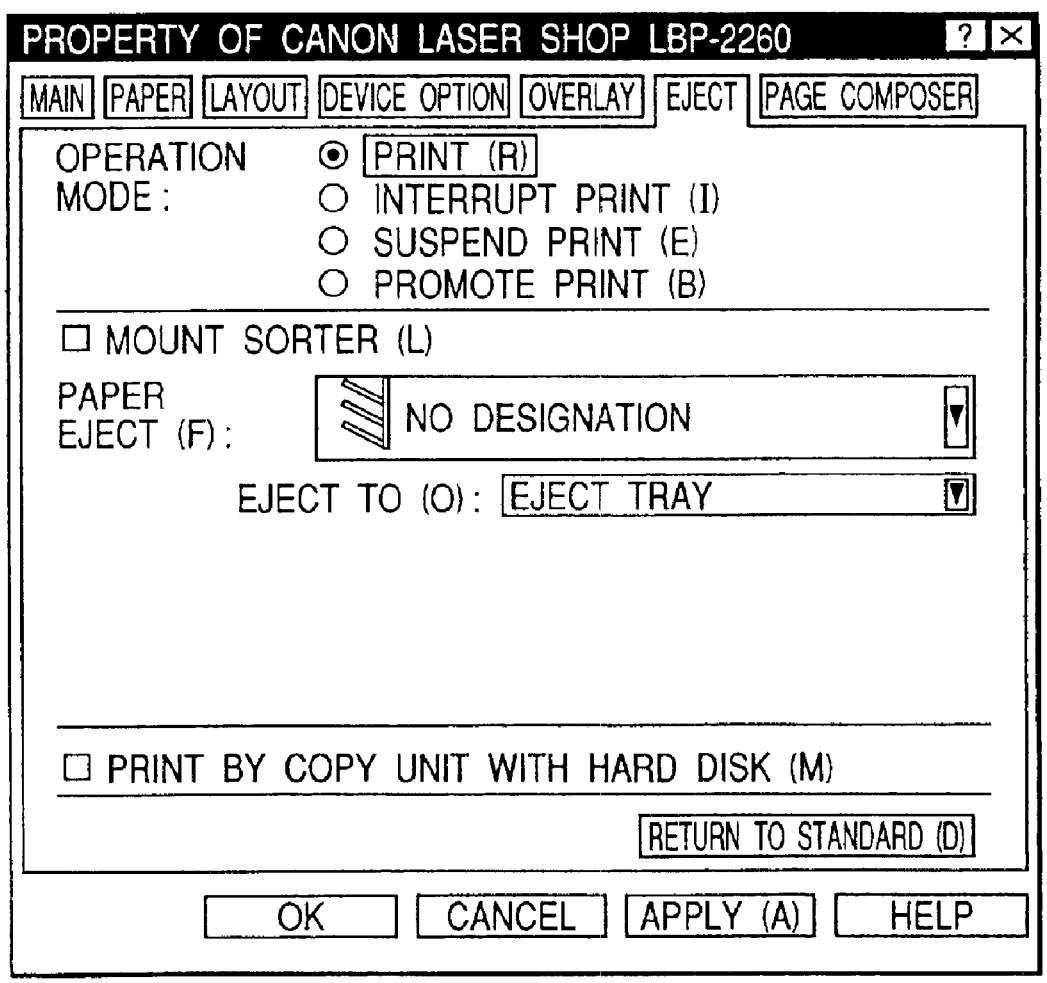
FIG. 13 is a diagram showing a graphic user interface provided for displaying to the user a designated process (job operation mode).

FIG. 13 is a diagram showing the graphic user interface provided for indicating the designated process (job operation mode). On the screen of FIG. 13, there are check buttons corresponding to each of the items [print (R)], [interrupt print (T)], [suspend print (E)], and [promote print (B)] in the column for operation mode. The check buttons are selected exclusively and any check at another button is erased when a check is placed at a new button. If the check button of [print] is checked, the operation mode becomes 0x01 and if the check button of [interrupt print] is checked, the operation mode becomes 0x04.

When the check button of [suspend print] is checked the operation mode becomes 0x05. When the check button of [promote print] is checked the operation mode becomes 0x03.

For job-attribute setting operations, the job-attribute ID and job-attribute value that the user wishes to set is stored in the data section as additional data. The job-attribute ID shows the identification number corresponding to the attribute or environment of the job and ID corresponding to the job attribute regulated by ISO-10175 (DPA) is allocated in advance. Following, representative job attributes are given.

Job attribute ID0x0101: job name
0x0103: job owner name
0x016a: job size
0x0002: job-completion notice address.

Other IDs corresponding to job attributes such as copies or color/black and white are allocated depending on the functions of the printing apparatus.

For PDL data transmission, PDL data is but in the data section as additional data. The data of a single job packet can reach the maximum size that can be stored in the parameter length, which can store up to 64 KB. And data in excess is sent divided among multiple job packets having PDL data transmission operations. In this case a 1 appears in the continuation flag.

There is no additional data for a job completion operation.

Figure 5:
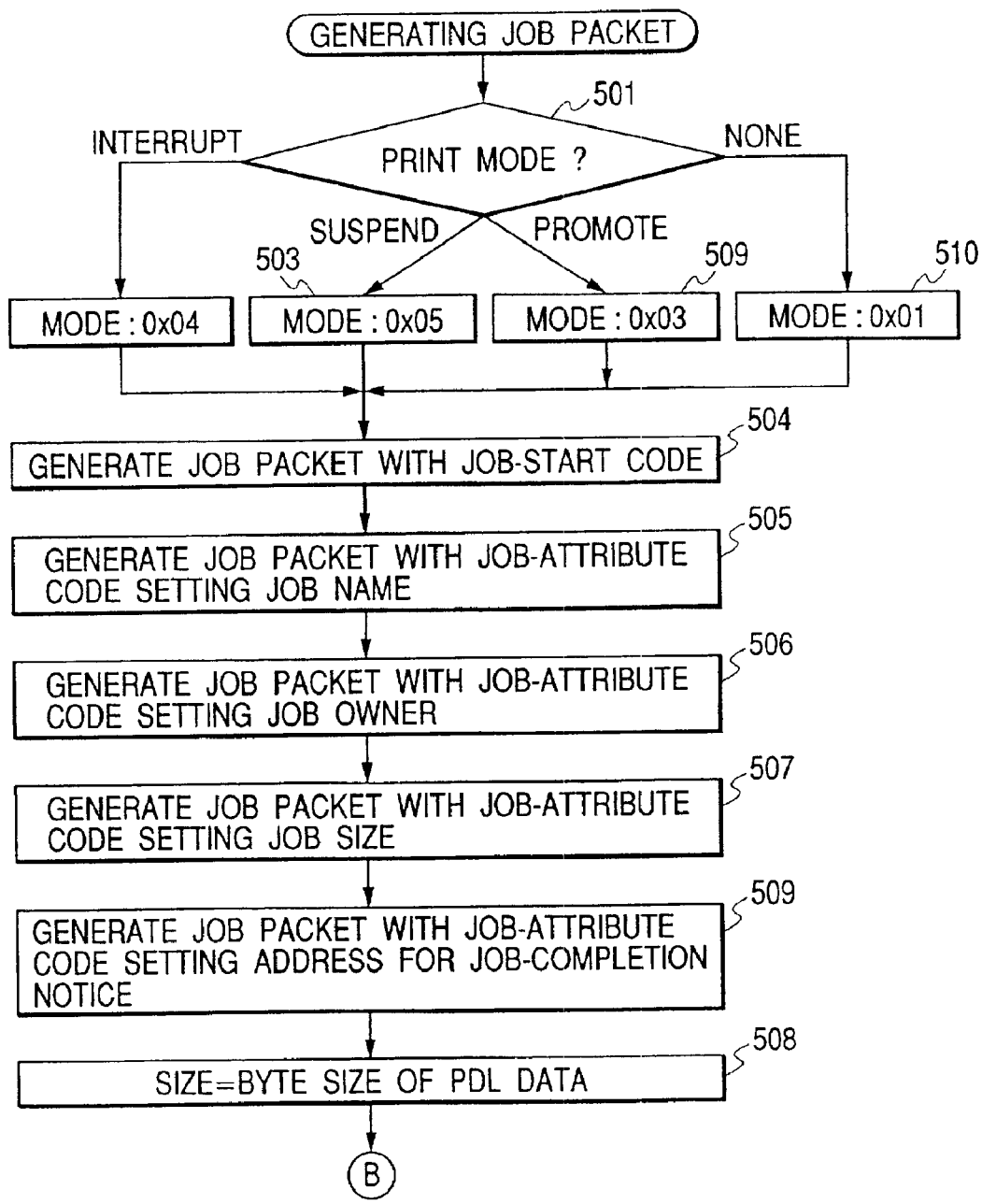
FIG. 5 is a flowchart showing the operation of the job packet generator.
Figure 6:
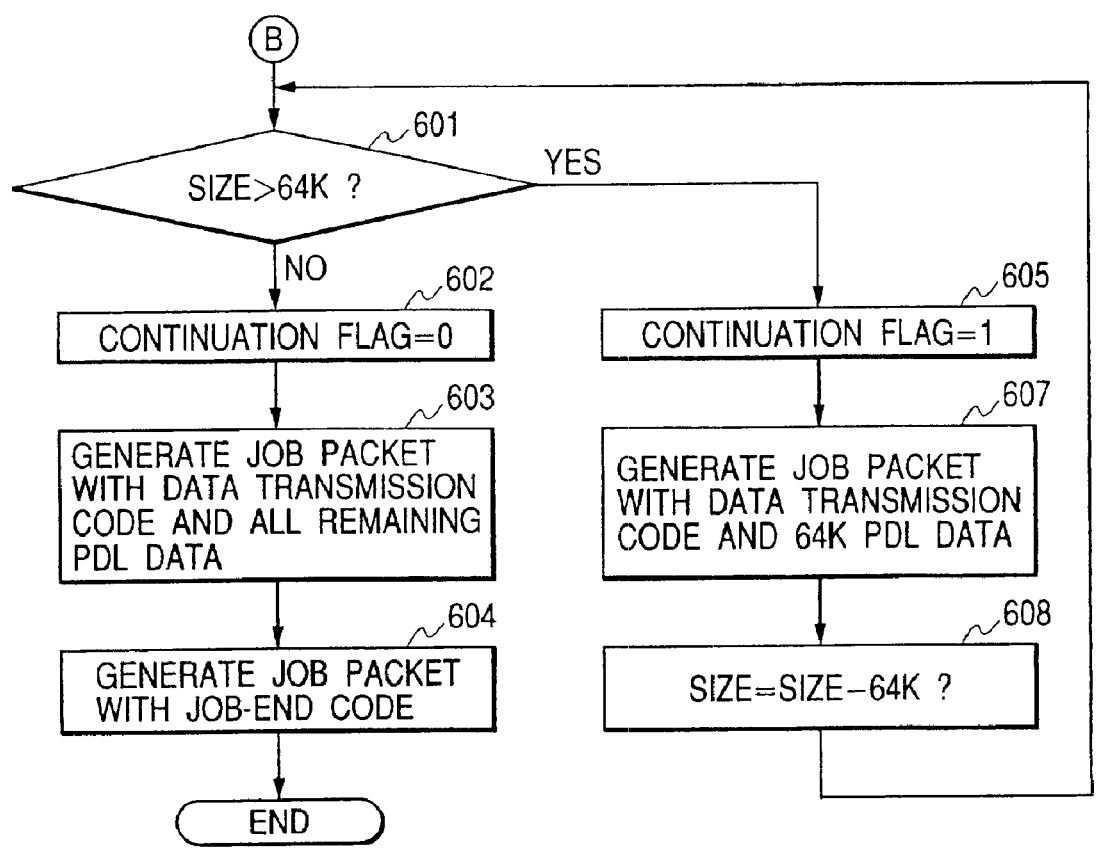
FIG. 6 is a flowchart showing the operation of the job packet generator.

Next the job packet generator 207 of the host computer is explained. FIGS. 5 and 6 are flowcharts showing the operations of the job packet generator 207. When print is selected in the application 201, first the printer driver starts, and then the job packet generator starts after the printer driver 402 finishes storing print data in the output buffer 403.

First, in step 501 it is determined whether the print job was designated for interrupt, suspend, or promote. Interrupt is designated when the user designates interrupt print on the property screen of the user interface of the printer driver 202. Suspend is designated when the user designates print job suspend on the property screen of the user interface of the printer driver 202. Promote is designated when the user designates promote print on the property screen of the user interface of the printer driver 202.

When there is an interrupt designation, the operation mode is set at 0x04 in step 502. When there is a suspend designation, the operation mode is set at 0x05 in step 503. When there is a promote designation, the operation mode is set at 0x03 in step 509. If there is no interrupt, suspend, or promote designation, the operation mode is set at 0x01 in step 510.

Next, in step 504, the job packet which stores the job-start code (=0x0201) in a range for storing the operation code is sent to the logic channel controller 206. At this time, the value showing the operation mode is set in the data section of the job packet, and the print job is designated as a normal job, an interrupt print job, a suspend print job, or a promote print job.

Afterwards, all operations until the job-completion operation is issued are used in the setting of the job information of the print job.

In step 505 the job name is set. the job-attribute setting operation code (0x0202) is stored in the range for storing operation codes, a job packet is generated by storing the job-attribute ID (=0x0101) showing the job name and the job name that will be the job attribute value in the data section, and this job packet is issued to the logic channel controller 206.

In step 506, the job owner is set. The job-attribution setting operation code (0×0202) is stored in the range for storing operation codes of FIG. 4, a job packet is generated by storing the job attribute ID (=0×0103) showing the job owner and the owner name that will be the job attribute value in the data section, and this job packet is issued to the logic channel controller 206.

In step 507, the job size is set. The job-attribution setting operation code (0×0202) is stored in the range for storing operation codes of FIG. 4, a job packet is generated by storing the job attribute ID (=0×016a) showing the job size and the job data size that will be the job attribute value in the data section, and this job packet is issued to the logic channel controller 206.

In step 509, the address for the job completion notice of the print job is set. Job completion is when the last page of the print job has been ejected. The job-attribution setting operation code (0×0202) is stored in the range for storing operation codes of FIG. 4, a job packet is generated by storing the job attribute ID (=0×0002) showing the address for the notice and the address for the job-completion notice that will be the job attribute value in the data section, and this job packet is issued to the logic channel controller 206.

The address for the notice is usually the transmission address of the host computer that sent the print job. If the sending source is a local interface using 1284.4 and the socket ID is 0×10, the address will be "1284.4:0×20", and if the sending source is a TCP/IP IP address of 172.16.1.1 and the port number is 0×b9b9, then the address will be "TCP/IP:172.16.1.1:0×b9b9."

In step 508 the byte size of the PDL data that should be sent is substituted for the variable "size."

In step 601, the size of the variable "size" is checked and compared to 64K. The size of the data that can be stored in the data section of a single job packet is limited to a maximum of 64K bytes because the parameter length of the packet header is expressed as 16 bits. As a result, any excess data is divided among multiple job packets and issued.

If the size of the PDL data is greater than 64K, in step 605 a continuation flag of the packet header of FIG. 5 will be set at 1 and in step 607, the PDL data transmission operation (0×0204) is stored in the range for storing operation codes in FIG. 5, a job packet is generated by taking 64K bytes of PDL data from the output buffer 403 and storing it in the data section, and this job packet is issued to the logic channel controller 206. In step 608, the 64K portion sent is decreased by "size" and the process returns to the branch at step 601.

In step 601, when the variable "size" expressing the size of the PDL data is less than 64K, transmission of all of the PDL data is completed in the job packet having a PDL data transmission code for a single time. In this case, in step 602, the continuation flag of the packet header of FIG. 4 is set at 0, the transmission of the PDL data is set as the final step, and in step 603, the PDL data transmission code (0×0204) is stored in the range for storing operation codes in FIG. 4, a job packet is generated by taking all of the PDL data remaining in the output buffer 203 and storing it in the data section, and issuing this job packet to the logic channel controller 206.

Finally, in step 604, a job packet is generated by storing the job-completion code (0×0205) in the range for storing operation codes in FIG. 4, the job packet is issued to the logic channel controller 206, and the process is completed.

Next, the job pre-processor 303, which receives the job packet, is explained.

Figure 7:
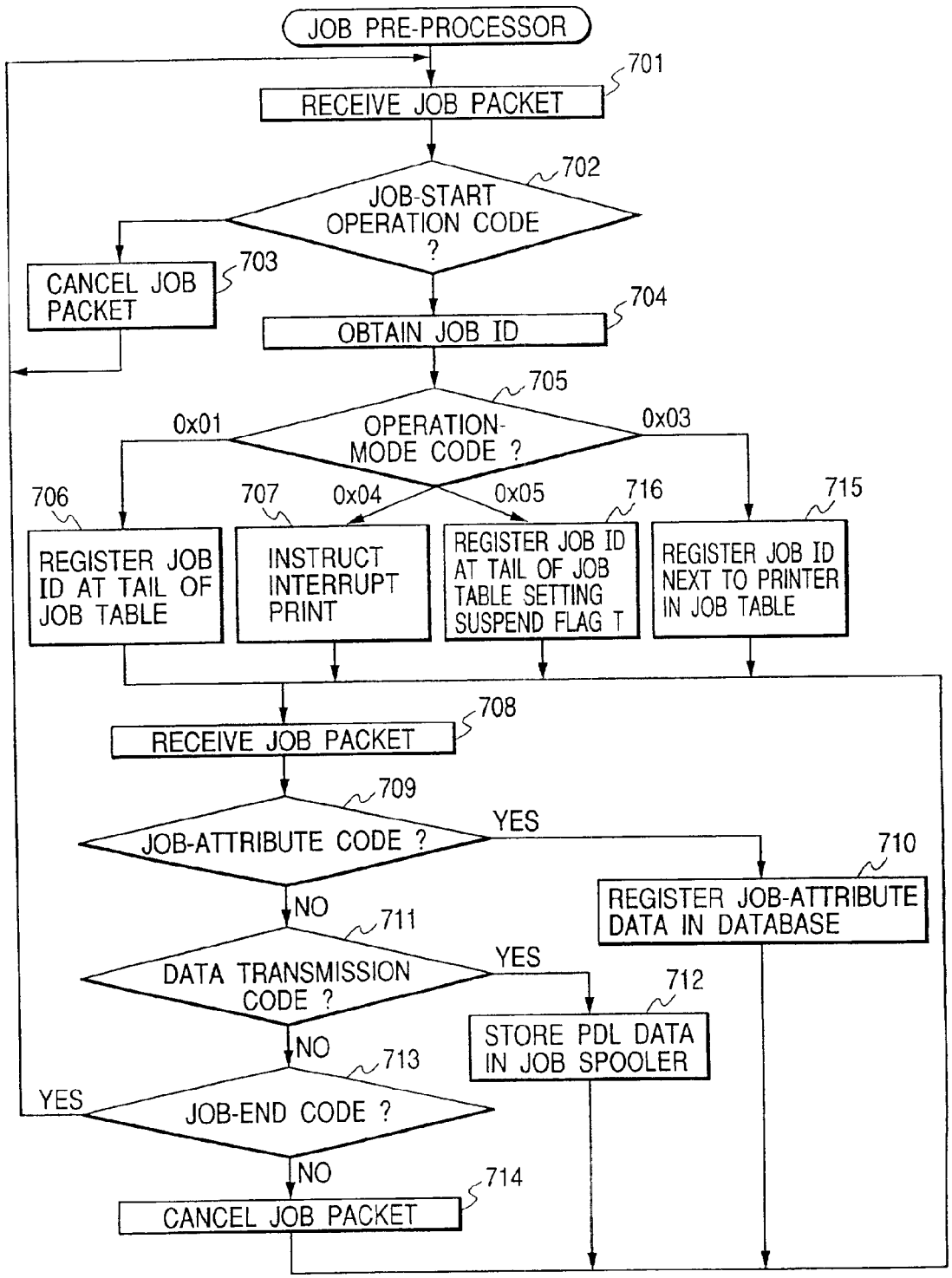
FIG. 7 is a flowchart showing the operation of the job pre-processor 303.

FIG. 7 is a flowchart showing the operation of the job pre-processor 303. In FIG. 7, the job pre-processor 303 is started when the printing apparatus 300 starts, and continues processing until power off of the printing apparatus 303 thereafter.

First, in step 701, the job packet is received. When the job packet is received, in step 702, it is determined whether or not the operation code of the job packet is a job-start operation code. If a job packet is received that has an operation code other than a job-start operation code, this is an illegal operation and the job packet is cancelled in step 703.

If it is determined that the operation code is a job-start code, in step 704, the job ID of the print job is obtained. The job ID is issued inside the printing apparatus 300 and is allocated as a 2 byte number and used as a key for reading and writing job information in the database 305.

Next, in step 705, it is determined what the operation mode is to be by checking the operation mode code stored in the data section of the job packet.

If the operation mode code is 0×01, in step 706 the job ID of the print job is registered (added) to the job table 313. At this time, the print job is added to the tail end of all print jobs with suspend flags of F after confirming the suspend flag of the last job table.

If the operation mode code is 0×04, in step 707, an instruction for interrupt print of the print job is sent to the interrupt processor 312. At this time the job ID obtained in step 704 is also sent to the interrupt processor 312.

If the operation mode code is 0×05, in step 716 the job ID of the print job is registered in the job table 313. However, because this print job is a suspend print job, its job ID is added to the tail end of the job table 313 and its suspend flag is set to T.

If the operation mode code is 0×03, in step 715 the job ID of the print job is registered in the job table 313. However, because this print job is a promote print job, it is registered next after the job ID indicated by the pointer of the job table 313, to be explained later. If the pointer 801 is not pointing at any print job, it is inserted at the head of the job table 313.

Next, in step 708, the next job packet is received.

In step 709, it is determined whether or not the operation code of the job packet received next is a job-attribute code. If it is a job-attribute code, in step 710 it is registered as job information of the print job in the database 305. At this time, the attribute ID and the attribute data (attribute value) stored in the data section of the job packet and the job ID obtained in step 704 are keys.

When job-attribute setting (job information registration) is complete, the process returns to step 708 in order to receive the next job packet.

In step 711, it is determined whether or not the operation code of the job packet received is a PDL data transmission code. If it is a PDL data transmission code, in step 712 the PDL data is stored in the job spooler 304. At this time, the PDL data is stored with the job ID obtained in step 704 as the key, and when it is time to retrieve the PDL data it can be retrieved with the job ID as the key. Otherwise, a link can be formed between the job ID and the PDL data in the job spooler 304 and the PDL data is stored. In order to receive the next job packet when addition to the job spooler 304 is complete, the process returns to step 708. If the operation code was not a PDL data transmission code it proceeds to step 713.

In step 713, it is determined whether or not the operation code of the job packet is a job-end code. If it is a job-end code, the process returns tot he initial status of step 701 skipping one loop.

If the operation code of the job packet does not correspond to any operation code, it is determined that this is an illegal job packet and the job packet is cancelled in step 714.

Through the above operations, the job pre-processor 303 allocates the job information of the job packets to the database 303 and the PDL data of the job packets to the job spooler 304.

Figure 15:
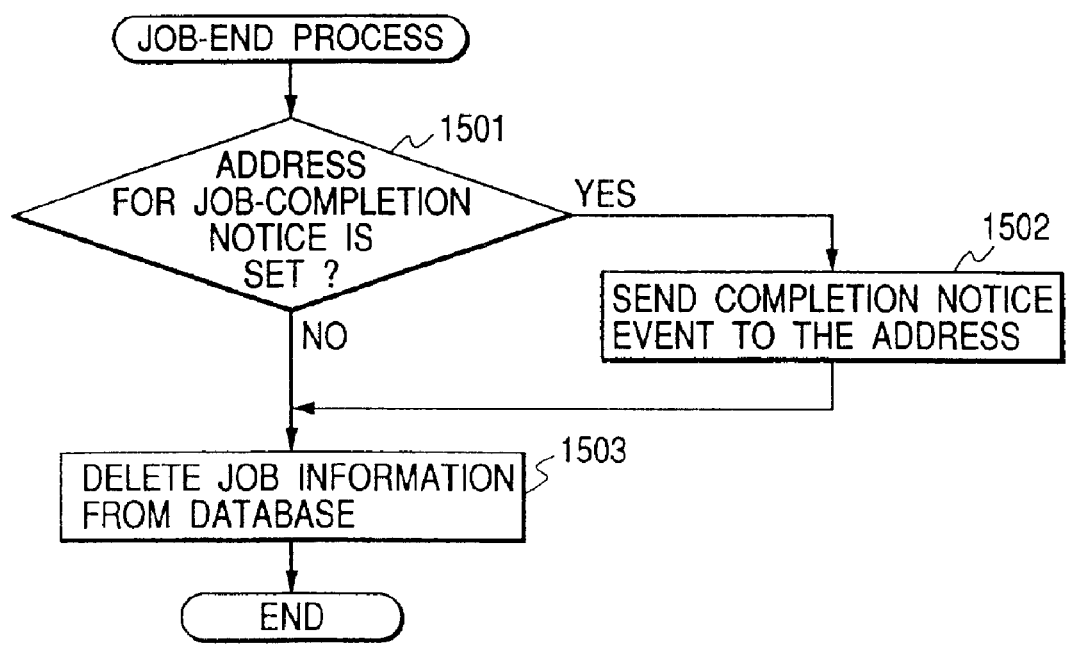
FIG. 15 is a flowchart showing the processes during job-completion notice.
Figure 16:
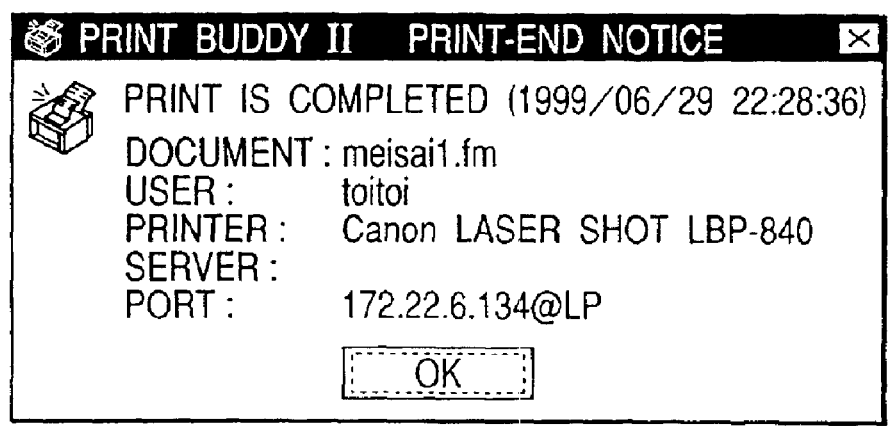
FIG. 16 is a diagram showing a user interface displaying job-completion notification.

Next, the job-completion notification process performed by the information manager 310 is explained. FIG. 15 is a flowchart showing the operations of the job-end process performed by the information manager 310. First, in step 1501, it is determined whether or not a job-completion notification address has been set by checking the job attributes of the print job in the data base 305 for the print job for which ejection of the final page has been completed.

Normally, the job packet generator 207 generates a job packet having a notification address in step 509 of FIG. 5, so that the answer in step 1501 is yes. If so, in step 1502 a completion notice event is sent to the address. The completion notice event has a packet construction as shown in FIG. 4, identical to the job packet. However, the operation code of the completion notice event is 0×000a and the reply transmission bit and the notice flag bit are 1. The event ID (=0×0008) indicating job completion and the bin number of the eject bin into which the paper was ejected if the printing apparatus 300 has multiple ejection bins are stored in the data section.

When the completion notice even is received, the utility 205 displays a pop-up dialog and informs the user that printing of the print job is complete using the graphic user interface.

Following is an explanation of the utility 205. The utility 205 is used by the user to perform such operations as display of the print job list and attributes, cancellation of a print job, designation of an interrupt print job, designation of a suspend or resume print job, and designation of a promote print job.

The operations performed by the utility 205 are realized by transmitting management packets between the host computer 200 and the printing apparatus 300 via management channels. Management packets, like job packets, have the data structure shown in FIG. 4. The contents of each information of the packet headers for bytes 0–11 are also the same as in job packets. However, the operation codes differ as follows.

0×010b:cancel print job
0×0123:interrupt print job
0×010d:obtain print job list
0×0120:suspend print job
0×0121:resume print job
0×0022:promote print job
0×0105:set attributes
0×0106:obtain attributes
0×0110:stop printing apparatus
0×0111:resume printing apparatus
0×011a:reset printing apparatus.

Management packets, as opposed to job packets, are each used for individual purposes.

When the utility 205 wants to know what print job has been sent to the printing apparatus 300, it sends a management packet having the operation code (0×010d) for obtain print job list along a management channel. An object ID=0×0102 showing the print job class of the object desired is stored in the data section. Thus, this management packet is sent to the information manager 310 via the logic channel controller 206, the I/F driver 204, the interface 210, the interface 311, the I/F driver 301, and the logic channel controller 302.

The information manager 310 confirms from the operation code of the management packet received that it is an obtain print job list code, obtains the list information of the print job stored in the database 305 and replies with a reply packet that holds the list information. The number of print jobs and a list of job IDs of each print job confirmed by the printing apparatus 300 is stored in the data section of the reply packet.

If each print job has a job name, owner, and size information due to job attribute setting operations, the utility 205 can obtain detailed information concerning the print jobs. To do so, after obtaining the print job list, the utility 205 sends a management packet having an operation code (=0×0106) for obtain attributes to the printing apparatus. the job ID of the print job desired and the attribute ID of the attribute desired is designated in the data section of the management packet. For example, if the job name of a print job with job ID 1 is desired, the job ID is set at 1 and the attribute ID is designated 0×0101.

The information manager 310 confirms from the operation code of the management packet received that it is for obtain attribute, obtains the attribute of the attribute ID designated of the designated job ID from the database 305, and replies with a reply packet that has that value stored in it.

Figure 14:
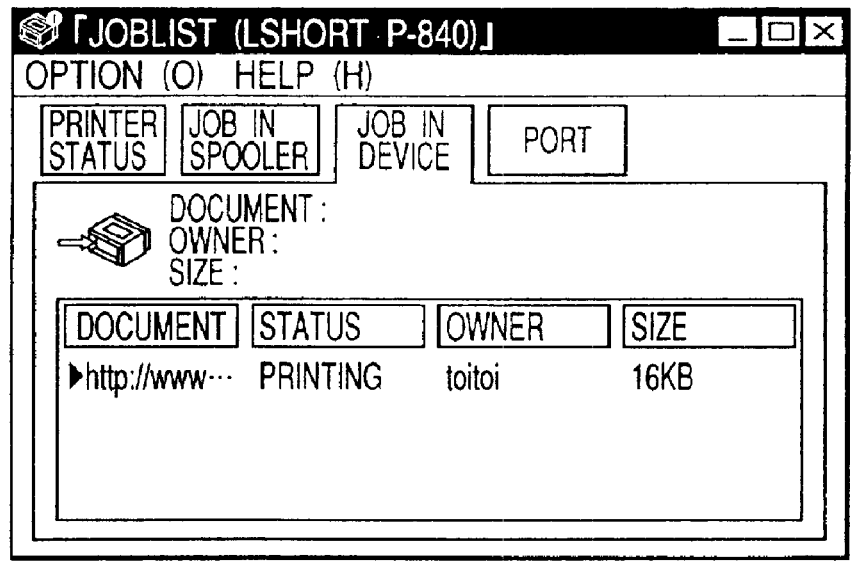
FIG. 14 is a diagram showing one example of a user interface displaying a job list.

FIG. 14 shows the user interface of the job list display of the utility 205. In FIG. 14, the job list is displayed in an "LSHOT P-840" printing apparatus. Here only one print job exists in the printing apparatus.

The utility 205 issues a management packet having an operation code for obtain print job list of the print job, obtains the print job list, issues a management packet having an operation code for obtaining an attribute of the print job for each of the print jobs on the print job list and obtains the attributes of each print job, and displays this information.

In FIG. 14, there is one print job with job name [http://www . . . ] and this print job is shown to be currently printing, to have an owner name of toitoi, and a size of 16 K bytes.

The user can perform additional operations with the user interface of FIG. 14. The user can press the right button on the mouse to move the cursor to the designated print job column displayed on the screen. When the user does so, a selection screen with "cancel print job," "interrupt print of print job," "suspend print of print job," "resume print of print job," and "priority print of print job" is displayed, and any of these items can be selected.

If the user selects "cancel print job," a management packet containing the operation code for cancel print job in which the job ID of the print job is stored in the data section is generated and sent to the printing apparatus 300.

If the user selects "interrupt print of print job," a management packet holding the operation code (=0×0123) for print job interrupt is sent to the printing apparatus 300. The job ID of the print job designated for interrupt is stored in the data section of this management packet.

If the user selects "suspend print of print job," a management packet holding the operation code (=0×0120) for print job suspend is sent to the printing apparatus 300. The job ID of the print job designated for suspend is stored in the data section of this management packet.

If the user selects "resume print of print job," a management packet holding the operation code (=0×0121) for print job resume is sent to the printing apparatus 300. The job ID of the print job designated for resume is stored in the data section of this management packet.

If the user selects "priority print of print job," a management packet holding the operation code (=0×0022) for priority print job is sent to the printing apparatus 300. The job ID of the priority print job is stored in the data section of this management packet.

Finally, the job table 313 is explained. FIG. 8 is an explanatory diagram of the job table. The PDL translator 306 selects the print job according to the processing order listed in the job table 313 and translates the PDL data of the selected print job.

In job table 8-1, print jobs with job IDs of 1 to 4 are registered. Thus, when the PDL translator 306 performs translation it will select print jobs in order from the top of the table, starting with the print job with job ID 1, to the print job with job ID 2, to the print job with job ID 3, and finally the print job with ID 4, and translate the PDL data of these print jobs.

When a print job with a job ID of 5 is added to the job table, the job pre-processor 303 adds the print job with job ID of 5 to the tail of the job table as shown in the job table of FIG. 8-2.

When the printer engine completes ejection of the last page of the print job with job ID of 1, the print job with job ID of 1 disappears from the table as shown in the job table of FIG. 8-3.

In the above manner the job table 313 is used to show the processing order of the print jobs for processing by the translator and to control the processing order of the print jobs.

A pointer 801 indicates for which print job the PDL translator 306 is reading and processing the PDL data. When the PDL translator 306 finishes translating all of the PDL data of a print job, the pointer 801 moves to indicate the print job following that print job. In FIG. 8, the PDL data of the print job with job ID 2 is being read by the PDL translator 306. When the PDL translator finishes translating all of the PDL data of the print job with job ID 2, the pointer 801 will next indicate the print job with job ID 3.

The suspend flag is a flag for indicating whether or not a print job has been suspended. When the suspend flag reads True (T), the print job is suspended, and when it reads False (F), the print job is not suspended. In the job tables in FIG. 8, there are no suspend print jobs and none of the print jobs with job IDs 1 to 5 are indicated for suspension.

Following, interrupt, suspend/resume, and promote processing are explained.

Interrupt

First, the interrupt process is explained.

When the job pre-processor 303 recognizes an interrupt print instruction for a print job in step 705 of FIG. 7, instructs the interrupt processor of the interrupt in step 715. At that time, it also notifies the processor of the job ID of the print job for interrupt.

Figure 9:
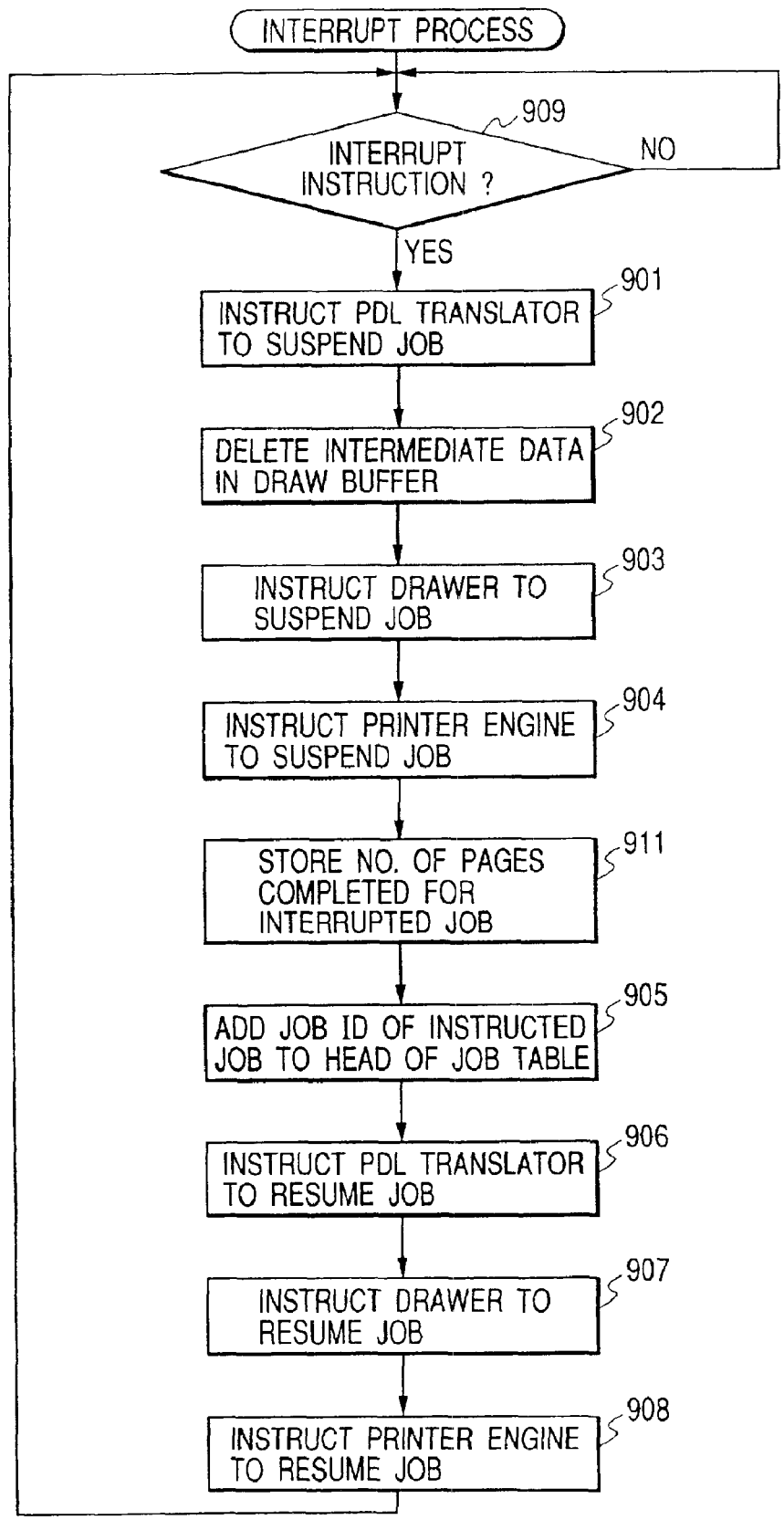
FIG. 9 is a flowchart showing the operation of the interrupt process 312.

FIG. 9 is a flowchart showing the operations of the interrupt processor 312. The interrupt processor 312 first determines whether or not there has been an interrupt instruction in step 909. If there has been an interrupt instruction, it instructs the PDL translator 306 to suspend processing of the print job it is presently processing in step 901. The PDL translator 306, so instructed, immediately suspends the translation it is currently performing.

Next, in step 902, if there is intermediate data in the draw buffer 307, this intermediate data is deleted. Deletion of the intermediate data does not mean the data is merely erased, it actually includes the invalidation of that intermediate data as well. In step 903, the processor instructs the drawer 157 to suspend processing. Then in step 904, the processor instructs the printer engine 309 to suspend processing. However, if the printer engine 309 is currently printing or ejecting, a print jam may occur if processing is suspended. Therefore, if printing of ejection is currently underway, suspension of those processes is not suspended.

Thus, in step 911, the processor obtains from the printer engine 309 the number of pages of the interrupted print job for which ejection has already been completed, and stores it in the database 305 as job information of the print job. This step may also be performed by the printer engine 309. If so, the printer engine 309 sends the number of pages of the interrupted print job for which ejection has already been completed to the information manager 310 when it receives the instruction to suspend processing from the interrupt processor 312, and the information manager 310 stores the information as job information for the print job in the database 305.

In step 905, the job ID of the instructed print job is added to the head of the job table 313. At this time, the pointer 801 moves to point at the job ID of this print job. It was notified of this job ID by the job pre-processor 303 along with the interrupt instruction. In this way, the next print job for processing in the job table 313 becomes the instructed print job.

In step 906, the PDL translator is instructed to resume processing. The PDL translator 306 then looks at the pointer 801 in the job table 313 and takes the PDL data from the job spooler 304 of the print job that the pointer 810 of the job table 313 is pointing at (in this case the instructed print job) and translates. In step 907 the drawer 308 is instructed to resume and finally in step 908 the printer engine is instructed to resume.

Figure 10:
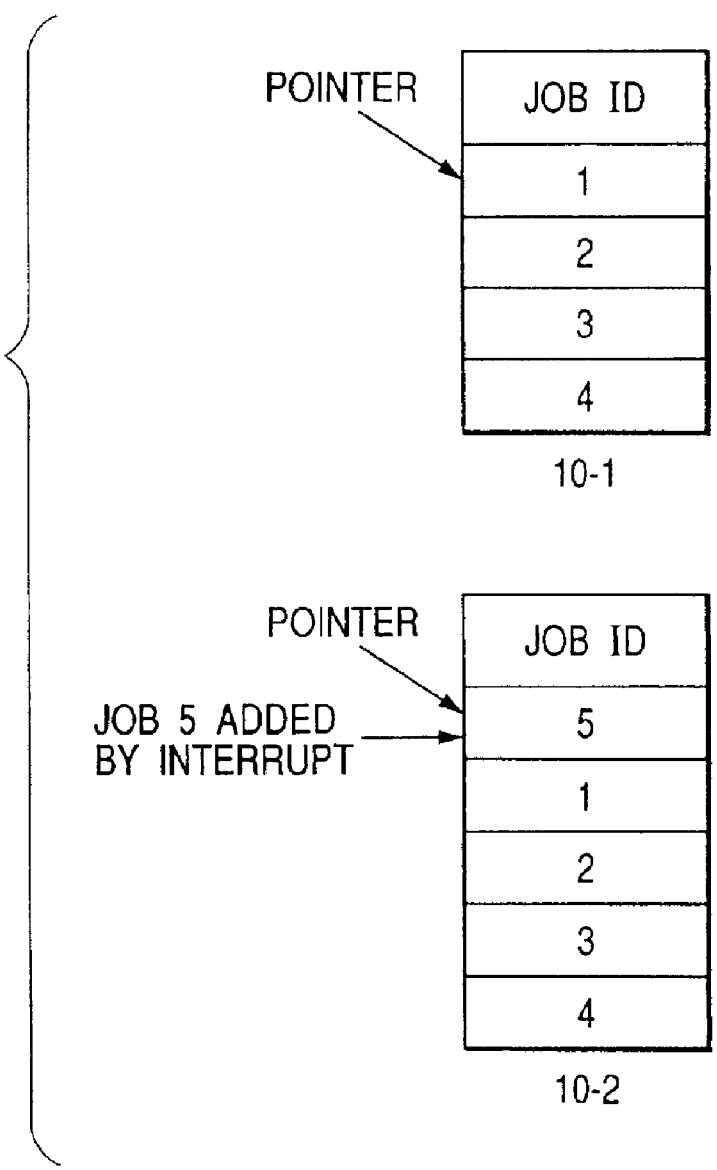
FIG. 10 is an explanatory diagram showing the status of the job table during an interrupt process.

FIG. 10 is an explanatory diagram showing the status of the job table 313 when an interrupt was instructed. In this figure, the suspend flags have been omitted. In job table 10-1, normal print jobs with job IDs 1–4 have been sent. The insertion of the instructed print job with job ID 5 will now be explained. When the interrupting print job with job ID 5 is sent, the interrupt processor 312 adds the print job with job ID 5 to the head of the job table in step 905 and the job table is altered to table 10-2.

Thus, the PDL translator 306 which has been instructed to resume, will translated the print jobs in the order of print job with job ID 5, print job with job ID 1, print job with job ID 2, print job with job ID 3, and print job with job ID 4 in order to translation the print jobs in the order listed in the job table.

If the print job with job ID 1 is in the middle of ejection given the job table 10-1, the number of pages for which ejection has been completed for the print job with job ID 1 is stored in the database 305 as job information for the print job. Then, when the print job with job ID 1 comes to the head of the job table again, translation is resumed on the PDL data of the print job by the PDL translator 306, but the drawer 308 skips drawing of the pages for which ejection is complete based on the information of the number of pages for which ejection was completed of the print job. In this way, when resumption of an interrupted print job is performed, the apparatus can avoid duplicating pages printed before interruption with pages printed after interruption, and can also avoid printing the same page twice.

Above, it was determined whether or not to perform an interrupt process by looking at the operation mode stored in the data section of the job packet having a job-start code. However, it is also possible to instruct an interrupt after the job has been sent as a normal job.

As described before, if the user selects "interrupt print" in the screen in FIG. 14, a management packet in which the operation code for interrupt print job (=0×0123) is stored is sent to the printing apparatus 300. The job ID of the print job for which interrupt is instructed is stored in the data section of this management packet.

The information manager 310 recognizes the print job interrupt instruction from the operation code of the management packet received, and instructs the interrupt processor to interrupt. The interrupt instruction in this case differs from the instruction coming from the job pre-processor in that the interrupting print job is not a new addition, but is a change to a print job already there. As a result, the process of the interrupt processor 312 is slightly different.

Figure 11:
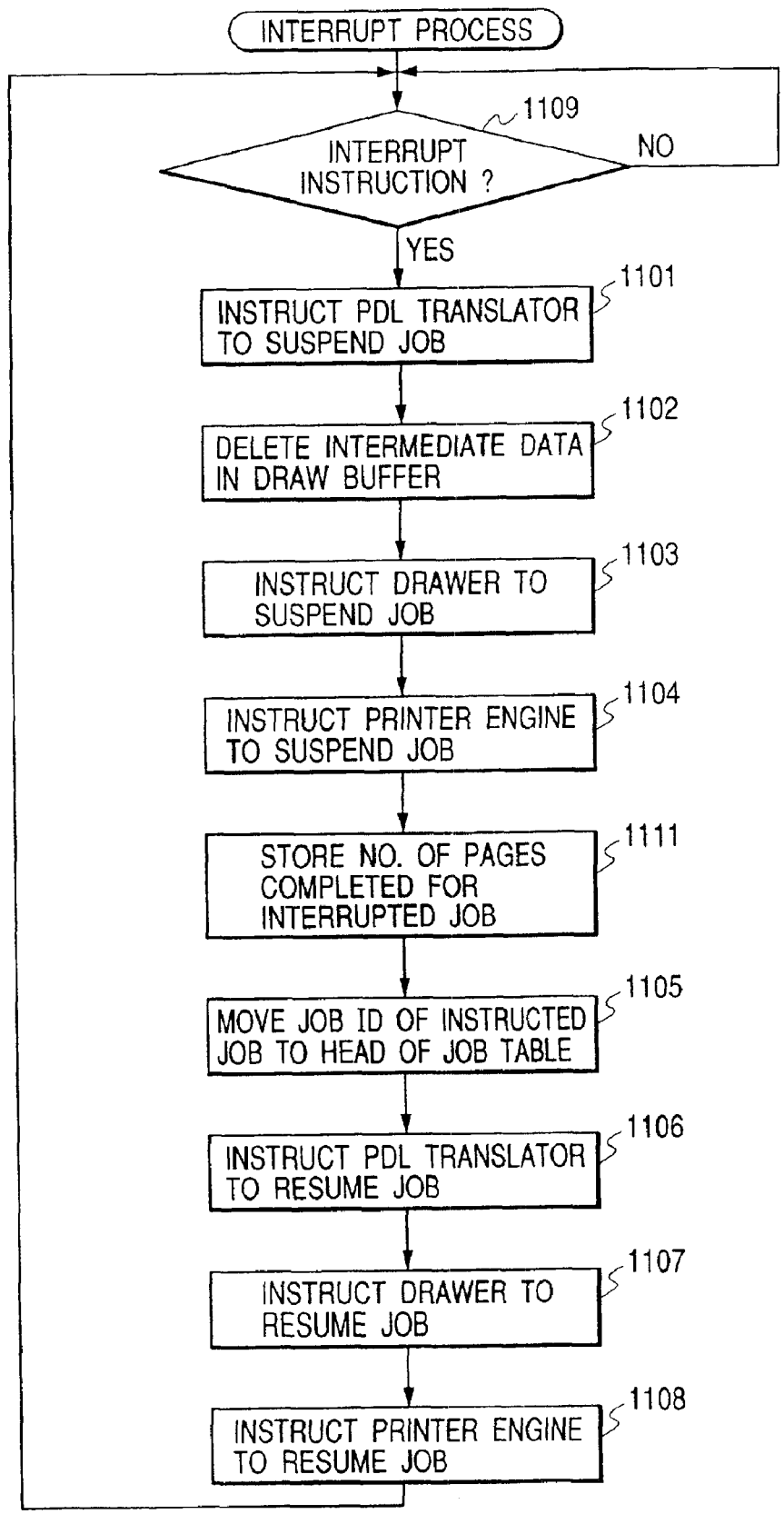
FIG. 11 is a flowchart showing the operation of the interrupt process 312.

FIG. 11 is a flowchart explaining the operation of the interrupt processor 312. This is almost the same as the flowchart of FIG. 9, but in step 1105 the job ID of the instructed job is moved from its original position to the head of the job table 313.

Figure 12:
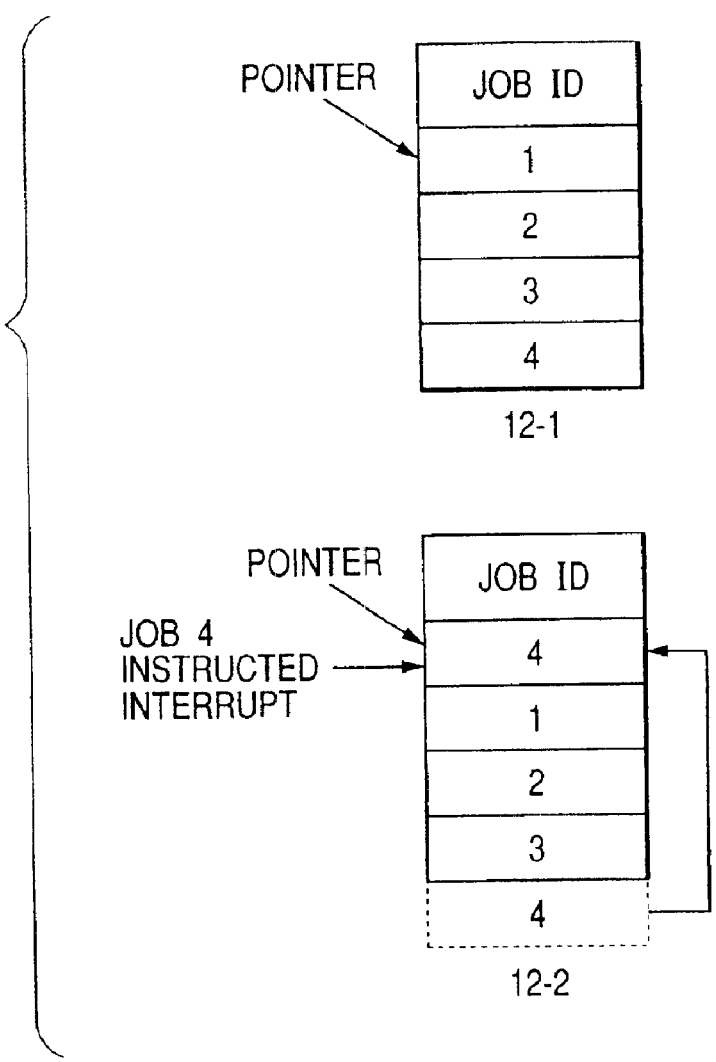
FIG. 12 is an explanatory diagram showing the status of the job table during an interrupt process.

FIG. 12 is an explanatory diagram showing the status of the job table 313 during this interrupt process. In job table 12-1, there are four normal print jobs with job IDs 1 to 4. The process when the print job with job ID 4 is instructed for interrupt from the utility 205 is explained. When the print job with job ID 4 is instructed for interrupt, the interrupt processor 312 moves the print job with job ID 4 to the head of the job table in step 1105 of FIG. 11 and the job table changes to FIG. 12-2.

Then, the PDL translator 306, which has been instructed to resume, translates the print jobs in the order of the print job with job ID 4, print job with job ID 1, print job with job ID 2, and print job with job ID 3 in order to translate the print jobs in the order listed in the job table.

If the print job with job ID 1 was in the process of ejection, the number of pages of the print job with job ID 1 is stored in the data base 305 as job information for the print job in step 1111 of FIG. 11. Then the print job with job ID 1 comes back to the head of the job table and translation of its PDL data begins by the translator 305, but the drawer 308 skips drawing of the pages for which ejection has been completed based on the job information of the number of pages of the print job for which ejection is complete. In this way, when resumption of an interrupted print job is performed, multiplication of the printed pages after interruption and the printed pages before interruption can be avoided and printing of the same page twice can be prevented.

Because the printed material (printed pages) of a print job instructed for interrupt are output after the pages of the interrupted print job which was suspended midway, when the remaining pages of the interrupted print job are output afterward they may end up being mixed with the printed material of the interrupting print job. This is called a mixing problem.

Therefore, because depending on the printing apparatus some have several ejection bins, by automatically changing the ejection port of the printed material of the interrupted print job and the ejection port of the printed material of the interrupting print job, mixing problems can be avoided.

Interrupt print has an effect of the interrupted print job and may cause the owner of the interrupted print job trouble. Therefore it is desired to limit the users who can perform interrupt. The method for limiting interrupt print is now described.

Figure 17:
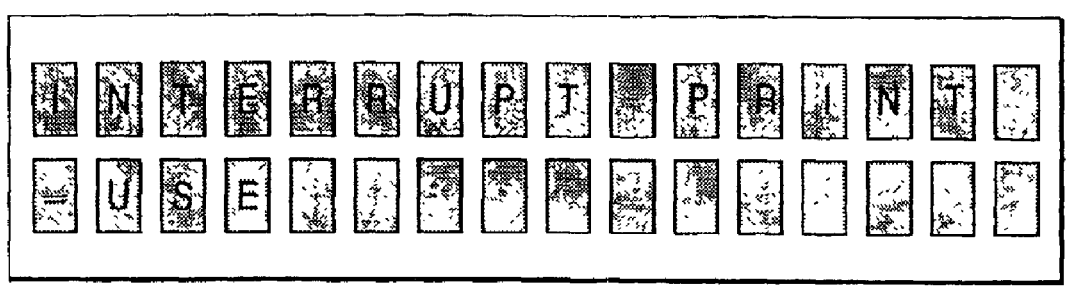
FIG. 17 is a diagram showing the operation panel of the printing apparatus.
Figure 18:
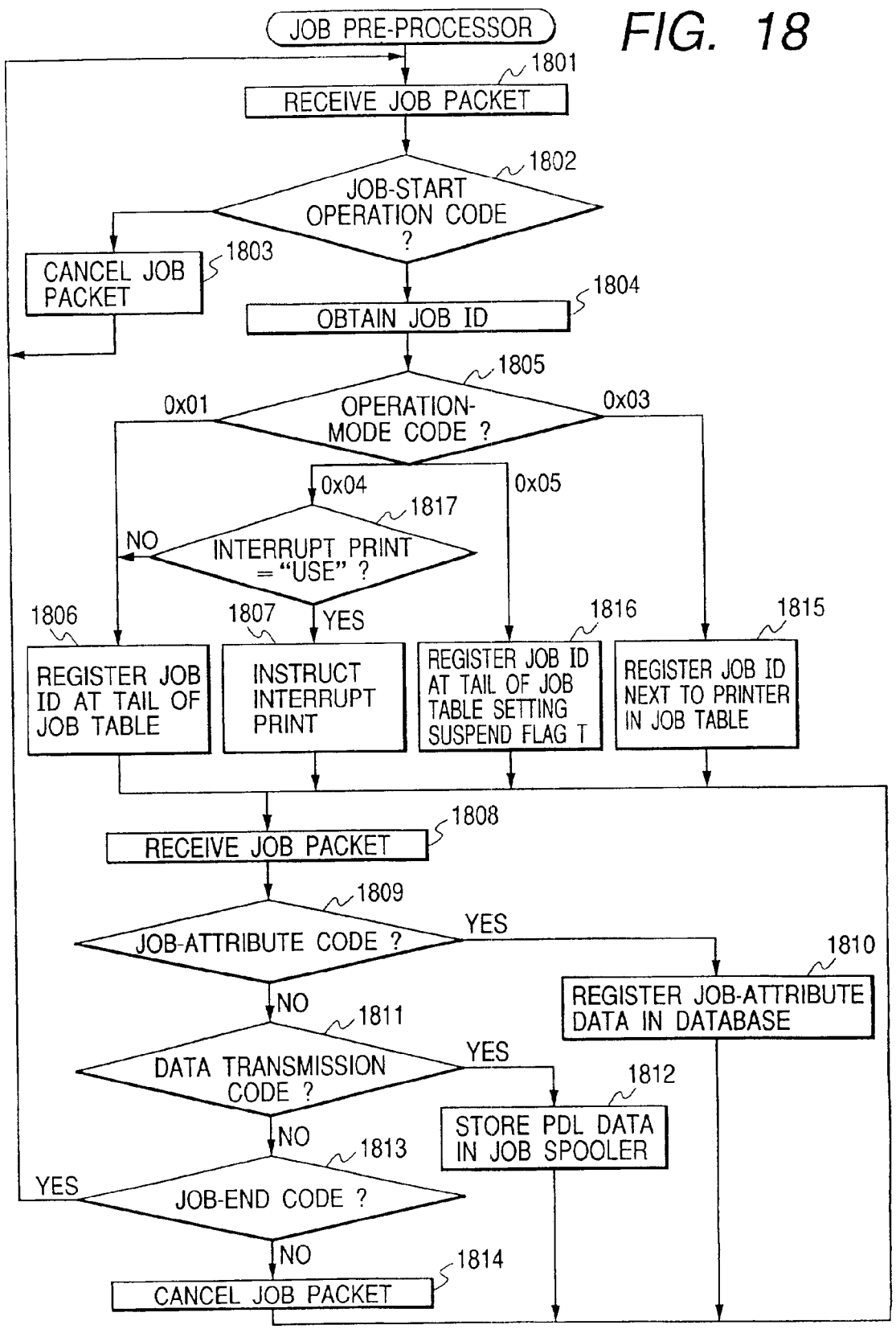
FIG. 18 is a flowchart showing the operation of the job pre-processor.

First, the method of setting a limitation for interrupt print at the operation panel 31 of the printing apparatus 300 is explained. FIG. 17 is a diagram showing the liquid crystal display (LCD) of the operation panel 314. In the printing apparatus 300, when a print job is not being printed, it is possible to change each type of environment variable by operating the operation panel 314. The user manipulates the operation panel 314 to display the Interrupt Print Menu as shown in FIG. 17. Then, by pressing the left and right keys on the operation panel 314, "Use" or "Not Use" can be displayed and the option displayed can be saved as a setting in the environmental variables. When the setting is "Use," interrupt can be performed, and when the setting is "Not Use," interrupt can not be performed. FIG. 18 is a flow chart showing the operation of the job preprocessor when limiting interrupt is considered. The point that differs from the flowchart of FIG. 7, is step 1817 in which it is determined whether or not the setting for the environmental variable "Interrupt Print" is "Use." If the setting is "Use" in step 1817, the job pre-processor issues and interrupt instruction. However, if the setting is "Not Use," no instruction is issued, and the processor proceeds to step 1806.

In this way, by setting the environmental variable at the operation panel, the printing apparatus can limit whether or not interrupt print can be performed.

Next, the method for allowing only, for example, the manager to interrupt print is explained. First, attributes for a manger user ID and password are set as attributes of the printing apparatus 300 and stored in the database 305. These are each optional figures that can be expressed in 2 bytes. These attributes are set from the utility 205 or the operation panel during installation of the printing apparatus 300.

Then, when a print job is sent to the printing apparatus 300, an interrupt instruction for the print job will be determined to be valid and the job preprocessor 303 will instruct the interrupt processor 312 to interrupt only in the case that the manager user ID and the manager password are identical to the user ID and the password (bytes 8–11 of FIG. 4) of the job packet having the job-start code.

If the manager instructs an interrupt at the printer driver 202, the pop-up dialog is displayed and entry of the user ID and password is sought. Then, these input values are used when a job packet is generated having a job-start code by the job packet generator 207 and stored in the range for storing the user ID and password of the job packet.

In this way interrupt instruction can be limited to certain users.

Next, a method for allowing certain other users other than the manager to perform interrupt print is explained. First, an attribute of a user ID and password list for which interrupt instruction are allowed is created and stored in the database 305. Changes to the attribute values of this attribute, for example additions of a user ID and password to the list, can be made by the manager from the utility 205 or the operation panel 315.

Then, if the user instructs an interrupt print from the printer driver 202, the pop-up dialog is displayed and input of a user ID and password is sought. Then, these input values are used when a job packet is generated having a job-start code by the job packet generator 207 and stored in the range for storing the user ID and password of the job packet.

When this print job is sent to the printing apparatus 300, interrupt print will be determined to be a valid instruction for the print job only if the user ID and password of the job packet (bytes 8–11) having a job-start code match a user ID and password on the list, and the job pre-processor 303 will instruct the interrupt processor 312 to interrupt.

In this way, interrupt print can be limited only to users who are approved for interrupt print.

Suspend/Resume

Next, the suspend/resume process is explained.

FIG. 19 is an explanatory diagram showing a job table for explaining the suspend/resume process. Print jobs with job IDs 1–4 are registered in job table 19-1.

The suspend flag is a flag for indicating whether or not there has been a suspend instruction for a print job. If the suspend flag reads True (T), that print job is suspended. If the suspend flag reads False (F), that print job is not suspended. In job table 19-1, the print jobs with job IDs 1–3 are not suspended, and the print job with job ID 4 is a suspend print job.

The PDL translator 306 selects print jobs in order from the top of the table when it performs translation and translates the PDL data of these print jobs. However, it will not select and translate the PDL data of a print job with a suspend flag reading T.

The job pre-processor 303 adds a print job with job ID of 5 to the tail end of the print jobs with suspend flags reading F as shown in job table 19-2 when a print job with job ID of 5 is added to the job table 313. In other words, it adds the print job with job ID of 5 between the print job with job ID of 3 and the print job with job ID of 4. The print job with job ID of 5 is not suspended and has a suspend flag reading F.

When the printer engine finishes ejecting the last page of the print job with job ID of 1, the print job with job ID of 1 is deleted from the job table as shown in job table 19-3.

When the job pre-processor recognizes that the operation mode of a print job is for suspend print, in step 716 of FIG. 7, it registers the job ID of that print job on the job table 313. However, because that print job is a suspend print job, it adds the job ID to the tail of the job table 313 and it sets the suspend flag of the print job to T.

Figure 21:
FIG. 21 is an explanatory diagram showing a job table.

FIG. 21 are explanatory diagrams showing the status of the job table 313 during a suspend print process. In job table 21-1 there are four print jobs with job IDs 1–4. Following the process when a suspend print job with job ID of 5 is added is explained.

When a suspend print job with job ID of 5 is added, the job pre-processor 303 adds the print job to the tail end of the job table after the print jobs with suspend flags reading F and sets the suspend flag of the print job to T. This is shown in the job table 212.

The PDL translator 306 translates the PDL data of the print jobs following the processing order of the job table (in the order of print job with job ID 1, print job with job ID 2, print job with job ID 3, and print job with job ID 4) until only the print job with job ID 5 that was instructed for suspension remains. The PDL data of this suspended print job with job ID 5 is translated by the PDL translator after a resume instruction is issued and the suspend flag becomes F.

So far, the process has been explained when a suspend print job is added, but it is possible to instruct print resume of this suspended print job afterwards.

Now the method of instructing a resume from the utility 205 is explained. When the user selects "Resume Print" in the user interface of FIG. 14, a management packet having a resume print code is sent to the printing apparatus 300. The job ID of the print job to be resumed is stored in the data section of this management packet.

The information manager 310 recognizes that this is a resume print job from the operation code of the received management packet and resumes print with the suspend/resume processor 315. At this time the job ID of the print job to be resumed is also sent to the suspend/resume processor 315. Then the suspend/resume processor 315 resumes according to the flowchart steps 2005–2008 of FIG. 20.

The processor determines whether or not to suspend print according to the operation mode stored in the data section of a job packet having a job-start code, but it is also possible to instruct a print suspend of a print job after it is sent as a normal job.

The method for performing a suspend instruction from the utility 205 is now explained. If the user selects "Suspend Print" in the user interface of FIG. 14, a management packet having an operation code for suspend instruction is sent to the printing apparatus 300. The job ID of the print job to be suspended is stored in the data section of this management packet.

The information manager 310 recognizes that this is a suspend print instruction for the print job from the operation code of the received management packet and instructs the suspend/resume processor 315 to suspend print. At this time, the job ID of the print job to be suspended is also sent to the suspend/resume processor 315. Then the suspend/resume processor 315 resumes according to the flowchart steps 2001–2005 of FIG. 20.

Figure 20:
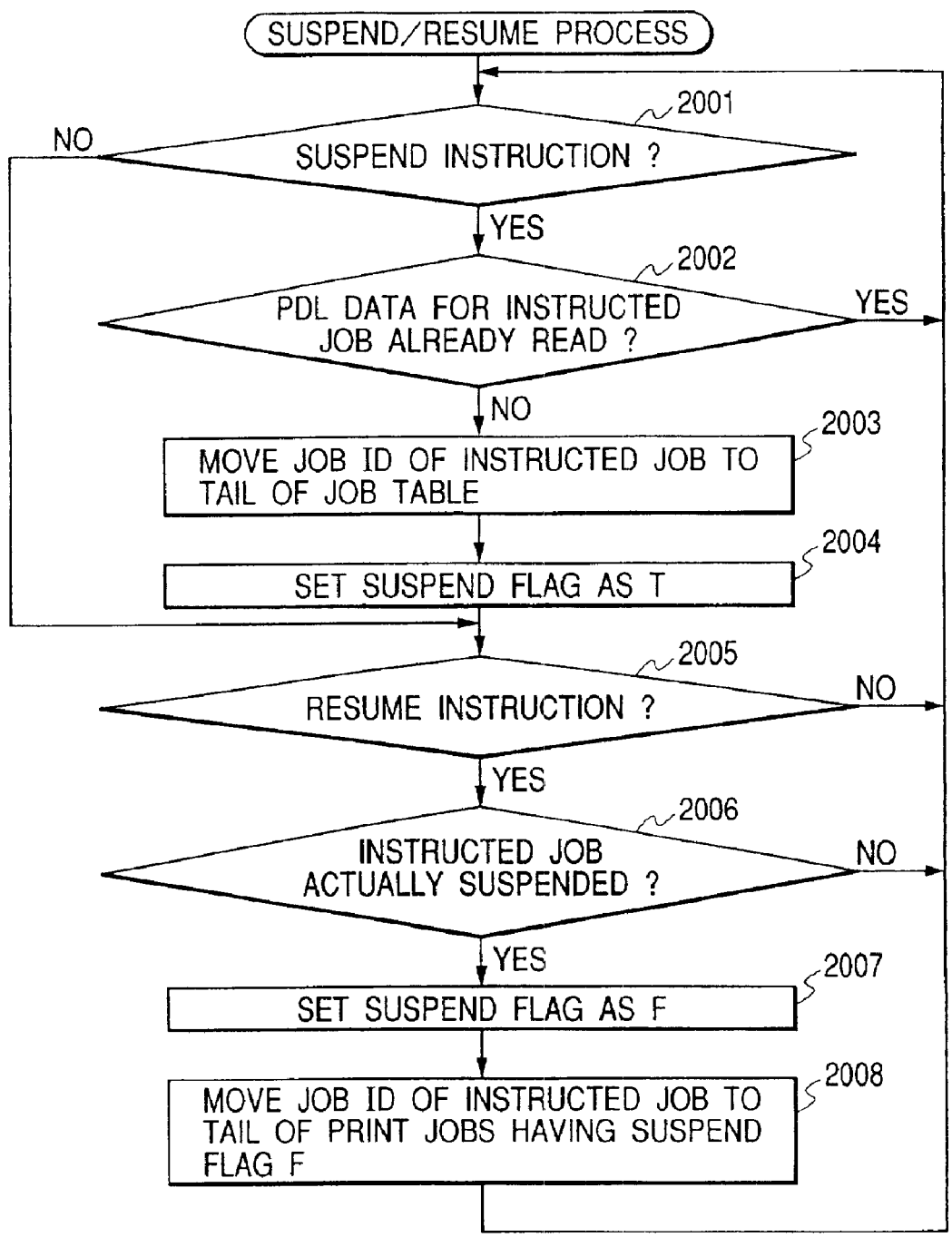
FIG. 20 is a flowchart showing the operation of the suspend/resume process.

FIG. 20 is a flowchart for explaining the operation of the suspend/resume processor 315 when a suspend or a resume instruction is sent from the information manager 310 to the suspend/resume processor 315. First, the suspend/resume processor 315 determines whether or not a suspend instruction was sent in step 2001. If there is no suspend instruction it proceeds to step 2005.

If a suspend instruction was sent, in step 2002 the processor determines whether or not the PDL data of the print job to be suspended has already been read. If the PDL data of the print job has already been read by the PDL translator from the job ID of the print job to be suspended sent from the information manager, the processor returns to step 2001 without suspending. This can be determined from which print job the pointer 801 of the job table 313 is indicating. In the job table, the print job above the print job indicated by the pointer 801 has already been read.

If the print job has not been read, in step 2003, job ID of the instructed job is moved to the tail of the job table 313. Further, the suspend flag of the print job is set at T in step 2004. In this way, the print job becomes a suspend print job and is not printed until a resume instruction is issued for the print job.

Next, in step 2005, it is determined whether or not a resume instruction was sent. If there is no resume instruction it returns to step 2001.

If a resume instruction was sent, in step 2006, the process checks to see if the print job to be resumed was actually suspended. This is determined according to whether the suspend flag in the job table reads T or F. If it was not suspended the process returns to step 2001.

If the print job to be resumed was suspended, in step 2007 the suspend flag of the print job to be resumed is set to F and in step 2008 the job ID of the print job is moved after the last print job with a suspend flag reading F.

Figure 22:
FIG. 22 is an explanatory diagram showing a job table.

FIG. 22 consists of three explanatory diagrams showing the status of the job table during a suspend process. In the job table 22-1, there are four normal print jobs with job IDs 1–4. Next the situation when a suspend instruction for the print job with job ID 3 is sent from the utility 205 is explained. When suspend is instructed for the print job with job ID 3, the suspend/resume processor 315 moves the print job with job ID 3 to the tail end of the job table in step 2002 of FIG. 21 (job table 22-2), and sets the suspend flag of the print job to T in step 2003. This yields job table 22-3.

The PDL translator 306 processes the print jobs in the order of job IDs 1, 2, and 4 in order to translate the PDL data of the print jobs in the order listed in the job table. The suspended print job with job ID 3 only remains. The PDL data of this suspended print job is then translated by the PDL translator after the suspend flag is set to F by a resume instruction.

In the above suspend process, the suspended print job was added to the tail of the job table 313, however there is also a method of setting the suspend flag to T without moving the position of the job within the job table. Because the PDL translator translates the PDL data of the print jobs with suspend flags reading F and skips over the print jobs with suspend flags reading T, in such a case also the suspended print jobs with suspend flags reading T remain. However, the selection process of the print jobs differs from that described above.

Figure 23:
FIG. 23 is an explanatory diagram showing a job table.

In other words, when a suspend print has been instructed for the print job with job ID 3 in the job table 23-1 of FIG. 23, if only the suspend flag is set to T and the order of the print jobs is not changed, the job table appears as shown in 23-1. Thus, when translation of the print job with job ID 1 is completed job table 23-3 results.

If a resume instruction is then issued for the print job with job ID 3, the suspend flag is set to F and the order of the jobs is not changed. Therefore job table 23-3 results.

In the earlier suspend process the print job instructed for suspend was added to the tail of the job table, but with this suspend process if a resume print instruction is immediately issued for the suspended print job printing is performed in an order close to the order when the suspend instruction was issued.

In the above suspend processes, it is difficult to tell from the outside of the printing apparatus 300 whether or not a suspended print job exists within the printing apparatus 300. Therefore there is a danger that the power of the printing apparatus will be shut off with suspended print jobs remaining. If so, PDL data remains in the job spooler 304 and the memory capacity of the job spooler 304 will be compressed. There is a danger that inconveniences such as the user issuing a reprint command because print was not perform will arise. For this reason the following process is performed during power off of the printing apparatus 300.

Figure 24:
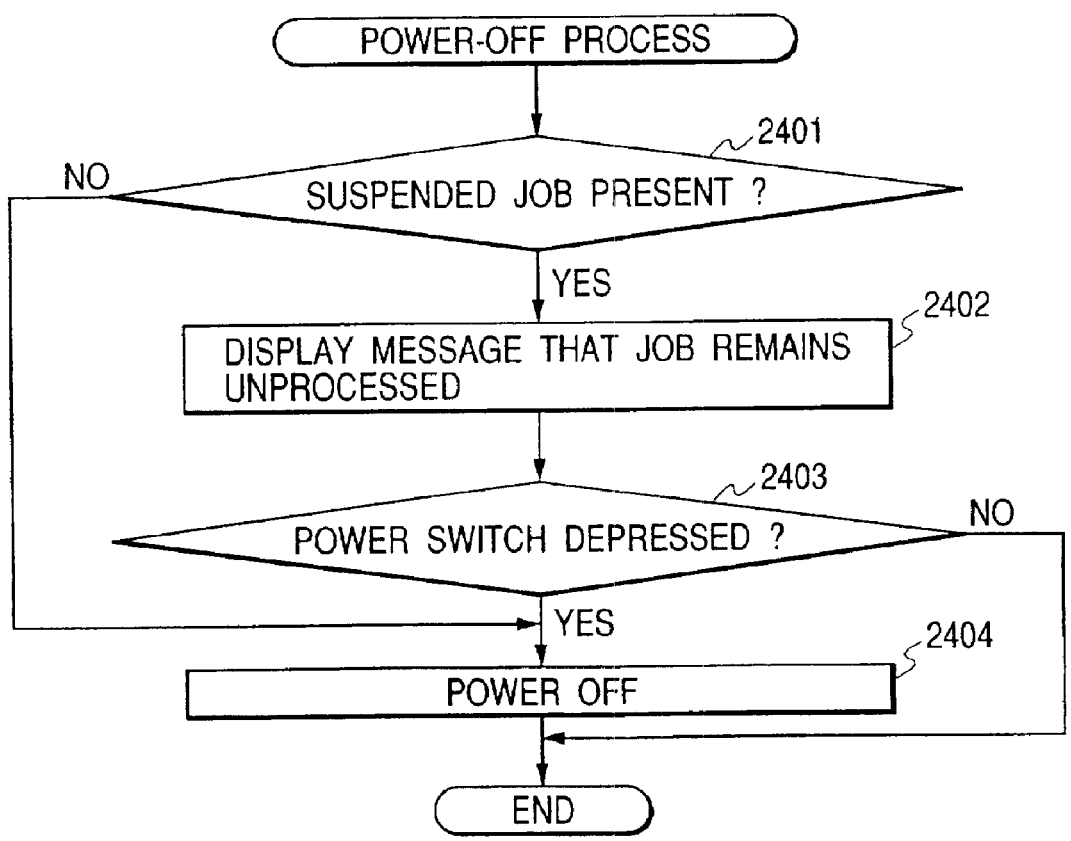
FIG. 24 is a flowchart showing the processes during power-off.
Figure 25:
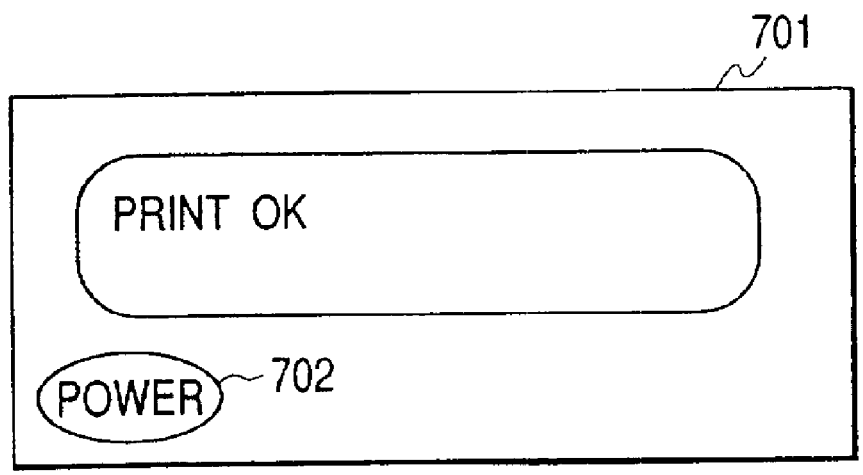
FIG. 25 is a diagram showing the display of the operation panel during power-off.
Figure 26:
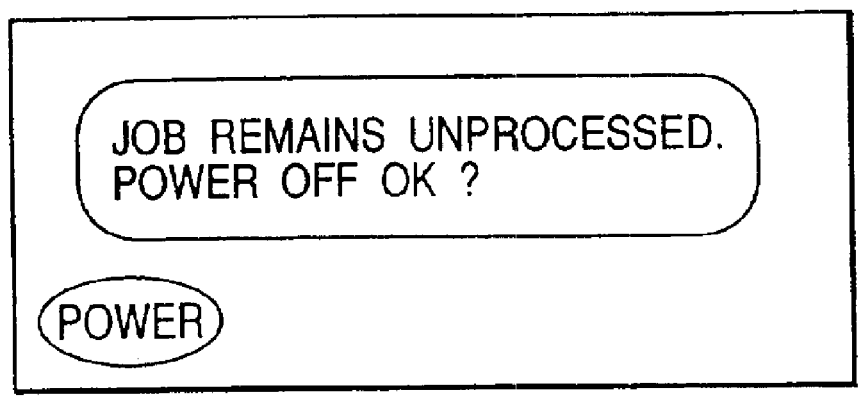
FIG. 26 is a diagram showing the display of the operation panel during power-off.

FIG. 24 is a flowchart showing the process during power off. FIGS. 25 and 26 are diagrams showing examples of the display of the operation panel 314. When the power switch in FIG. 26 is pressed the process in FIG. 24 begins. First, in step 2401 it is determined whether a suspended print job is present by checking the job table 313. If there is no suspended print job power-off is performed in step 2404 and the process is completed.

If there is a suspended print job, the fact that a suspended print job remains is displayed on the operation panel for a designated amount of time (for example, 5 seconds) in step 2402 as in FIG. 26. In step 2403 it is determined whether or not the power switch has been depressed. If the power switch has been depressed, power-off is performed in step 2404 and the entire process is completed.

However, if it is determined in step 2403 that the power switch has not been depressed, the entire process is completed without performing power-off (without shutting off power).

Above, a case in which the power switch of the operation panel 314 has been depressed is explained, however if the apparatus is such that power-off can be instructed from the utility 205 of the host computer 200 as well, a dialog screen such as in FIG. 26 can be displayed in the user interface of the host computer 200 according to the flowchart of FIG. 24.

Promote

Next, priority print (promote print) of a print job is explained.

As the translation of an interrupted print job in the interrupt print process is once again begun after resuming, the translation process is performed multiple times and there is the possibility that the total throughput of the printing apparatus 300 will be decreased by that amount.

Therefore, by raising the priority of the printing order of a designated print job by an amount that does not cause the suspension of any print job already being printed, it is possible to output a print job urgently without decreasing the total throughput of the printing apparatus 300.

The job pre-processor 303 registers the job ID of a print job designated as a promote print after the job ID of the print job indicated by the pointer 801 in the job table 313 in step 706 of FIG. 7 when it receives a promote print job. If the pointer 801 is not pointing at any print job the instructed print job is inserted at the head of the job table 313.

It is determined whether or not to perform a promote process according to the operation mode stored in the data section of a job packet having a job-start code, but it is also possible to instruct a promote print after sending a print job as a normal print job.

The method in which the user issues a promote instruction from the utility 205 is explained below. When the user selects "Promote Print" from the user interface in FIG. 14, a management packet having an operation code for promote print is sent to the printing apparatus 300. The job ID of the print job designated for promote is stored in the data section of this management packet.

The information manager 310 recognizes the promote instruction of the print job from the operation code of the received management packet and instructs the promote processor 316 of the promote print. At this time the job ID of the print job to be promoted is also sent to the promote processor.

Figure 27:
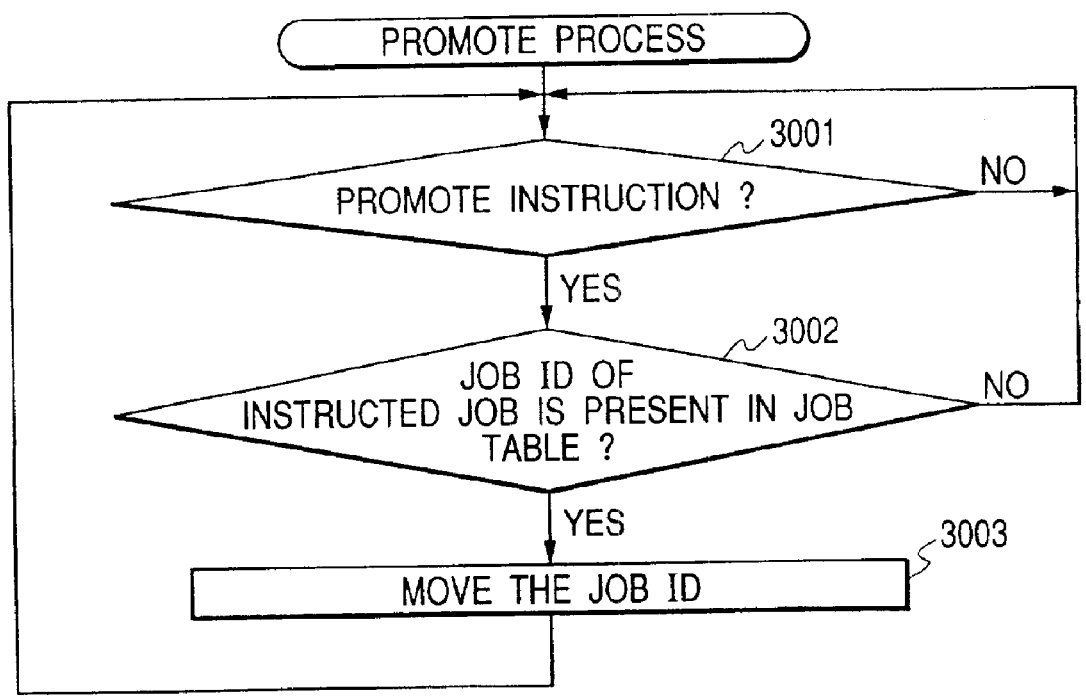
FIG. 27 is a flowchart showing the operation of the promote process.

FIG. 27 is a flowchart showing the operation of the promote processor 316. The promote processor 316 first determines if there has been a promote instruction in step 3001. If there is no promote instruction, it returns to step 3001 and waits for a promote instruction. A promote instruction is sent to the promote processor 316 from the information manager when a management packet having the operation code for promote print is received by the information manager. The job ID of the print job designated for priority print (this print job is called the promote print job) is stored in the data section of the management packet.

If there is a promote instruction in step 3001, it is determined whether or not the job ID of the print job designated for priority print exists in the job table 313 in step 3002. If it does not exist, the process returns to step 3001. If it does exist, in step 3003 the print job designated for priority print is inserted after the print job indicated by the pointer 801. In other words, it is inserted before the print jobs for which the PDL data has not yet been read by the PDL translator 306. If the pointer 801 is not pointing at any print job, the job is inserted at the head of the job table 313.

Figure 28:
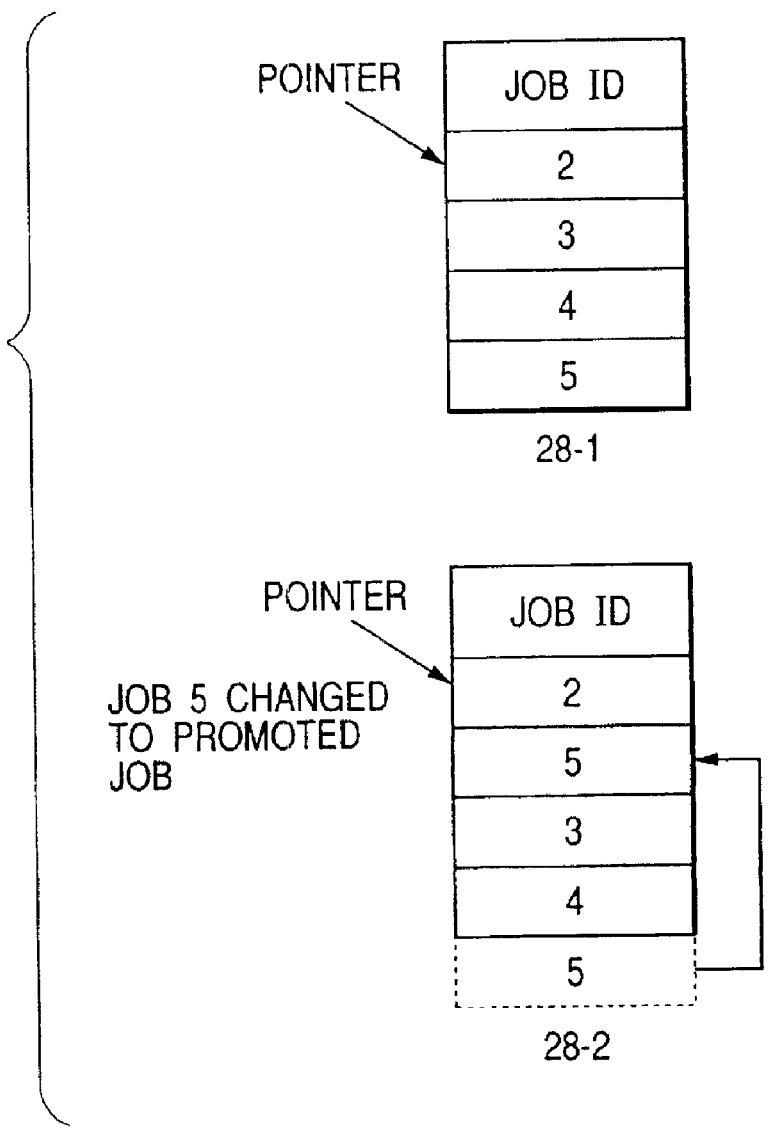
FIG. 28 is an explanatory diagram showing a job table.

FIG. 28 is an explanatory diagram showing two job tables for explaining the promote process. Suspend flags are omitted from these tables. The PDL translator 306 obtains the job ID indicated by the pointer in the job table, reads the PDL data linked to this job ID from the job spooler 304, and translates the data.

In the job table 28-1, the PDL translator 306 is translating the print job with job ID 2. When processing of the print job with job ID 2 is completed, the PDL data of the print job with job ID 3 will be translated if the status of the table remains the same. However, if the print job with job ID 5 is designated for promote print, there will be a substitution of job IDs and the table will read as in job table 28-2. Then, when processing of the print job with job ID 1 is completed, next the PDL data of the print job with job ID 5 will be translated and as a result the print job with job ID 5 will be printed before the print jobs with job IDs 3 and 4.

In this way, because promote print does not stop the analysis of the PDL data or the print process of any print jobs, a decrease in the total throughput of the printing apparatus can be prevented. However, because the print job is processed after the print job currently being translated, interrupt print is best suited when printing must be done immediately.

Interrupt Notification

Figure 39:
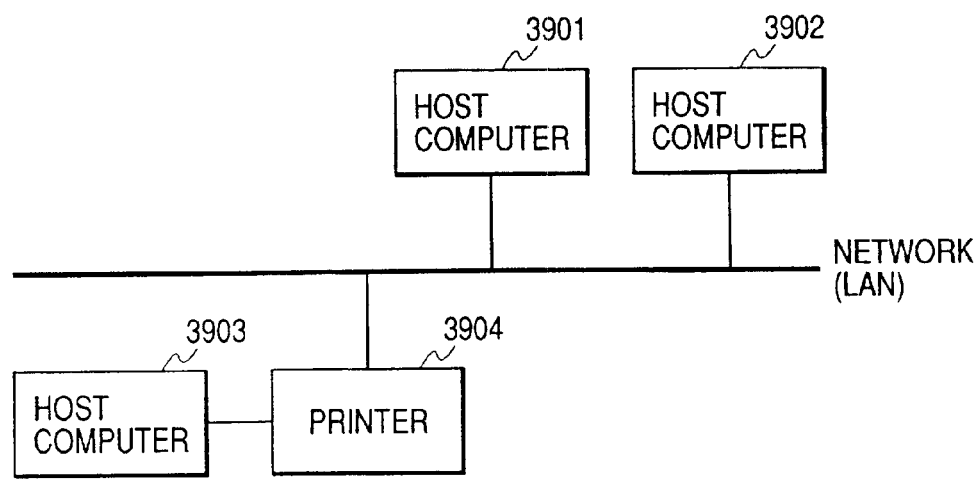
FIG. 39 is a diagram showing one example of the system with host computer and printing apparatus.

FIG. 39 is a diagram showing one example of the system in which the host computer and the printing apparatus are connected via a network or via a local cable. The host computers 3901, 3902, and 3903 are the same as the host computer 100 of FIG. 2. The printing apparatus 3904 is the same as the printing apparatus 300 of FIG. 3.

The host computer 3901 and the printing apparatus 3904 and the host computer 3902 and the printing apparatus 3904 are connected via a network. Thus, the host computer 3901 and the host computer 3902 each have network addresses. The host computer 3903 and the host computer 3904 are connected via a local cable such as a centronics interface or an SCSI interface.

FIG. 35 shows one example of a management table for managing the job information and the status of each print job sent from multiple host computers (host computers 3901, 3902, and 3903). This management table is stored in memory such as RAM 3610 as one portion of the database 305.

In FIG. 35, column 3501 shows the recognition number (job ID) of the print jobs. Column 3502 shows the status of each print job. Column 3503 shows the address at which the intermediate data either being output or waiting to be output is stored, generated from the PDL data of the print job. Column 3504 shows the address at which the current analysis information is stored if an interrupt was performed. Column 3505 shows the address at which the output information was stored if an interrupt was performed. Column 3506 shows the network address of the host computer that sent the print job.

FIG. 36 shows one example of the intermediate data stored in the draw buffer 307. In the draw buffer of this embodiment, the records are base units. In FIG. 36, 3601 is a range expressing the address of the following record. 3602 shows that the record expresses a rule. 3603 expresses the start coordinates of the rule and 3604 expresses the end coordinates of the rule. 3605 expresses the thickness of the line. The rule is rendered according to this information.

3606 is a range expressing the address of the following record, within the range of the address shown in 3601. 3607–3611 are records expressing characters. 3608 expresses the font name and the font pattern is confirmed by the font name. 3609 expresses the start coordinates. 3610 expresses the number of characters stored successively. 3611 shows the character code. The drawer 308 reads the pattern corresponding to the character code and renders the characters in order from the start coordinates.

3613–3616 express the records of a rectangle. In other words, the rectangle is rendered based on the start coordinates (3614), the end coordinates (3615), and the line thickness (3616).

The images on one page are rendered based on the collection of these records.

Figure 37:
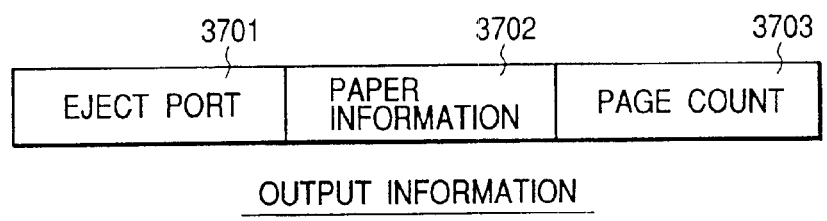
FIG. 37 is a diagram illustrating an example of output information.

FIG. 37 shows one example of output information. In FIG. 37, 3701 shows the ejection port during current ejection. 3702 shows the size of the paper and direction during ejection. 3703 shows the number of pages ejected by the printing process of the print job.

Figure 38:
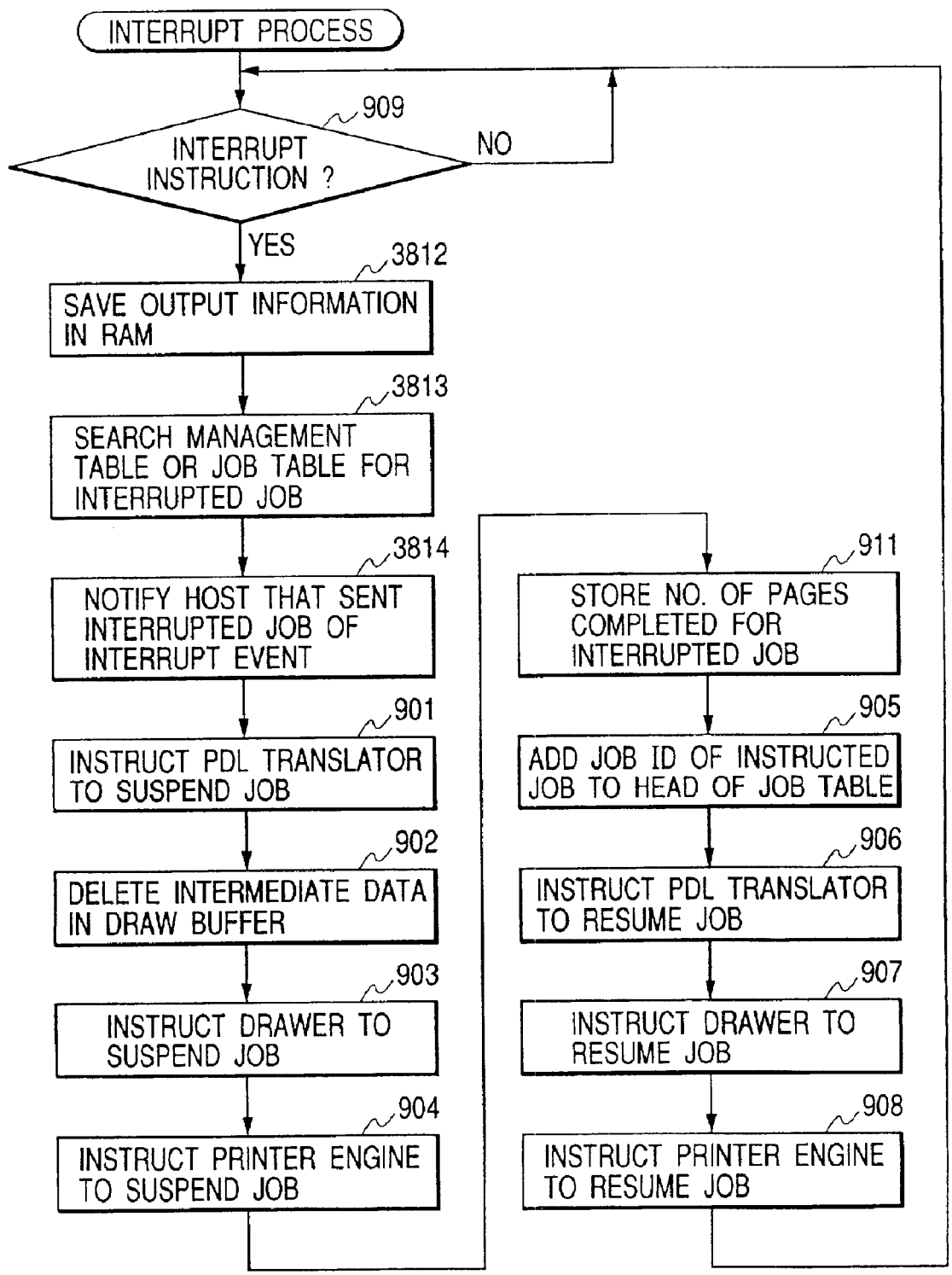
FIG. 38 is a flowchart explaining the operation of the interrupt process 312 when an interrupt notification is sent.

FIG. 38 is a flowchart explaining the operations of the interrupt processor when an interrupt notification is made. FIG. 38 is the flowchart of FIG. 9 with steps 3812–3814 added in order to perform interrupt notification. The interrupt processor 312 first determines in step 909 whether or not an interrupt instruction was made. If an interrupt was instructed it saves the output information shown in FIG. 37 in RAM in step 3812. Next, it searches for the interrupted job in step 3813. To be precise, it may search for the interrupted print job by checking the status of each print job in the management table or it can search for the interrupted print job by checking the job table 313.

In the management table in FIG. 35, the print jobs with job IDs of 1, 2, and 3 are the interrupted print jobs. In the job table of FIG. 10, the print jobs with job IDs of 1, 2, 3, and 4 are the interrupted print jobs.

In step 3814, it notifies the host computer that sent the interrupted print jobs that an interrupt has occurred. In the management table of FIG. 35, first the host computer that sent the print job with job ID 1 is sent a notification via a local cable because it is directly connected via a local cable. The host computers that sent the print jobs with job IDs 2 and 3 are sent notifications based on their network addresses stored in column 3506 of the management table of FIG. 35 because they are connected via a network.

In step 901, the processor instructs the PDL translator to suspend the print job currently being processed. The PDL translator so instructed immediately interrupts the translation it is currently performing.

Next, in step 902, the intermediate data is deleted if any intermediate data exists in the draw buffer 307. Deletion of the intermediate data is not merely the erasure of data but also includes actual invalidation of that intermediate data. In step 904, the printer engine is instructed to suspend processing. However, if the printer engine is currently printing or ejecting, there is the possibility of a jam resulting from suspending the process. Therefore, if the printer engine is currently printing or ejecting, these processes are not suspended.

Then, in step 911, the processor obtains the number of pages of the interrupted print job for which ejection has been completed from the printer engine 309 and stores this as job information for the print job in the database 305. This step can be performed by the printer engine 309 itself. If so, the printer engine 309 sends the number of pages of the interrupted print job for which ejection has been completed to the information manager 310 when it receives the suspend instruction from the interrupt processor 312 and the information manager 310 stores this information as job information of the print job in the database 305.

In step 905, the job ID of the instructed print job is added to the head of the job table 313. At this time the pointer 801 moves to point at the job ID of this print job. This job ID was sent along with the interrupt instruction from the job preprocessor 303. In this way, the print job that will be processed next in the job table 313 is the instructed print job.

In step 906, a resume instruction is sent to the PDL translator 306. The PDL translator 306 then looks at the pointer 810 of the job table 313 and translates taking the PDL data of the print job (in this case the instructed print job) indicated by the pointer 810 of the job table 313 from the job spooler 304. In step 907, a resume instruction is sent to the drawer 308 and finally in step 908 a resume instruction is sent to the printer engine.

Figure 40:
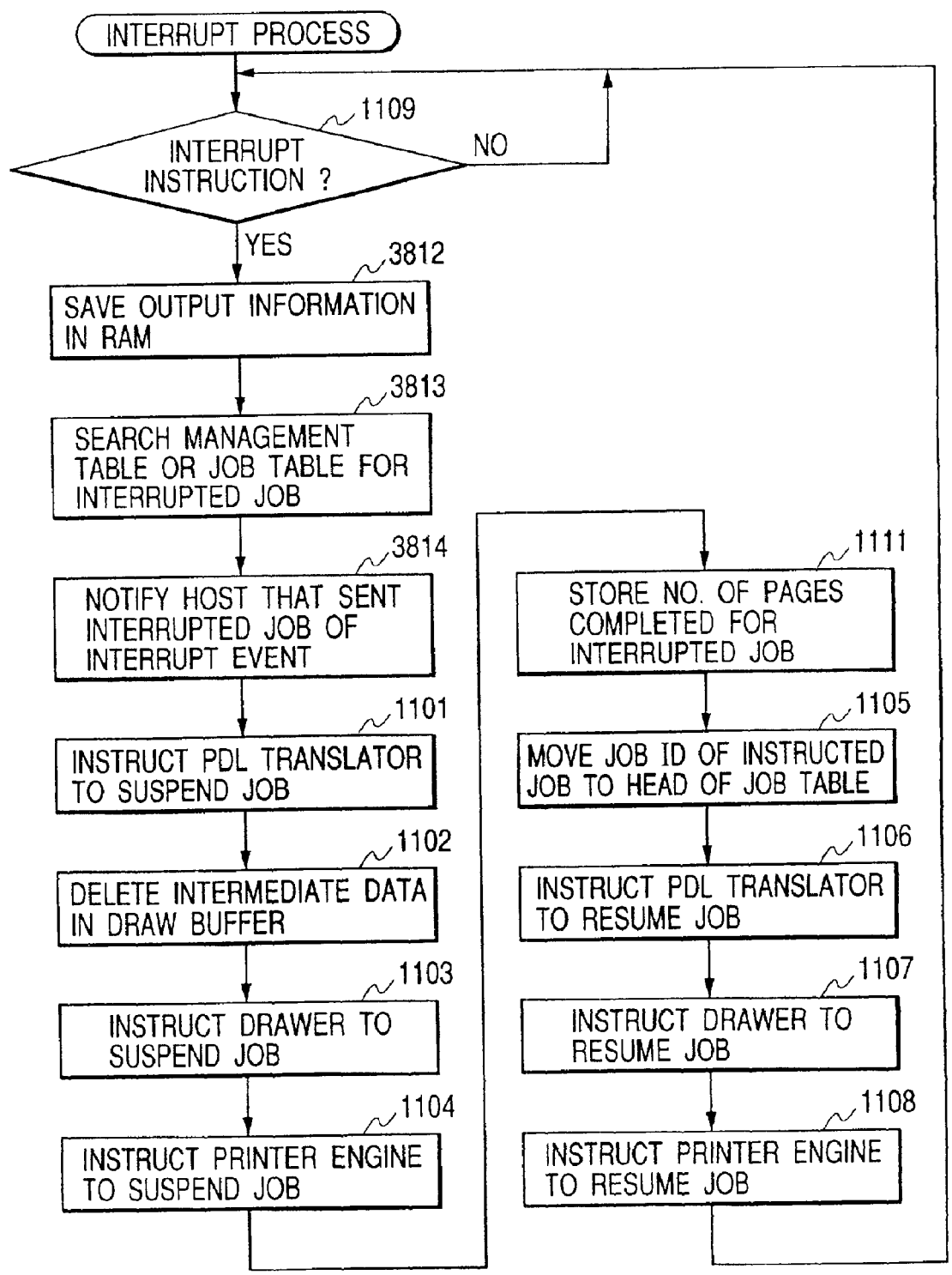
FIG. 40 is a flowchart explaining the operation of the interrupt process 312 when an interrupt notification is sent.

FIG. 40 is a flowchart explaining the operations of the interrupt processor when an interrupt is instructed. FIG. 40 is the flowchart of FIG. 11 with steps 3812–3814 added for the interrupt notification explained in FIG. 38.

Figure 41:
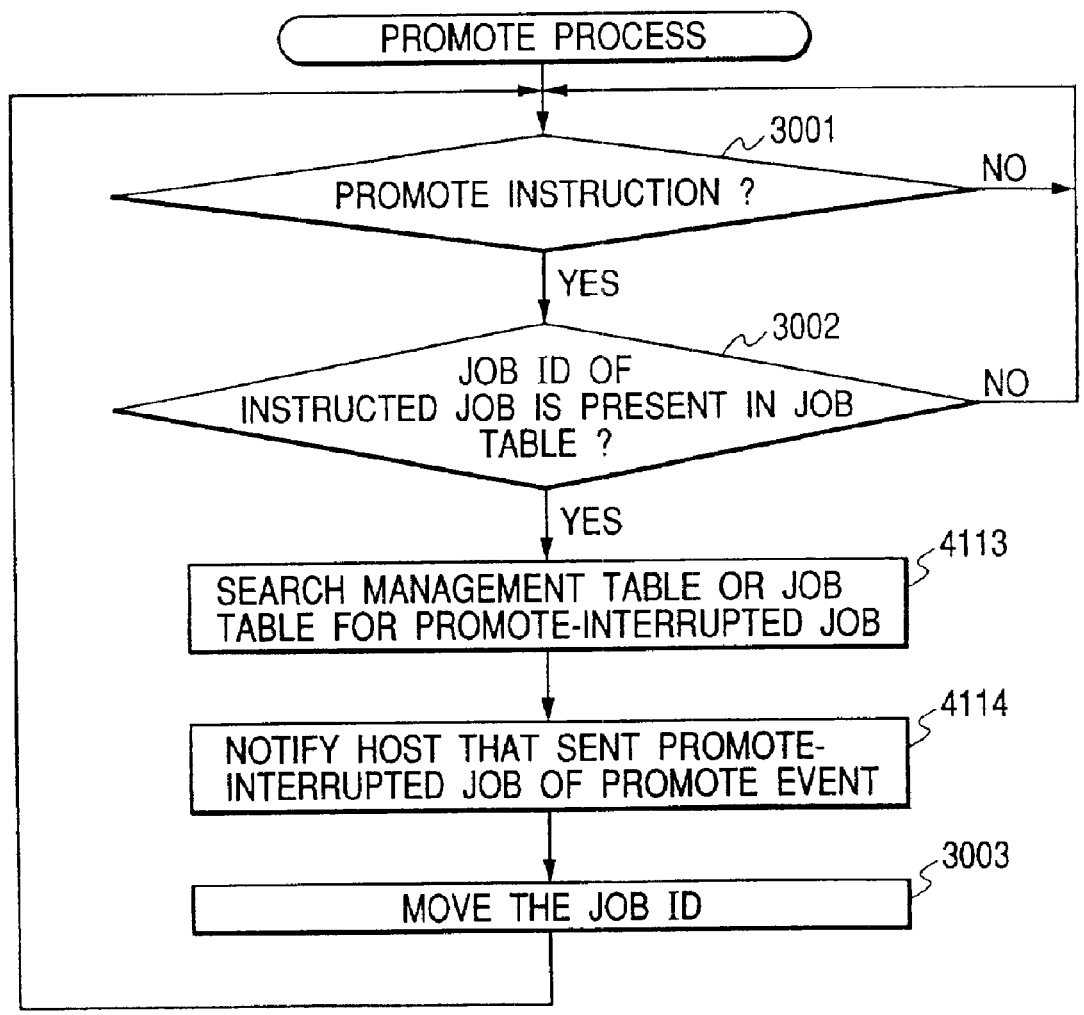
FIG. 41 is a flowchart explaining the operation of the promote function when a promote notification is sent.

FIG. 41 is a flowchart explaining the operations of the promote processor when a promote notification is made. FIG. 41 is the flowchart of FIG. 27 with steps 4113 and 4114 added for promote notification.

The promote processor 316 first determines in step 3001 whether or not there is a promote instruction. If there is no promote instruction, it returns to step 3001 and waits for a promote instruction. Promote instructions are sent from the information manager 310 to the promote processor 316 when a management packet having the operation code for promote instruction is received by the information manager 310. The job ID of the print job designated for priority print (this print job is called a promote print job) is stored in the data section of the management packet.

If there is a promote instruction in step 3001, the processor confirms whether or not the job ID of the print job designated for priority print exists in the job table 313. If it does not exist, it returns to step 3001.

If the job ID does exist, the processor searches for interrupted print jobs in step 4113. To be precise, it may search for interrupted print jobs by checking the status of each print job in the management table or it may search for interrupted print jobs by checking the job table 313. In the job table of FIG. 28, the print jobs with job IDs of 3 and 4 are print jobs interrupted by the promote process.

In step 4114, notification that a promote has occurred is sent to the host computers that sent the print jobs interrupted by the promote process. At this time, the notifications are sent to the network addresses stored in column 3506 of the management table.

In step 3003, the promote print job is inserted after the print job indicated by the pointer 801. In other words, the promote print job is inserted at the head of the print jobs for which the PDL data has not yet been read by the PDL translator 306. If the pointer 801 is not pointing to any print jobs, the promote print job is inserted at the head of the job table 313.

Figure 33:
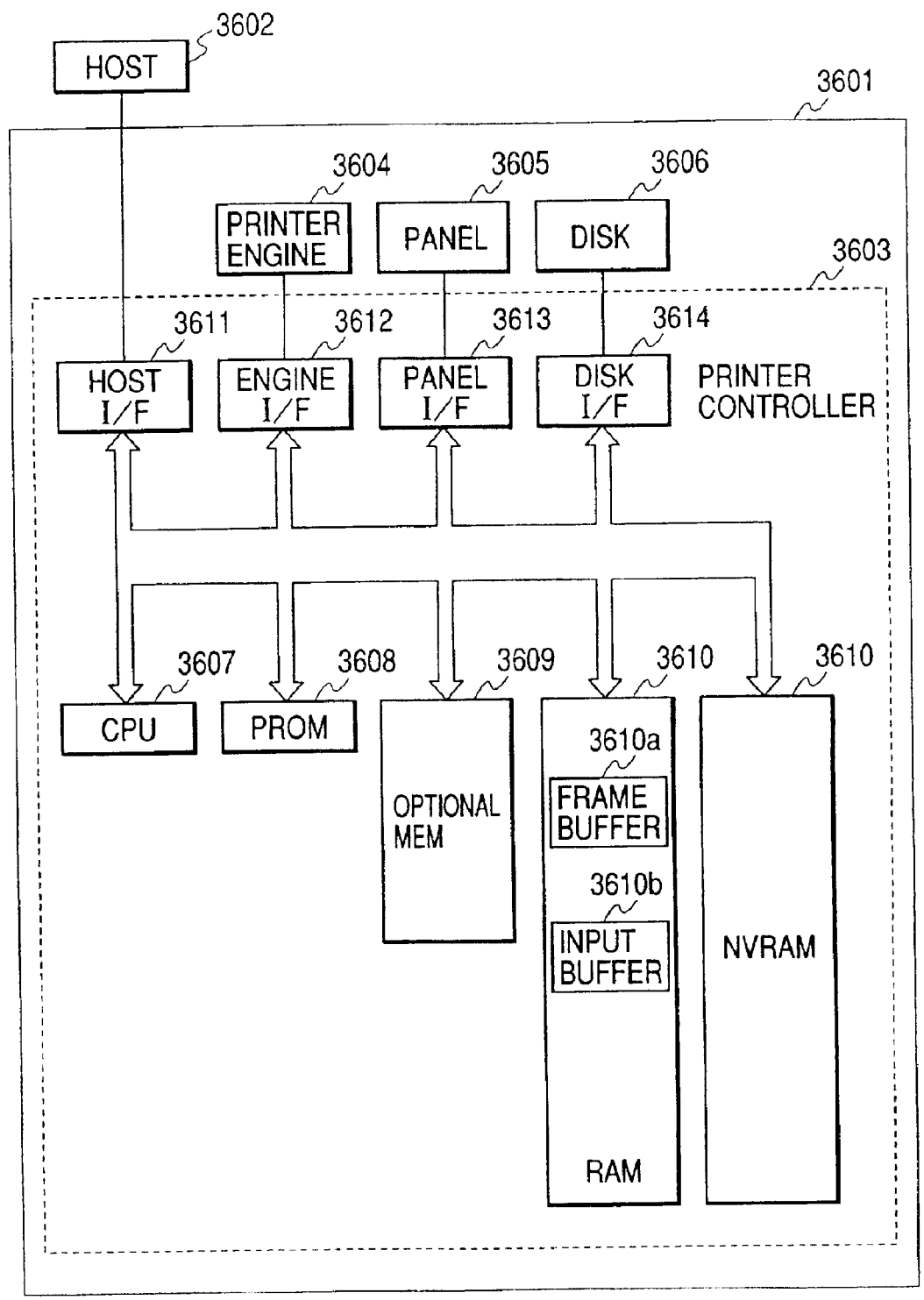
FIG. 33 is a diagram showing the control structure of the printing apparatus.

Next the control structure of the printing apparatus 300 is explained. FIG. 33 is a block diagram showing the control structure of the printing apparatus 300. In FIG. 33, the printing apparatus 3601 comprises a printer controller (controller) 2603, a printer engine 3604, a panel 3605, and a disk 3606.

The controller 3603 comprises a CPU 3607, a PROM 3608, an optional memory, a RAM 3610, a host I/F 3611, an engine I/F 3612, a panel I/F 3613, a disk I/F 3614, and an NVRAM 3615.

The CPU 3607 controls each section based on the control programs shown in the flowcharts of FIGS. 5, 6, 7, 9, 11, 15, 18, 20, 24, and 30 and each of the other control programs stored in the PROM 3608. The host I/F 3611 is an interface for transmission of such things as the print jobs with the host computer 3602. The engine I/F 3612 is an interface for transmitting with the printer engine 3604 that actually prints.

The panel I/F 3613 is an interface for transmitting instructions and status to the panel 3605 in order to display the status of the laser beam printer 3601 to the user and for the user to instruct changes in the printing environment of the laser beam printer 3601.

The optional memory 3609 is a memory which can be attached or detached for storing such things as fonts, such as a card, optional ROM, or FLASH memory. Ranges such as the draw buffer 3610a for storing the image object or the input buffer 3610b for temporarily storing the PDL data input from the host computer 3602 are stored in the RAM 3610. The RAM 3610 is also used as a work area of the CPU 3607. The NVRAM 3615 is used for storing the setting values of each setting item relating to the device and the print jobs.

The panel is equipped with such things as a liquid crystal panel display for displaying information such as the status of the laser beam printer 3601 in characters, all types of operation buttons for the user to variously manipulate the laser beam printer 3601, and LEDs for informing the user of such things as the location of the sheet feed or online/offline.

The printer engine 3604 actually prints the print object on a recording medium. The disk 3606 is an external memory device for various data recording and can be a hard disk device, a photomagnetic disk device, or a floppy disk device, etc. The laser beam printer 3601 receives the supply of electricity from a power portion that is not shown in the Figure.

Each of the structures in the functional construction of the printing system of FIG. 3, such as the logic channel controller 302, the job preprocessor 303, the PDL translator 306, the drawer 308, the information manager 310, the interrupt processor 312, the suspend/resume processor 315, and the promote processor 316, are realized when the CPU 3607 in the printing apparatus 3601 of FIG. 36 executes the control programs stored in the PROM 3608. The job spooler 304, the database 305, the job table 313, and the draw buffer 307 of FIG. 3 are stored on the RAM 3610 or the disk device 3606 of the printing apparatus 3601 of FIG. 36.

Figure 34:
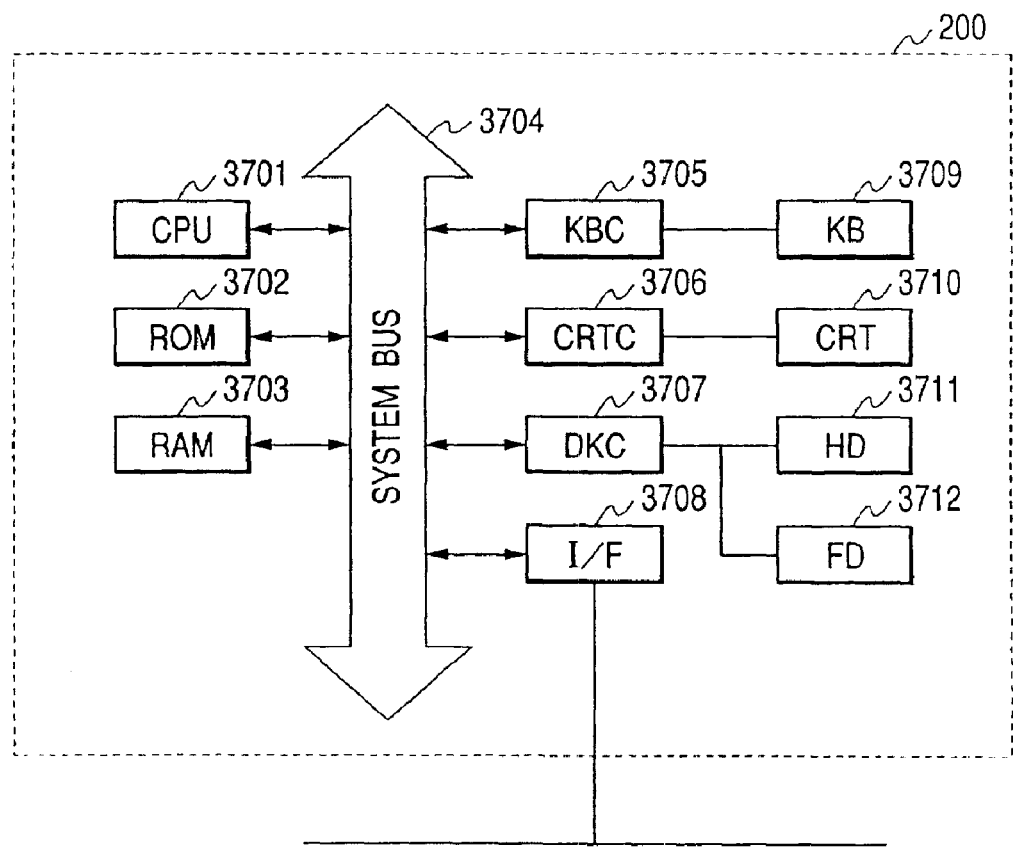
FIG. 34 is a diagram showing the control structure of the host computer.

Next the control structure of the host computer 200 is explained. FIG. 34 is a block diagram showing the control structure of the host computer 200. In FIG. 34, the CPU 3701 controls inclusively each device connected to the system bus 3704 and executes the control programs stored on memory mediums such as the ROM 3702, the hard disk (HD) 3711, or the floppy disk (FD) 3712.

3703 is a RAM that functions as a work area and the main memory of the CPU 3701. 3705 is a keyboard controller (KBC) that controls the instructions input by the user from the keyboard (KB) or a pointing device (not illustrated).

3706 is a CRT controller (CRTC) that controls the display of the CRT display (CRT) 3710. 3707 is a disk controller (DKC) that controls access to the floppy disk (FD) 3712 and the hard disk (HD) 3711 that stores the boot program, various applications, the edit file, the user file, and the control programs. 3708 is an interface card (IC) for data transmission to and from the printing apparatus 300 via a transmission medium.

Each structure in the functional construction of the printing system of FIG. 2 such as the logic channel controller 206, the job packet generator 207, the printer driver 202, the application 201, and the utility 205 is realized when the CPU 3701 in the host computer 200 of FIG. 37 executes the control programs stored in the ROM 3702 and the HD 3711. The output buffer 203 of FIG. 2 is stored on the RAM 3703 or the HD 3711 of the host computer 200 of FIG. 37.

Figure 29:
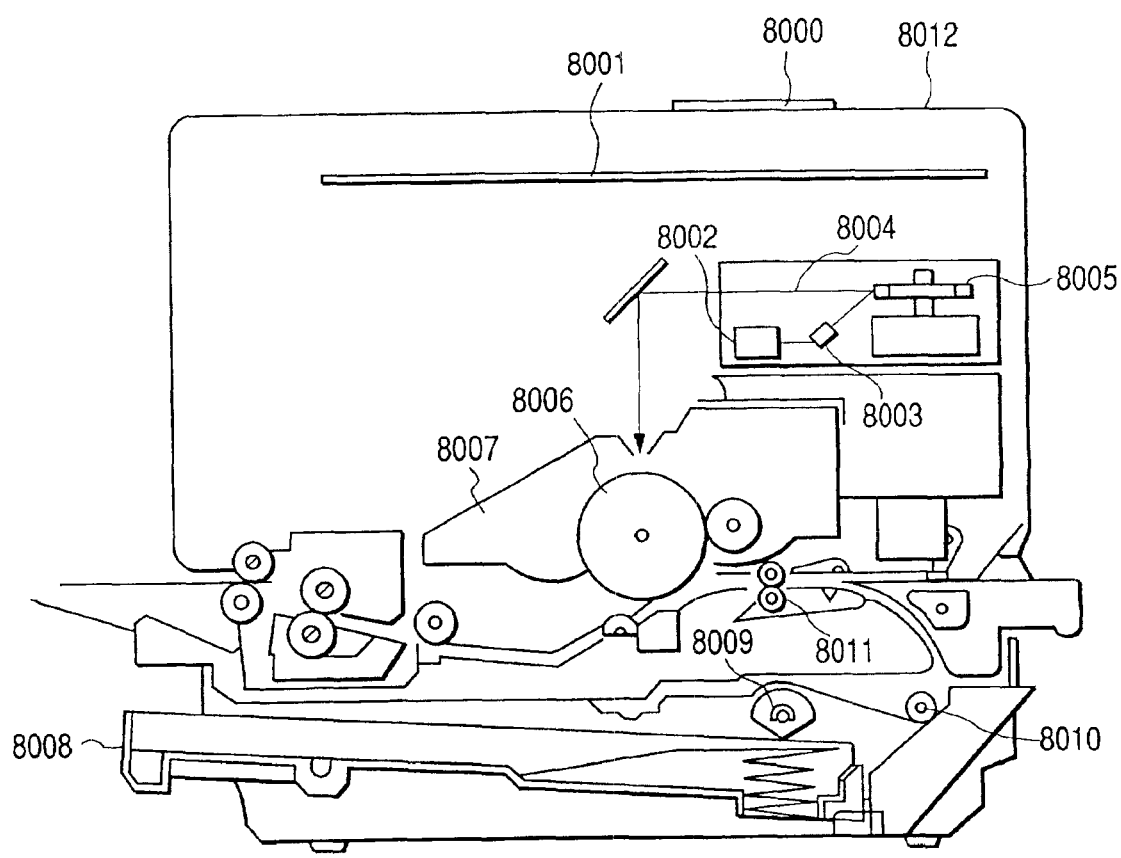
FIG. 29 is a cross-section showing the inner construction of a laser beam printer (hereinafter abbreviated as LBP).
Figure 30:
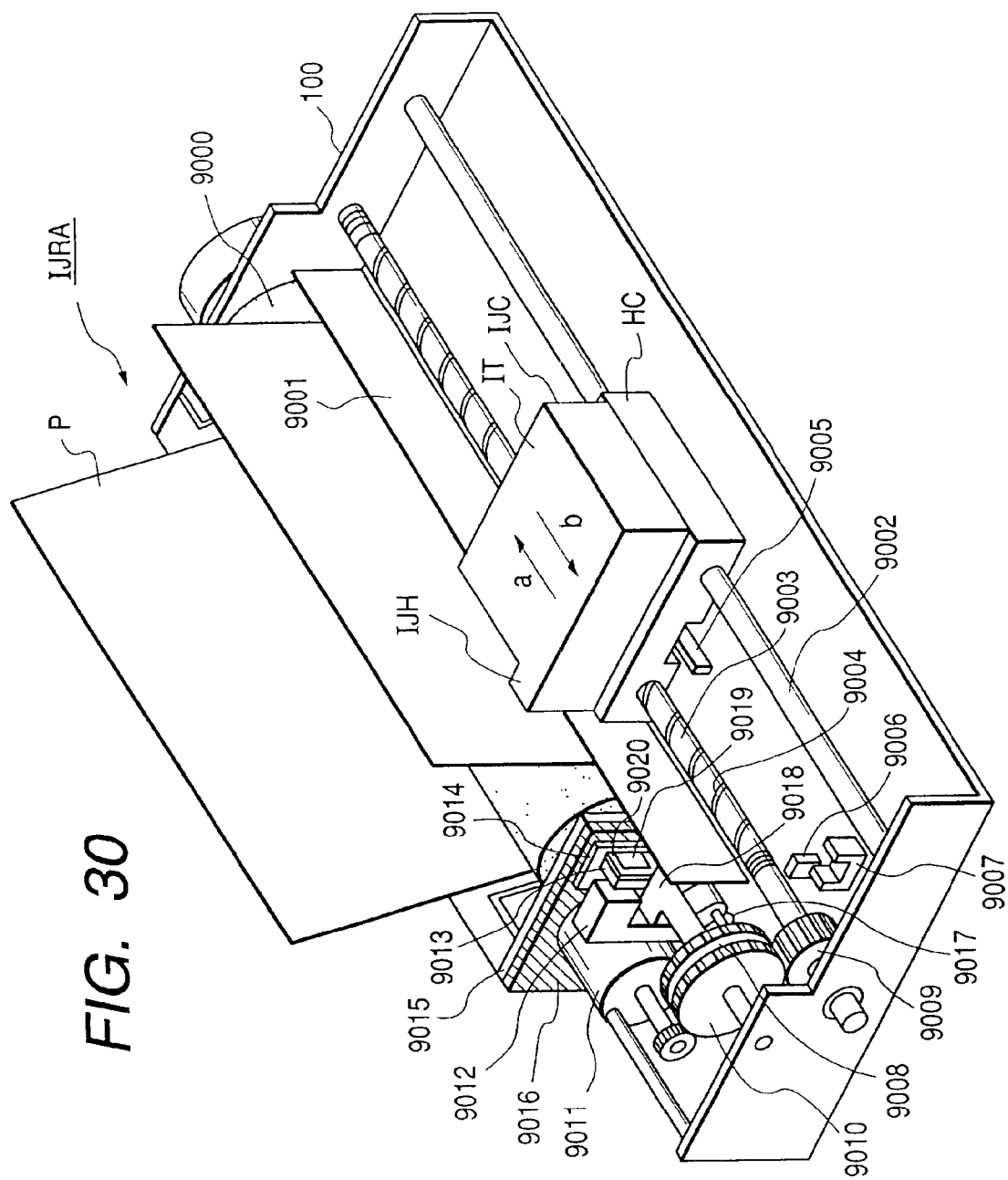
FIG. 30 is a schematic diagram of an ink-jet recording apparatus IJRA.

FIG. 29 is a cross-section showing the inner construction of a laser beam printer (LBP) that is one example of the printing apparatus of FIG. 3 or FIG. 36. This LBP can print recorded sheets by inputting character pattern data. In FIG. 29, 8012 is the LBP main body, which forms an image on recording sheets which are a recording medium based on the supplied character pattern. 8000 is an operation panel equipped with switches or LED displays for operation and 8001 is a printer control unit for analysis of such things as control of the entire LBP 8012 and character pattern information. This printer control unit 8001 mainly outputs the character pattern information to the laser driver 8002 by converting it to a video signal. The laser driver 8002 is a circuit for driving a semiconductor laser 8003 and switches a laser beam 8004 that irradiates from the semiconductor laser 8003 in response to the input video signal on or off. The laser beam 8004 scans an electrostatic drum 8006 by swinging a rotary polygon mirror 8005 left and right. In this way an electrostatic latent image of the character pattern is formed on the electrostatic drum 8006. This latent image is transferred to the recording sheet after it is developed by a developing unit 8007 on the periphery of the electrostatic drum 8006. A cut sheet is used for this recording sheet and the out sheet recording sheet is contained in a multiple sheet cassette 8008 corresponding to multiple types of sheet attached to the LBP 8012, is taken into the apparatus between a sheet feed roller 8009 and conveying rollers 8010 and 8011, and supplied to the electrostatic drum 8006.

FIG. 29 is a schematic diagram of an ink jet recording apparatus IJRA that is another example of the printing apparatus in FIG. 3 or FIG. 36. In the same figure, the carriage HC, engaged in a screw groove 9003 of a lead screw 9004, that rotates via drive power transfer gears 9010 and 9008 synchronized to forward and reverse rotation of a driving motor 9011 has a pin (not shown) and moves in both directions shown by the arrows a and b. An ink jet cartridge IJC is loaded on the carriage HC. 9001 is the sheet suppressing plate that presses the paper against the plate 9000 across the entire span of the movement of the carriage. 9006 and 9007 are photo couplers, which serve as a means of home position detection for performing such things as switching the rotation direction of the motor 9011 by confirming the existence of the carriage lever 9005 in this range. 9013 is a supporting member for the cap 9019 that caps the front surface of the recording head, and 9012 is a suction means for suction within this cap that performs suction recovery of the recording head via the inner opening 9020 of the cap. 9014 is a cleaning blade. 9016 is a member that can move this blade either forward or backward. Both are supported by a main body supporting plate 9015. The blade need not be in this form, conventional cleaning blades may also be suitable for this example. 9018 is a lever for initiating suction for suction recovery that moves along with the movement of a cam 9017 engaged with the carriage. The driving power from the driving motor is controlled with a known transfer means such as a clutch switch. Capping, cleaning and suction recovery are structured such that the designated process can be performed in the corresponding positions when the carriage comes within the range of the home position side by the function of the lead screw 9004. However, if the operations are performed with known timing they can be applied to the present example.

The present invention can be applied to a system constructed from a copier, a printer, and a scanner existing as single units, or it can be applied to an apparatus comprising a single device (for example, a copier or a facsimile).

Figure 31:
FIG. 31 is a diagram showing a memory medium for recording the program code.

The purpose of the present invention is to provide a recording medium (FIG. 31) having a program code for software (a control program) for realizing the functions of the embodiment described above to a system such as is shown in FIGS. 36 and 37 and to accomplish this by reading and executing the program code stored on the memory medium with the apparatus of this system (CPU 3607, CPU3701). The method for supplying the PC main body 3401 with programs and data by recording on a floppy disk FD 3402 as shown in FIG. 32 is also a general method for supplying.

In this case, the program code itself read from the memory medium realizes a function of the embodiment above and the memory medium recording the program code comprises the present invention.

Aside from floppy disks or hard disks, an optical disk, a photomagnetic disk, a CD-ROM, a CD-R, magnetic tape, a non-volatile memory card, or a ROM can also be used as the memory medium for supplying the program code.

Figure 32:
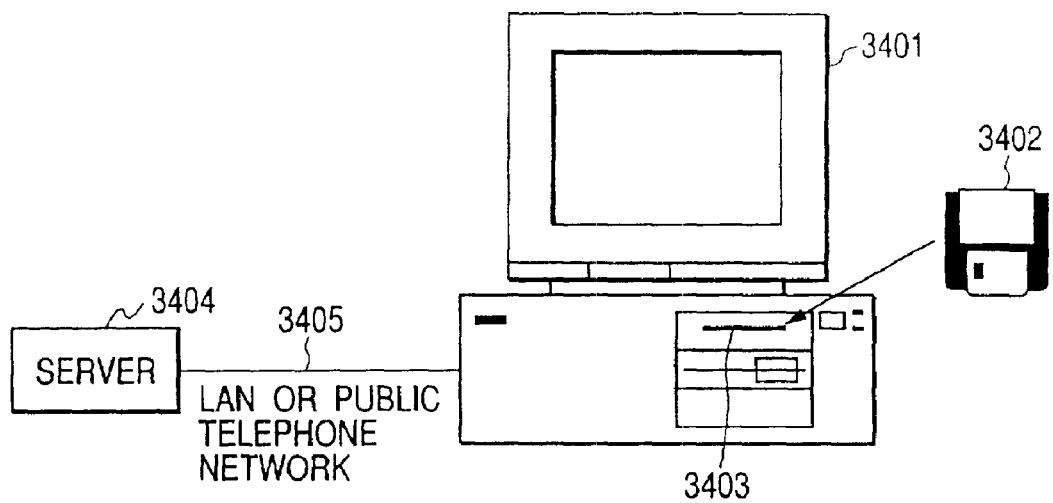
FIG. 32 is a diagram showing the supply method of the program code.

It is also a general method for supplying the PC main body 3401 from a server apparatus via a LAN or public phone line 3405 as shown in FIG. 32 as the method for supplying the program and data. In this case, the program code itself that is read from the memory medium realizes the function of the above embodiment and the server apparatus sending the program code becomes the present invention.

Because a computer executes the read program code, not only is the function of the above embodiment realized, but based on the instructions of the programs code one or all parts of the actual processes are performed by an OS (operations system) operating on the computer and it goes without saying the function of the above embodiment is realized through this process. Further, after the program code read from the memory medium is written on the memory of a function expansion unit connected to a function expansion board inserted in the computer or to the computer, one or all parts of the actual processes are performed by the CPU of this function expansion board or function expansion unit based on the instructions of the program code and it goes without saying that the functions of the above embodiment are also realized through this process.

Embodiment 2

Figure 42:
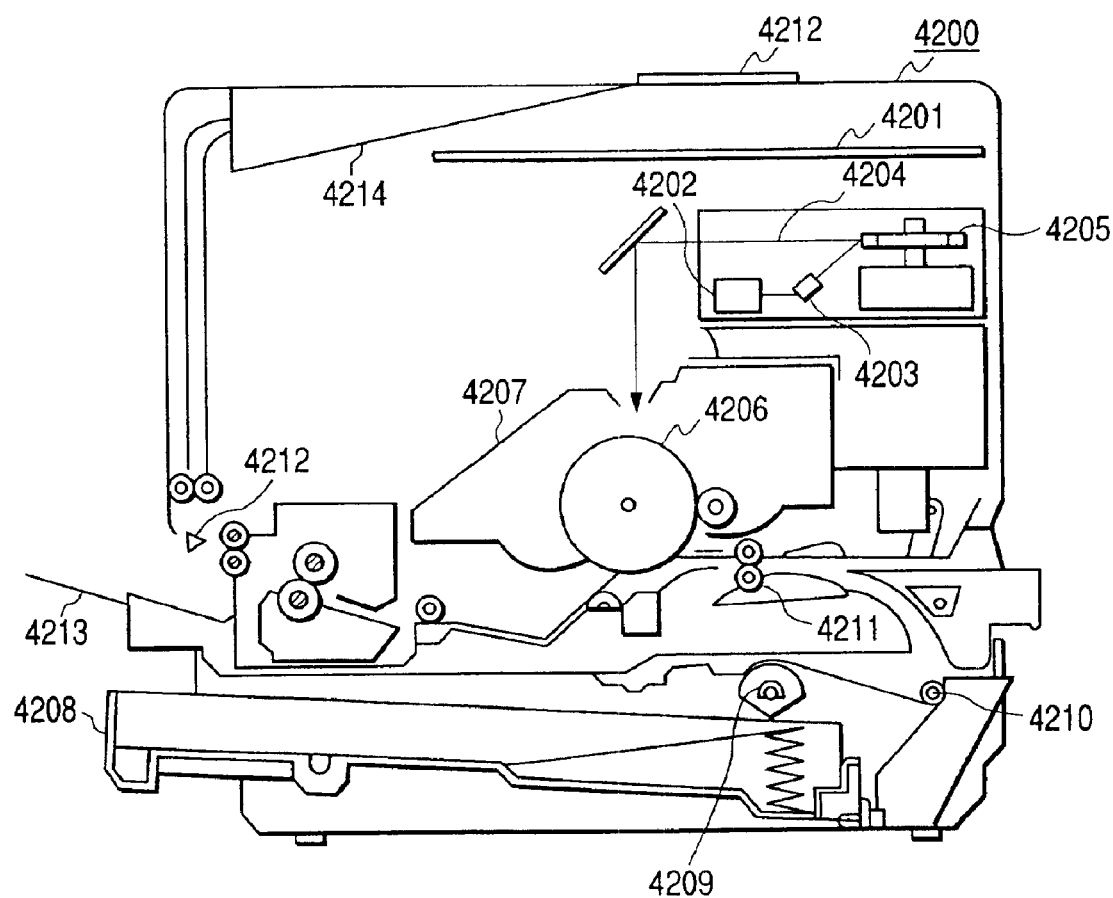
FIG. 42 is a cross-sectional structural diagram of a laser beam printer.

FIG. 42 is a cross-section of the internal structure of a laser beam printer (LBP) to which the present invention is applied. This LBP performs registration of character pattern and form data sent from a data source that is not illustrated.

In FIG. 42, 4200 is the LBP main body for inputting and storing character information (character codes), form information, or macro commands supplied from the host computers (4301, 4311, and 4312 in FIG. 43) connected externally, produces such things as character patterns and form patterns corresponding to this information, and forms an image on printing media. 1112 is an operations panel equipped with switches and LED displays for operation. 4201 is a printer control unit for analysis of such things as the character information supplied from the above host computers and control of the entire LBP 4200. This printer control unit 4201 outputs mainly character information to a laser driver 4202 by converting it to a video signal of a character pattern.

The laser driver 4202 is a circuit for driving a semiconductor laser 4203 that switches a laser beam 4204 that irradiates from a semiconductor laser 4203 in response to the input video signal on or off. The laser beam 4204 swings left and right on a rotary polygon mirror 4205 and scans an electrostatic drum 4206. In this way, an electrostatic latent image of the character pattern is formed on the electrostatic drum 4206. This latent image is transferred to the printing media after it is developed by a developing unit 4207 on the periphery of the electrostatic drum 4206. A cut sheet is used for this printing media. The cut sheet is collected within a sheet cassette 4208 attached to the LBP 4200, taken inside the LBP apparatus by a sheet feed roller 4209 and conveying rollers 4210 and 4211, and supplied to the electrostatic drum 4206.

Figure 43:
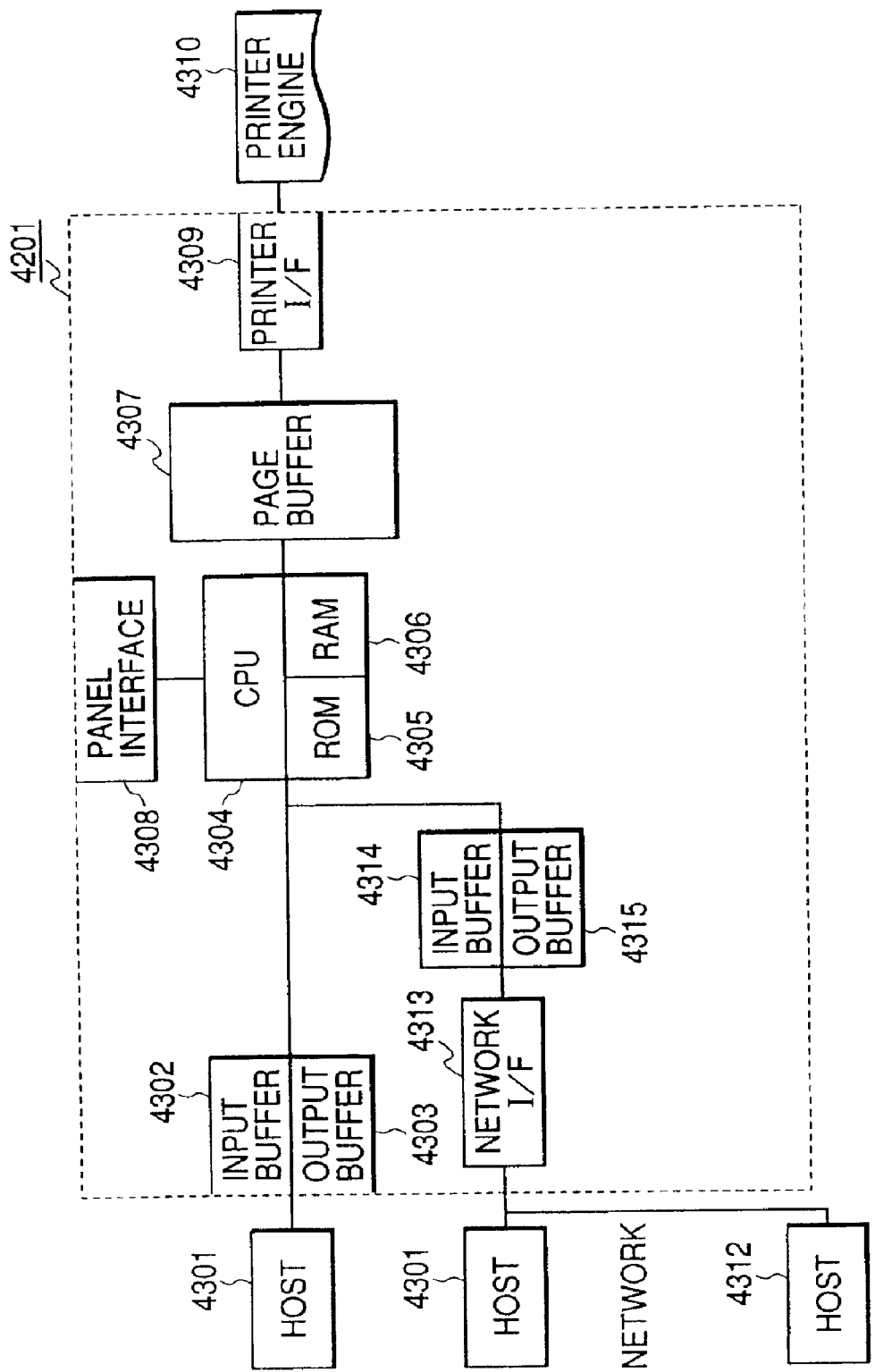
FIG. 43 is a block diagram of a laser beam printer.

4212 is an allocation unit at the ejection point of the cut sheets. With this unit the user can select whether to eject to a face up tray 4213 or a face down tray 4214. FIG. 43 shows a block structure of the LBP shown in FIG. 42 and its relationship to a data generation source. Each block from 4302–4315 within this Figure is included in the printer control unit 4201 shown in FIG. 42 and the structure of the printer 4310 is as explained in FIG. 42.

4301 is a host computer that becomes the first data source. 4302 is an input buffer for the data source (host computer)

4301, 4304 is an output buffer for responding to the data source (host computer) 4301, 4304 is a CPU for control of the LBP, 4305 is a ROM storing programs (FIGS. 8 and 10) and font patterns, and 4306 is a RAM storing work information, analysis information, and output information. 4307 is a page buffer storing analyzed image information and can store multiple page information. 4308 is a panel interface for control connected to the operation panel. 4309 is an engine interface for control with the printer. 4310 is a printer engine for actual printing.

4311 and 4312 are host computers connected to a network. 4313 is a network I/F (interface) for controlling the connections to the network. 4314 and 4315 are output buffers and input buffers for network connection corresponding to the input buffer 4302 and the output buffer 4303.

FIG. 44 shows one example of a management table stored on the RAM 4306 for management of the status of each print job sent from the host computers 4301, 4311, and 4312, which are information sources, and the related information. In this Figure, column 4401 is the job recognition number (ID), column 4402 shows the status of each job received, and column 4403 shows the address within the page buffer 4307 of the analyzed page being output or waiting to be output. Column 4404 shows the address where the current analysis information is stored if an interrupt is performed. Column 4405 shows the address where output information is stored when an interrupt is performed. The network addresses of the host computers related to the jobs received through the network (see FIG. 43) are stored in column 4406.

FIG. 45 shows one example of the interrupt command instructed from the host computers 4301, 4311, and 4312 (see FIG. 43) that are data sources. In this figure, 4501 is an ESC code indicating that it is a control command. 4502 is the character string PRO indicating that the command is an interrupt command. Information that indicates what status of job (see 4402 of FIG. 44) to interrupt is stored in 4503.

Figure 46:
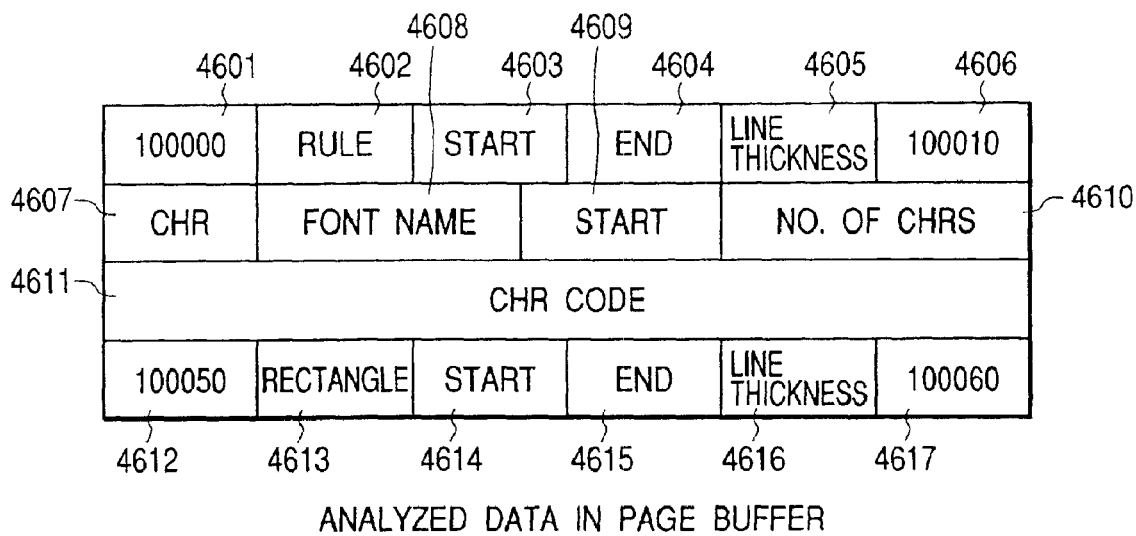
FIG. 46 is a diagram showing one example of a page buffer after analysis.

FIG. 46 shows one example of a page buffer after data analysis stored in the page buffer 4307 (see FIG. 43). In the present embodiment, the page buffer processes a record as a base unit. In this Figure, 4601 is a range indicating the address of the following record. 4602 indicates that the record processes a rule. 4603 is the start coordinates of the rule, 4604 is the end coordinates of the rule, and 4605 is the thickness of the line. A line is drawn using this information.

4066 is linked through 4601 above and stores the address to be linked next. This record is a record of characters (4607) and confirms the font pattern by the font name (4608). The start coordinates are confirmed by the start point (4609) and a code of the number of characters (4610) is linked to it and stored, so that the images are formed in order from the start coordinates by reading the pattern in response to the character code (4611).

4612 to 4616 display a record of a rectangle. In other words, an image is formed with the start coordinates (4614), end coordinates (4615), and the line thickness (4616).

With this group of records the images of one page are formed.

Figure 47:
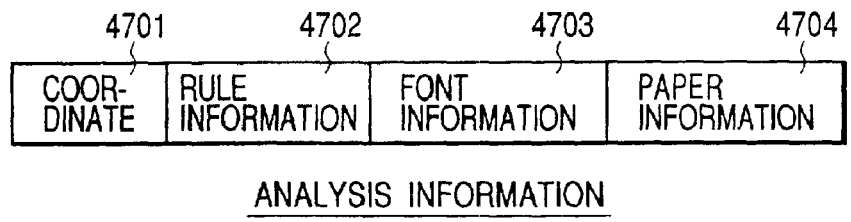
FIG. 47 is a diagram showing one example of analysis information.

FIG. 47 shows one example of analysis information. In this Figure, coordinates values describing the current image are stored in 4701. The rule thickness and type of rule is stored in 4702. The currently selected font name, character pitch, and calligraphy style are stored in 4703. the paper size, sending direction, percent of enlargement, and type of paper are stored in 4704. By storing this analysis in formation in RAM it is possible to resume an interrupted job (see steps 810 and 816 of FIG. 8).

Figure 48:
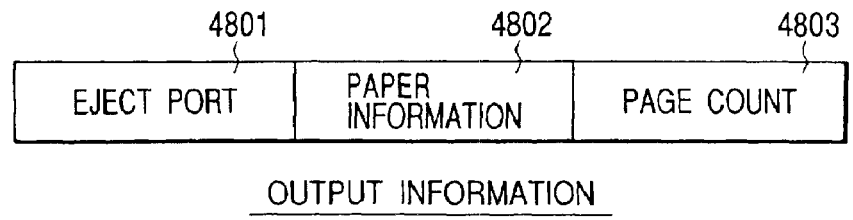
FIG. 48 is a diagram showing one example of output information.

FIG. 48 shows one example of output information. In this Figure, the ejection destination of paper currently being ejected is stored in 4801 and the paper size and direction of the paper being ejected is stored in 4802. The number of pages for which output has been completed of the current job is stored in 4803.

Figure 49B:
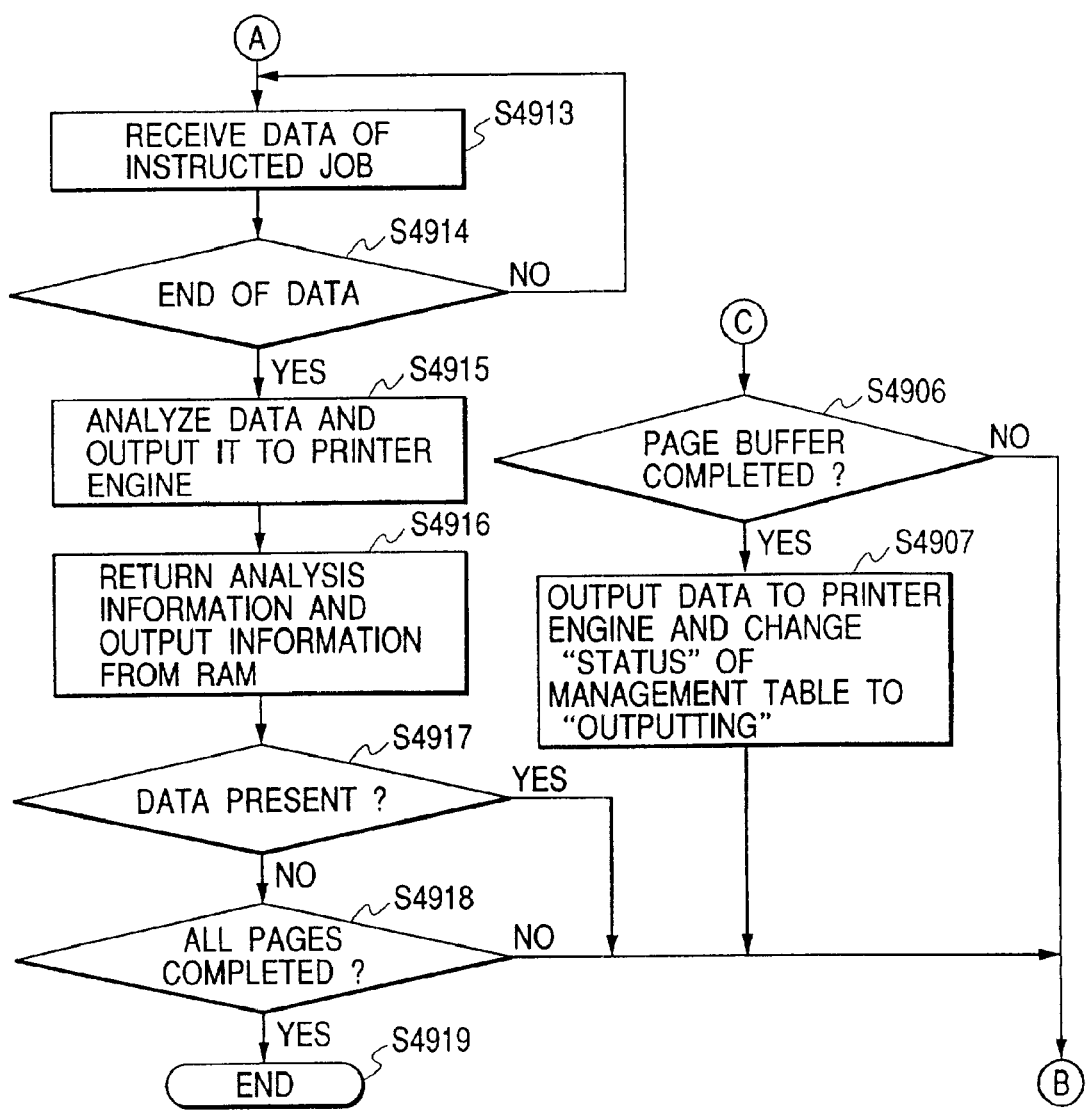
FIG. 49 which is comprised of FIGS. 49A and 49B are flowcharts showing the process order.

FIGS. 49A and 49B are flowcharts showing the control procedure that the CPU 4304 should execute according to the control program stored in advance in the ROM 4305. Following, the operations of the present embodiment are explained based on each step in FIGS. 49A and 49B.

First, the main program starts when power is supplied (step S4901). In step S4902, the program checks whether or not data has reached the port (input buffer) from the host computer. If there is not data, the program repeats the loop to step S4902. If there is data, it is registered in the management table (see FIG. 44) (step S4902A). In other words, the job ID is registered in column 4401.

Thereafter the program moves to step S4903 and confirms whether or not the received data is a control command. If it is not a control command, it moves to step S4904, analyzes the input data, and converts it to an internal code. The contents of this internal code are as mentioned earlier in FIG. 5. Then in step S4905, the internal code is written onto the page buffer 4307 (see FIG. 43). Simultaneously, the address is registered in column 4403 "page buffer" of the management table. Here, the page buffer for multiple jobs is produced and column 4402 "status" of the management table is set to "waiting for output" if the job is waiting for output.

In step S4906, the program confirms whether or not production of the page buffer is complete and repeats steps S4903 and following if it is not complete.

If the page buffer is complete, it moves to step S4907 and outputs to the printer (printer engine) 4310 via the printer I/F 4409 (see FIG. 43). At this time the "status" column 4402 of the management table changes to "outputting" (see FIG. 44).

If it is determined in step S4903 that it is a control command, in step S4908 it is confirmed whether or not it is an interrupt command corresponding to the interrupt command 402 (PRO: see FIG. 4). If it is determined in step S4908 that it is not an interrupt command, it moves to step S4909 and analyzes the control command, and if necessary, writes onto the page buffer and returns to data analysis (step S4904).

If an interrupt command is confirmed in step S4908, and the print job currently being analyzed has been interrupted, step S4910 is performed. In other words, in step S4910 the analysis information of FIG. 6 and the output information of FIG. 7 is saved in RAM.

In the next step, S4911, the program searches for interrupted jobs from columns 4401 and 4402 of the management table (see FIG. 44). In the present example, three jobs exist and each job has been interrupted.

In step S4912, the program notifies the host computers of the interrupted jobs that interruption has occurred. As job ID 1 was input directly from the host computer 4301 (see line 4407) when one looks at the example of FIG. 44, notification is made via the output buffer 4304 (see FIG. 43). On the other hand, as it is clear from column 4406 that the job IDs 2 and 3 were issued via the network (in other words the jobs shown in lines 4408 and 4409), in this case notification that an interruption occurred is made through the network I/F 4313 (see FIG. 43) based on the network addresses (column 4406) of the host computers that sent each job.

The above network addresses are sent as one part of the control command when the jobs are sent. Therefore, they are registered in column 4406 of the management table in the command analysis process of step S4909.

In step S4913, reception of the data of the instructed job becomes possible and begins. Next, in step S4914, it is confirmed whether or not reception of the instructed data is complete, and if it is not complete the program returns to step S4913 and repeats reception.

When the instructed data is all received, the program moves to step S4916 and analyzes the data and then begins output to the printer 4310 (printer engine).

When output of the instructed data is finished, in step S4916 the analysis information and output information saved in step S4910 is returned. In this way, analysis of the job 3 being analyzed (see line 4409 of FIG. 44) continues to be possible.

In step S4917, the existence of data is confirmed. If it is determined that there is data, it returns to step S4903 and continues the process. If it is determined that there is no data, it outputs to the page buffer stored as currently analyzed and waiting for output and finishes the process.

Other Embodiments

Figure 50:
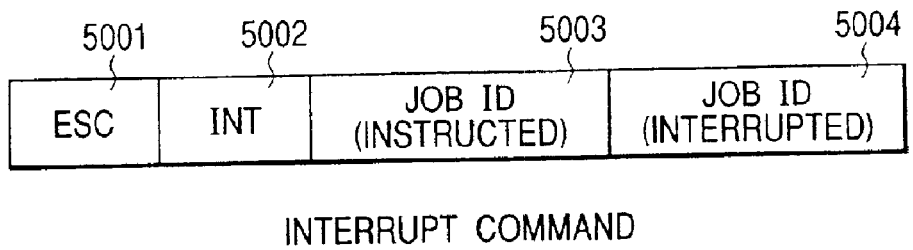
FIG. 50 is a diagram showing one example of the format of an interrupt command in another embodiment of the present invention.

In the explanations up to here, data interruption was performed after the issuance of an interrupt command (see FIG. 45), but if multiple jobs are already stored, it is also possible to perform print interrupt within the printing control apparatus. FIG. 50 shows one example of an interrupt command in that case.

In FIG. 50, 5001 is an ESC code indicating that it is a control command. 5002 is a character string showing that the command is an interrupt command. 5003 shows the job ID of the instructed job. 5004 shows the ID of the interrupted job.

Figure 51:
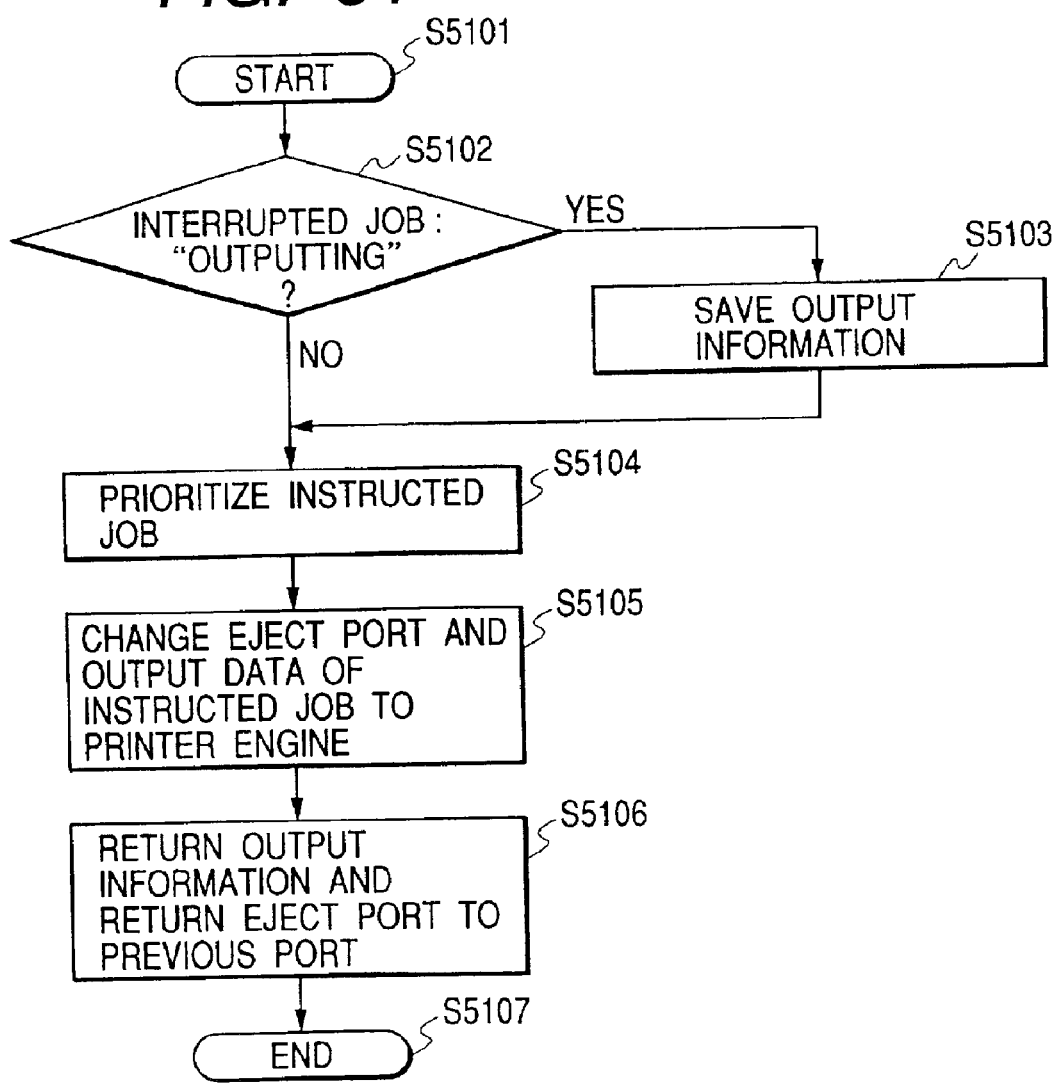
FIG. 51 is a flowchart showing the process order in another embodiment of the present invention.

It is further possible to eject printed sheets from instructed jobs from a different ejection port than usual. FIG. 51 is a flowchart showing this ejection process. The processing procedure shown in this Figure is controlled by the CPU 4304 according to the program stored in ROM 4305 (see FIG. 43).

The control in FIG. 51 is premised on recognition of an interrupt command in step S4908 of FIG. 49A. First, in step S5102, it checks the status of the interrupted print job. If the status of the interrupted print job is "outputting," for example job ID 1 shown in FIG. 44, output information is saved in step S5103.

In step S5102, if it is determined that it is not outputting, for example it is waiting to be output as is job ID 2 shown in FIG. 44, it raises the priority of the instructed job over the interrupted job in step S5104.

Next, in step S5105, output is performed by changing the ejection port currently being used as the output destination of the instructed job. When ejection is completed, it returns to step S5106, returns the saved output information, and also returns the ejection port to the original location.

As described above, according to the present invention, when a user sends print instructions designating an interrupt from a host computer, even if print processing of another job is already being performed, it is possible for the printing apparatus to suspend the printing process of the other print job and immediately print process the instructed print job. As a result it is possible to print process an urgent job immediately.

Further, after print processing of the instructed print job is completed, because the print process of the interrupted job is automatically returned to, the owner of the interrupted print job does not need to resent the print job.

Further, the user can instruct an interrupt from the utility for a normal print job already sent to the printing apparatus, and it is possible to achieve the same effect even if the necessity for interrupt print of this print job arises after it has been sent.

If the printing apparatus has multiple ejection bins, by changing the ejection port of the instructed print job to a different ejection port from that of the interrupted print job, it is possible to prevent the printed material of the instructed print job from mixing with the printed material of the interrupted print job.

Further, it is possible to process a print job by priority without causing the total throughput of the printing apparatus to decrease by priority print which raises the priority of the printing order of a print job without suspending a print job that is already being print processed.

If the user executes a print process from the host computer, execution of the print can be stopped without print processing in the print apparatus by instructing a suspend of the print job, and it is then possible to actually perform print processing by instructing a resume.

Further, by temporarily suspending print processes by instructing a suspension of a normal print job already sent to the printing apparatus, for example in order to avoid monopolizing the printing apparatus with a print job that will take much print processing time, the print jobs behind can be printed first when the need to suspend print arises after the print job has been sent.

Further, during power-off of the printing apparatus it is possible to avoid the power of the printing apparatus being shut off when suspended print jobs exist by displaying the fact that suspend print jobs exist inside the printing apparatus on the operation panel.

Further, if an interrupt job is generated, a notification can be made to the sending source of the interrupted print job (such as a host computer) that an interrupt occurred.

Further, notification of interruption can be made to the host computer even when the host computer is connected to the printer via a network.

Further, the ejection destination of the instructed job and the ejection destination that is normally used can be made to differ when a printer having multiple ejection means is used.

What is claimed is:

1. A print control apparatus for receiving a print job including print data from an external apparatus and controlling an image forming section to form an image based on image data, said apparatus comprising:

storing means for storing print data;

generation means for generating image data by analyzing the print data;

image formation control means for causing the image forming section to form the image based on the image data generated by said generation means; and interrupt control means for, in response to an interrupt instruction identifying a print job, interrupting processing of a print job not identified by the interrupt instruction and controlling said generation means to analyze print data of the print job identified in the interrupt instruction, wherein said storing means stores print data of the interrupted print job, including a print data portion that has already been analyzed by said generation means, until formation of an image based on the image data generated from the print data of the identified print job by the image forming section is completed, and wherein said generation means analyzes the print data of the interrupted print job, including the print data portion that has already been analyzed by said generation means, stored in said storing means after the analysis of the print data of the identified print job is completed.

2. The print control apparatus of claim 1, wherein said interrupt control means interrupts processing of the print job not identified by the interrupt instruction by causing said generation means to suspend analysis of the print data of the print job not identified by the interrupt instruction.

3. The print control apparatus of claim 1, wherein said interrupt control means interrupts processing of the print job not identified by the interrupt instruction by causing said image formation control means to suspend image formation in the image forming section based on the image data of the print job not identified by the interrupt instruction.

4. The print control apparatus of claim 1, wherein said interrupt control means interrupts processing of the print job not identified by the interrupt instruction by causing the image forming section to suspend image formation based on the print data of the print job not identified by the interrupt instruction.

5. The print control apparatus of claim 1, wherein said interrupt control means interrupts processing of the print job not identified by the interrupt instruction by deleting the image data generated by said generation means from the print data of the print job not identified by the interrupt instruction.

6. The print control apparatus of claim 1, wherein said interrupt control means interrupts processing of the print job not identified by the interrupt instruction by invalidating the image data generated by said generation means from the print data of the print job not identified by the interrupt instruction.

7. The print control apparatus of claim 1, wherein said generation means analyzes all the print data of the interrupted print job stored in said storing means after analysis of the print data of the identified print job is completed.

8. The print control apparatus of claim 1, wherein said generation means skips generation of image data, based on a number of pages for which ejection from said print control apparatus is completed.

9. The print control apparatus of claim 1, wherein the interrupt instruction is included in the identified print job.

10. The print control apparatus of claim 1, further comprising priority control means for controlling priority print processing such that the print data of a print job instructed for priority print is analyzed after the analysis of all the print data of a certain print job is completed by said generation means in response to a priority instruction from the external apparatus.

11. The print control apparatus of claim 10, wherein the priority instruction is included in the instructed print job.

12. The print control apparatus of claim 2, further comprising determination means for determining whether or not an interrupt instruction is permitted, wherein said interrupt control means does not interrupt the processing of the print job not identified by the interrupt instruction if it is determined that the instruction is not permitted by said determination means.

13. The print control apparatus of claim 12, further comprising setting means for setting whether or not the interrupt instruction can be used, wherein said determination means determines that the interrupt instruction is permitted if it is set for use by said setting means.

14. A print control apparatus for receiving a print job including print data from an external apparatus and forming an image in an image forming section based on image data, said apparatus comprising:

storing means for storing print data;

generation means for generating image data by analyzing the print data;

image formation control means for causing the image forming section to form an image based on the image data generated by said generation means;

suspend control means for controlling such that the print data stored by said storing means, which is print data of a print job instructed for suspension, is not analyzed by said generation means in response to a suspend instruction for the print job from the external apparatus;

determination means for determining whether or not suspended print jobs exist at power-off; and power supply control means for suspending power-off for a designated amount of time if it is determined that a print job exists by said determination means, wherein said storing means stores the print data of the print job instructed for suspension until formation of an image based on image data generated from print data of the print job from the external apparatus by the image forming section is completed.

15. The print control apparatus of claim 14, wherein said power supply control means does not perform power-off if there is no power-off instruction during the designated amount of time and does perform power-off if there is a power-off instruction during the designated amount of time.

16. A print control apparatus for receiving a print job including print data from an external apparatus and controlling an image forming section to form an image based on image data, said apparatus comprising:

generation means for generating image data by analyzing the print data; and image formation control means for causing the image forming section to form an image based on the image data generated by said generation means, wherein said apparatus may be operated in a first mode in which, in response to a first mode instruction identifying a print job, received from the external apparatus, to be processed in the first mode, the first mode instruction being included in the identified print job, said generation means is caused to suspend analysis of print data of a print job not identified in the first mode instruction and analyze print data of the print job identified in the first mode instruction, and in a second mode in which, in response to a second mode instruction identifying a print job, received from the external apparatus, to be processed in the second mode, the second mode instruction being included in the identified print job, said generation means is caused to analyze print data of the print job identified in the second mode instruction after completing analysis of print data of a first print job not identified in the second mode instruction and before starting analysis of print data of a second print job not identified in the second mode instruction, the first and second print jobs being received before the identified print job.

17. The print control apparatus of claim 16, wherein, in the first mode, said image formation control means is caused to suspend image formation in the image forming section based on the image data relating to the print job not identified in the first mode instruction.

18. The print control apparatus of claim 16, wherein, in the first mode, image formation is suspended in the image forming section based on the image data relating to the print job not identified in the first mode instruction.

19. The print control apparatus of claim 16, wherein, in the first mode, image data generated by said generation means is deleted in response to the first mode instruction.

20. The print control apparatus of claim 16, wherein, in the first mode, image data generated by said generation means is invalidated in response to the first mode instruction.

21. A print control method for controlling a print control apparatus for receiving print jobs including print data from an external apparatus and controlling an image forming section to form an image based on image data, said method comprising:

a storing step of storing print data in storing means;

a generation step of generating image data by analyzing the print data;

an image formation control step of causing the image forming section to form the image based on the image data generated in said generation step; and an interrupt control step of, in response to an interrupt instruction identifying a print job, interrupting processing of a print job not identified by the interrupt instruction and controlling said generation step to analyze print data of the print job identified in the interrupt instruction, wherein said storing step stores print data of the interrupted print job in the storing means, including a print data portion that has already been analyzed in said generation step, until formation of an image based on the image data generated from the print data of the identified print job by the image forming section is completed, and wherein said generation step analyzes print data of the interrupted print job, including the print data portion that has already been analyzed in said generation step, stored in said storing step after analysis of the print data of the identified print job is completed.

22. The print control method of claim 21, wherein said interrupt control step interrupts processing of the print job not identified by the interrupt instruction by causing said generation step to suspend analysis of print data of the print job not identified by the interrupt instruction.

23. The print control method of claim 21, wherein said interrupt control step interrupts processing of the print job not identified by the interrupt instruction by causing said image formation control step to suspend image formation in the image forming section based on image data of the print job not identified by the interrupt instruction.

24. The print control method of claim 21, wherein said interrupt control step interrupts processing of the print job not identified by the interrupt instruction by causing the image forming section to suspend image formation based on print data of the print job not identified by the interrupt instruction.

25. The print control method of claim 21, wherein said interrupt control step interrupts processing of the print job not identified by the interrupt instruction by deleting image data generated in said generation step from print data of the print job not identified by the interrupt instruction.

26. The print control method of claim 21, wherein said interrupt control step interrupts processing of the print job not identified by the interrupt instruction by invalidating image data generated in said generation step from print data of the print job not identified by the interrupt instruction.

27. The print control method of claim 21, wherein said generation step analyzes all the print data of the interrupted print job stored in the storing means after analysis of the print data of the identified print job is completed.

28. The print control method of claim 21, wherein said generation step skips generation of image data, based on a number of pages for which ejection from the print control apparatus is completed.

29. The print control method of claim 21, wherein the interrupt instruction is included in the identified print job.

30. The print control method of claim 21, further comprising a priority control step of controlling priority print processing such that the print data of a print job instructed for priority print is analyzed after analysis of all the print data of a certain print job is completed in said generation step in response to a priority instruction from the external apparatus.

31. The print control method of claim 30, wherein the priority instruction is included in the instructed print job.

32. The print control method of claim 22, further comprising a determination step of determining whether or not an interrupt instruction is permitted, wherein said interrupt control step does not interrupt processing of the print job not identified by the interrupt instruction if it is determined in said determination step that the instruction is not permitted.

33. The print control method of claim 32, further comprising a setting step of setting whether or not the interrupt instruction can be used, wherein said determination step determines that the interrupt instruction is permitted if it is set for use in said setting step.

34. A print control method for a print control apparatus receiving a print job including print data from an external apparatus and causing image formation in an image forming section of the print control apparatus based on image data, said method comprising:

a storing step of storing print data in storing means;

a generation step of generating image data by analyzing the print data;

an image formation control step of causing image formation in the image forming section based on the image data generated in said generation step;

a suspend control step of controlling such that the print data stored in the storing means, which is print data of a print job instructed for suspension, is not analyzed in said generation step in response to a suspend instruction for the print job from the external apparatus;

a determination step of determining whether or not suspended print jobs exist at power-off; and a power supply control step of suspending power-off for a designated amount of time if it is determined in said determination step that a print job exists, wherein said storing step stores the print data of the print job instructed for suspension until formation of an image based on image data generated from print data of the print job from the external apparatus by the image forming section is completed.

35. The print control method of claim 34, wherein said power supply control step does not perform power-off if there is no power-off instruction during the designated amount of time and does perform power-off if there is a power-off instruction during the designated amount of time.

36. A print control method for controlling a print control apparatus for receiving a print job including print data from an external apparatus and controlling an image forming section to form an image based on image data, said method comprising:

a generation step of generating image data by analyzing the print data; and an image formation control step of causing the image forming section to form an image based on the image data generated in said generation step, wherein said method may be executed in a first mode in which, in response to a first mode instruction identifying a print job, received from the external apparatus, to be processed in the first mode, the first mode instruction being included in the identified print job, said generation step is caused to suspend analysis of print data of a print job not identified in the first mode instruction and analyze print data of the print job identified in the first mode instruction, and in a second mode in which, in response to a second mode instruction identifying a print job, received from the external apparatus, to be processed in the second mode, the second mode instruction being included in the identified print job, said generation step is caused to analyze print data of the print job identified in the second mode instruction after completing analysis of print data of a first print job not identified in the second mode instruction and before starting analysis of print data of a second print job not identified in the second mode instruction, the first and second print jobs being received before the identified print job.

37. The print control method of claim 36, wherein, in the first mode, said image formation control step is caused to suspend image formation in the image forming section based on the image data relating to the print job not identified in the first mode instruction.

38. The print control method of claim 36, wherein, in the first mode, image formation is suspended in the image forming section based on the image data relating to the print job not identified in the first mode instruction.

39. The print control method of claim 36, wherein, in the first mode, image data generated in said generation step is deleted in response to the first mode instruction.

40. The print control method of claim 36, wherein, in the first mode, image data generated in said generation step is invalidated in response to the first mode instruction.

41. A computer-readable memory medium which stores a print control program executing a print control method for controlling a print control apparatus for receiving a print job including print data from an external apparatus and controlling an image forming section to form an image based on image data, said program comprising:

code for a storing step of storing print data in storing means;

code for a generation step of generating image data by analyzing print data;

code for an image formation control step of causing the image forming section to form the image based on image data generated by said generation code; and code for an interrupt control step of, in response to an interrupt instruction identifying a print job, interrupting processing of a print job not identified by the interrupt instruction and controlling said generation code to analyze print data of the print job identified in the interrupt instruction, wherein said storing code stores print data of the interrupted print job in the storing means, including a print data portion that has already been analyzed by said generation code, until formation of an image based on the image data generated from the print data of the identified print job by the image forming section is completed, and wherein said generation code analyzes the print data of the interrupted print job, including the print data portion that has already been analyzed by said generation code, stored by said storing code after analysis of print data of the identified print job is completed.

42. The computer-readable memory medium of claim 41, wherein said interrupt control code interrupts processing of the print job not identified by the interrupt instruction by causing said generation code to suspend analysis of print data of the print job not identified by the interrupt instruction.

43. The computer-readable memory medium of claim 41, wherein said interrupt control code interrupts processing of the print job not identified by the interrupt instruction by causing said image formation control code to suspend image formation in the image forming section based on image data of the print job not identified by the interrupt instruction.

44. The computer-readable memory medium of claim 41, wherein said interrupt control code interrupts processing of the print job not identified by the interrupt instruction by causing the image forming section to suspend image formation based on print data of the print job not identified by the interrupt instruction.

45. The computer-readable memory medium of claim 41, wherein said interrupt control code interrupts processing of the print job not identified by the interrupt instruction by deleting image data generated by said generation code from print data of the print job not identified by the interrupt instruction.

46. The computer-readable memory medium of claim 41, wherein said interrupt control code interrupts processing of the print job not identified by the interrupt instruction by invalidating image data generated by said generation code from print data of the print job not identified by the interrupt instruction.

47. The computer-readable memory medium of claim 41, wherein said generation code analyzes all the print data of the interrupted print job stored in the storing means after analysis of the print data of the identified print job is completed.

48. The computer-readable memory medium of claim 41, wherein said generation code skips generation of image data, based on a number of pages for which ejection from the print control apparatus is completed.

49. The computer-readable memory medium of claim 41, wherein the interrupt instruction is included in the identified print job.

50. The computer-readable memory medium of claim 41, wherein the program further comprises code for a priority control step of controlling priority print processing such that the print control program causes the print data of a print job instructed for priority print to be analyzed after analysis of all the print data of a certain print job is completed by said generation code in response to a priority instruction from the external apparatus.

51. The computer-readable memory medium of claim 42, wherein the program further comprises code for a determination step of determining whether or not an interrupt instruction is permitted, wherein said interrupt control code does not interrupt processing of the print job not identified by the interrupt instruction if it is determined by said determination code that the instruction is not permitted.

52. The computer-readable memory medium of claim 51, wherein the program further comprises code for a setting step of setting whether or not the interrupt instruction can be used, wherein said determination code determines that the interrupt instruction is permitted if it is set for use by said setting code.

53. A computer-readable memory medium which stores a print control program executing a print control method for controlling a print control apparatus for receiving a print job including print data from an external apparatus and controlling an image forming section to form an image based on image data, said program comprising:

code for a storing step of storing print data in storing means;

code for a generation step of generating image data by analyzing the print data;

code for an image formation control step of causing image formation in the image forming section based on the image data generated by said generation code;

code for a suspend control step of controlling such that the print data stored in the storing means, which is print data of a print job instructed for suspension, is not analyzed by said generation code in response to a suspend instruction for the print job from the external apparatus;

code for a determination step of determining whether or not suspended print jobs exist at power-off; and code for a power supply control step of suspending power-off for a designated amount of time if it is determined by said determination code that a print job exists, wherein said storing code stores the print data of the print job instructed for suspension in the storing means until formation of an image based on image data generated from the print data of the print job from the external apparatus by the image forming section is completed.

54. The computer-readable memory medium of claim 53, wherein said power supply control code does not perform power-off if there is no power-off instruction during the designated amount of time and does perform power-off if there is a power-off instruction during the designated amount of time.

55. A computer-readable memory medium which stores a print control program executing a print control method for controlling a print control apparatus for receiving a print job including print data from an external apparatus and controlling an image forming section to form an image based on image data, said program comprising:

code for a generation step of generating image data by analyzing the print data; and code for an image formation control step of causing the image forming section to form an image based on the image data generated by said generation code, wherein the program may be executed in:

a first mode in which, in response to a first mode instruction identifying a print job, received from the external apparatus, to be processed in the first mode, the first mode instruction being included in the identified print job, said generation code is caused to suspend analysis of print data of a print job not identified in the first mode instruction and analyze print data of the print job identified in the first mode instruction; and a second mode in which, in response to a second mode instruction identifying a print job, received from the external apparatus, to be processed in the second mode, the second mode instruction being included in the identified print job, said generation code is caused to analyze print data of the print job identified in the second mode instruction after completing analysis of print data of a first print job not identified in the second mode instruction and before starting analysis of print data of a second print job not identified in the second mode instruction, the first and second print jobs being received before the identified print job.

56. The computer-readable memory medium of claim 55, wherein, in the first mode, said image formation control code is caused to suspend image formation in the image forming section based on the image data relating to the print job not identified in the first mode instruction.

57. The computer-readable memory medium of claim 55, wherein, in the first mode, image formation is suspended in the image forming section based on the image data relating to the print job not identified in the first mode instruction.

58. The computer-readable memory medium of claim 55, wherein, in the first mode, image data generated by said generation code is deleted in response to the first mode instruction.

59. The computer-readable memory medium of claim 55, wherein, in the first mode, image data generated by said generation code is invalidated in response to the first mode instruction.

60. A print control program executing a print control method for controlling a print control apparatus for receiving print jobs including print data from an external apparatus and an image forming section of the print apparatus to form an image based on image data, said program comprising:

code for a storing step of storing print data in storing means;

code for a generation step of generating image data by analyzing print data;

code for an image formation control step of causing the image forming section to form the image based on the image data generated by said generation code;

code for an interrupt step of, in response to an interrupt instruction identifying a print job, interrupting processing of a print job not identified by the interrupt instruction and controlling said generation code to analyze print data of the print job identified in the interrupt instruction, wherein said storing code stores print data of the interrupted print job in the storing means, including a print data portion that has already been analyzed by said generation code, until formation of an image based on the image data generated from the print data of the identified print job by the image forming section is completed, and wherein said generation code analyzes the print data of the interrupted print job, including the print data portion that has already been analyzed by said generation code, stored by said storing code after analysis of the print data of the identified print job is completed.

61. The print control program of claim 60, wherein said interrupt control code interrupts processing of the print job not identified by the interrupt instruction by causing said generation code to suspend analysis of print data of the print job not identified by the interrupt instruction.

62. The print control program of claim 60, wherein said interrupt control code interrupts processing of the print job not identified by the interrupt instruction by causing said image formation control code to suspend image formation in the image forming section based on image data of the print job not identified by the interrupt instruction.

63. The print control program of claim 60, wherein said interrupt control code interrupts processing of the print job not identified by the interrupt instruction by causing the image forming section to suspend image formation based on print data of the print job not identified by the interrupt instruction.

64. The print control program of claim 60, wherein said interrupt control code interrupts processing of the print job not identified by the interrupt instruction by deleting image data generated by said generation code from print data of the print job not identified by the interrupt instruction.

65. The print control program of claim 60, wherein said interrupt control code interrupts processing of the print job not identified by the interrupt instruction by invalidating image data generated by said generation code from print data of the print job not identified by the interrupt instruction.

66. The print control program of claim 60, wherein said generation code analyzes all the print data of the interrupted print job stored in the storing means after analysis of the print data of the identified print job is completed.

67. The print control program of claim 60, wherein said generation code skips generation of image data, based on a number of pages for which ejection from the print control apparatus is completed.

68. The print control program of claim 60, wherein the interrupt instruction is included in the print job.

69. The print control program of claim 60, further comprising code for a priority control step of controlling priority print processing such that the print data of a print job instructed for priority print is analyzed after analysis of all the print data of a certain print job is completed by said generation code in response to a priority instruction from the external apparatus.

70. The print control program of claim 69, wherein the priority instruction is included in the print job.

71. The print control program of claim 61, further comprising code for a determination step of determining whether or not an interrupt instruction is permitted, wherein said interrupt control code does not interrupt processing of the print job not identified by the interrupt instruction if it is determined by said determination code that the instruction is not permitted.

72. The print control program of claim 71, further comprising code for a setting step of setting whether or not the interrupt instruction can be used, wherein said determination code determines that the interrupt instruction is permitted if it is set for use by said setting code.

73. A print control program executing a print control method for controlling a print control apparatus for receiving a print job including print data from an external apparatus and an image forming section to form an image based on image data, said program comprising:

code for a storing step of storing print data in storing means;

code for a generation step of generating image data by analyzing print data;

code for an image formation control step of causing the image forming section to form the image based on the image data generated by said generation code;

code for a suspend control step of controlling such that the print data stored in the storing means, which is print data of a print job instructed for suspension, is not analyzed by said generation code in response to a suspend instruction for the print job from the external apparatus;

code for a determination step of determining whether or not suspended print jobs exist at power-off; and code for a power supply control step of suspending power-off for a designated amount of time if it is determined by said determination code that a print job exists, wherein said storing code stores print data of the print job instructed for suspension in the storing means until the formation of an image based on image data generated from the print data of the print job from the external apparatus by the image forming section is completed.

74. The print control program of claim 73, wherein said power supply control code does not perform power-off if there is no power-off instruction during the designated amount of time and does perform power-off if there is a power-off instruction during the designated amount of time.

75. A print control program executing a print control method for controlling a print control apparatus for receiving a print job including print data from an external apparatus and forming an image in an image forming section based on image data, said program comprising:

code for a generation step of generating image data by analyzing the print data; and code for an image formation control step of causing the image forming section to form an image based on the image data generated by said generation code, wherein said program may be executed in a first mode in which, in response to a first mode instruction identifying a print job, received from the external apparatus, to be processed in the first mode, the first mode instruction being included in the identified print job, said generation code is caused to suspend analysis of print data of of a print job not identified in the first mode instruction and analyze print data of the print job identified in the first mode instruction, and in a second mode in which, in response to a second mode instruction identifying a print job, received from the external apparatus, to be processed in the second mode, the second mode instruction being included in the identified print job, said generation code is caused to analyze print data of the print job identified in the second mode instruction after completing analysis of print data of a first print job not identified in the second mode instruction and before starting analysis of print data of a second print job not identified in the second mode instruction, the first and second print jobs being received before the identified print job.

76. The print control program of claim 75, wherein, in the first mode, said image formation control code is caused to suspend image formation in the image forming section based on the image data relating to the print job not identified in the first mode instruction.

77. The print control program of claim 75, wherein, in the first mode, image formation is suspended in the image forming section based on the image data relating to the print job not identified in the first mode instruction.

78. The print control program of claim 75, wherein, in the first mode, image data generated by said generation code is deleted in response to the first mode instruction.

79. The print control program of claim 75, wherein, in the first mode, image data generated by said generation code is invalidated in response to the first mode instruction.

* * * * *

UNITED STATES PATENT AND TRADEMARK OFFICE
CERTIFICATE OF CORRECTION

| | |
|---|---|
| PATENT NO. | : 6,906,813 B1 |
| APPLICATION NO. | : 09/470206 |
| DATED | : June 14, 2005 |
| INVENTOR(S) | : Tuchitoi et al. |

It is certified that error appears in the above-identified patent and that said Letters Patent is hereby corrected as shown below:

COVER PAGE:
(30) Foreign Application Priority Data
    "Dec. 9, 1999   (JP) ................ 10-350036" should read
    -- Dec. 9, 1999   (JP) ................ 11-350036 --.

(57) ABSTRACT, line 7, "are" should read -- is --.

COLUMN 10:
Line 21, "but" should read -- put --; and
Line 61, "set." should read -- set, --.

COLUMN 14:
Line 12, "obtain" should read -- obtaining --, and "the" (second occurrence) should read
    -- The --.

COLUMN 15:
Line 48, "instructs" should read -- it instructs --.

COLUMN 16:
Line 40, "translated" should read -- translate --; and
Line 43, "translation" should read -- translate --.

COLUMN 18:
Line 13, "and" should read -- an --; and
Line 21, "manger" should read -- manager --.

COLUMN 21:
Line 34, "perform" should read -- performed --.

COLUMN 25:
Line 40, "(controller) 2603," should read -- (controller) 3603, --.

COLUMN 29:
Line 1, "4304 is an output buffer" should read -- 4303 is an output buffer --.;
Line 37, "analysis stored" should read -- analysis is stored --; and
Line 63, "in forma-" should read -- informa- --.

UNITED STATES PATENT AND TRADEMARK OFFICE
CERTIFICATE OF CORRECTION

PATENT NO. : 6,906,813 B1
APPLICATION NO. : 09/470206
DATED : June 14, 2005
INVENTOR(S) : Tuchitoi et al.

It is certified that error appears in the above-identified patent and that said Letters Patent is hereby corrected as shown below:

COLUMN 31:
Line 10, "is" should read -- are --.

COLUMN 40:
Line 24, "code;" should read -- code; and --.

COLUMN 42:
Line 59, insert the following:
-- 80. The computer-readable memory medium of Claim 50, wherein the priority instruction for a print job is included in the print job. --

Signed and Sealed this

Twenty-second Day of January, 2008

JON W. DUDAS
*Director of the United States Patent and Trademark Office*